(12) United States Patent
Machida et al.

(10) Patent No.: US 7,531,605 B2
(45) Date of Patent: May 12, 2009

(54) PROCESS FOR PRODUCING POLYOLEFIN RESIN COMPOSITION AND POLYPROPYLENE COMPOSITION

(75) Inventors: Shuji Machida, Chiba (JP); Masayuki Shinohara, Chiba (JP); Tatsuya Housaki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 77 days.

(21) Appl. No.: 10/469,701

(22) PCT Filed: Mar. 12, 2002

(86) PCT No.: PCT/JP02/02299

§ 371 (c)(1),
(2), (4) Date: Sep. 12, 2003

(87) PCT Pub. No.: WO02/072649

PCT Pub. Date: Sep. 19, 2002

(65) Prior Publication Data

US 2004/0106738 A1 Jun. 3, 2004

(30) Foreign Application Priority Data

| Mar. 12, 2001 | (JP) | 2001-068422 |
| Mar. 14, 2001 | (JP) | 2001-071948 |
| May 8, 2001 | (JP) | 2001-136854 |
| May 8, 2001 | (JP) | 2001-136855 |

(51) Int. Cl.

| C08F 210/06 | (2006.01) |
| C08F 210/16 | (2006.01) |
| C08F 236/02 | (2006.01) |
| C08F 4/642 | (2006.01) |
| C08F 4/6592 | (2006.01) |

(52) U.S. Cl. ............... 526/65; 526/124.2; 526/124.3; 526/160; 526/170; 526/339; 526/340; 525/53; 525/232; 525/240; 525/241

(58) Field of Classification Search .............. 525/53, 525/232, 240, 241; 526/65, 124.2, 124.3, 526/160, 170, 339, 340

See application file for complete search history.

(56) References Cited

U.S. PATENT DOCUMENTS

| 5,391,626 A | 2/1995 | Machida et al. |
| 5,412,024 A | 5/1995 | Okada et al. |
| 5,418,290 A | 5/1995 | Machida et al. |
| 5,608,009 A | 3/1997 | Machida et al. |
| 5,670,580 A | 9/1997 | Tazaki et al. |
| 5,739,225 A | 4/1998 | Tazaki et al. |
| 5,747,620 A | 5/1998 | Machida et al. |
| 5,955,557 A | 9/1999 | Machida et al. |
| 6,121,402 A | 9/2000 | Machida et al. |
| 6,169,154 B1 | 1/2001 | Machida et al. |
| 6,573,352 B1 | 6/2003 | Tatsumi et al. |
| 2004/0054098 A1* | 3/2004 | Weng et al. .................. 526/73 |

FOREIGN PATENT DOCUMENTS

| EP | 686649 | * 12/1995 |
| EP | 686649 A1 | * 12/1995 |
| JP | 49-42788 | 4/1974 |
| JP | 63-161810 | 7/1987 |
| JP | 8-92337 | 4/1996 |
| JP | 9-235337 | * 9/1997 |

OTHER PUBLICATIONS

U.S. Appl. No. 10/482,418, filed Jan. 12, 2004, Machida, et al.
U.S. Appl. No. 08/582,012, filed Jan. 2, 1996, Machida, et al.
U.S. Appl. No. 10/019,293, filed Jan. 4, 2002, Machida, et al.
U.S. Appl. No. 10/070,442, filed Mar. 19, 2002, Machida, et al.

* cited by examiner

*Primary Examiner*—Roberto Rábago
(74) *Attorney, Agent, or Firm*—Oblon, Spivak, McClelland, Maier & Neustadt, P.C.

(57) ABSTRACT

A process for producing a polyolefin-based resin composition comprises, in the first polymerization stage, polymerizing an α-olefin having 4 to 20 carbon atoms, a styrene or a cyclic olefin in the presence of a specific catalyst and, in the second polymerization stage, copolymerizing the obtained polymer with an α-olefin having 2 to 20 carbon atoms, a styrene or a cyclic olefin in the presence of a polyene. A polypropylene composition has a branching parameter a and a branching index g in specific ranges. The curve showing the change in viscosity under elongation with time, the degradation parameter D or the content of a high molecular weight component is specified. The polyolefin-based resin composition exhibits excellent uniformity and improved workability in melting due to improved tension in melted condition. The polypropylene composition exhibits excellent melting elasticity and secondary workability and provides foamed molded articles, sheets and blow molded articles.

7 Claims, 1 Drawing Sheet

PROCESS FOR PRODUCING POLYOLEFIN RESIN COMPOSITION AND POLYPROPYLENE COMPOSITION

TECHNICAL FIELD

The present invention relates to a process for producing a polyolefin-based resin composition, a polypropylene composition and applications thereof. More particularly, the present invention relates to a process for producing a polyolefin-based resin composition which exhibits an improved workability in molding, which is advantageously used in the fields where excellent workability is required such as the sheet molding, the extrusion expansion molding, the blow molding, the profile extrusion molding and the inflation molding and which can control physical properties in a wide range. The present invention also relates to a polypropylene composition which exhibits excellent melting elasticity, suppressed degradation of the resin in recycling to enable reusing and an excellent property for extrusion, emits no smell, causing no effects on the taste of foods, has excellent secondary workability, contains no gel, and provides inexpensive polypropylene sheets, blow molded articles and foamed molded articles of polypropylene; and applications of the polypropylene composition.

BACKGROUND ART

Taking advantage of the excellent weatherability due to chemical stability, the excellent chemical resistance and the excellent mechanical strength, polyolefin resins have been provided with desired physical properties and desired shapes in accordance with various molding processes such as the sheet molding, the film molding, the injection molding, the blow molding, the expansion molding, the vacuum molding and the rotation molding and have been widely used in various fields.

Recently, the decrease in the load on the environment is continuously required for every type of plastics due to the enhanced consciousness for protection of the environment. Since polyolefin-based resins have excellent properties for recycling, can be molded easily and do not emit harmful components during incineration, the polyolefin-based resins are attracting the attention as the most suitable material for decreasing the load on the environment. Therefore, it is estimated that the polyolefin-based resins are used more widely and required to have highly excellent properties.

To satisfy the above requirement, it is necessary that the workability in molding of the polyolefin resins is further improved and more excellent mechanical properties be exhibited. As a means to achieve these improvements, formation of composites has been attempted but is insufficient for improving the molding ability and exhibiting novel physical properties.

As the means for improving the molding ability, a process for producing a polyolefin-based resin using a polyene component is known. However, since the polyolefin-based resin is produced in accordance with a single stage polymerization process, the structure of the polymer is controlled essentially by adjusting the relative amounts of the monomer and the polyene used for the polymerization and there are no other effective means for the control. An increase in the amount of the polyene to improve the melting property is accompanied with frequent gelation and formation of insoluble products and, as the result; the improvement in the melting property is not achieved as desired. Moreover, a drawback arises in that, in accordance with the single stage polymerization process, the polyene cannot be copolymerized as desired in the effective range of the molecular weight distribution since the polyene is present in all ranges of the molecular weight distribution. For example, although it is necessary that the polyene be present in a small amount in the range of the high molecular weight to improve the melting property to a great degree, the amount of the polyene cannot be controlled in the desired manner. Therefore, the polyene must be used in an amount more than necessary to improve the melting property and frequent gelation and formation of insoluble products take place.

To overcome the above problem, multi-stage polymerization processes are proposed. In Japanese Patent Application Laid-Open Nos. Heisei 8(1996)-92337, Heisei 8(1996)-100036, Heisei 8(1996)-311136 and Heisei 9(1996)-235337, processes using polyenes for improving the balance between rigidity and impact strength of block copolymers containing propylene as the main component are disclosed. In these processes, propylene-based block copolymers are obtained by copolymerizing propylene and ethylene continuously after the homopolymerization of propylene. As the physical property of the resultant copolymer, the balance between rigidity and impact strength is improved. However, nothing is mentioned on the form of the reaction and the specific procedures of the process in the second stage that are important for the improvement in the property for melt molding. In the above processes, although the molecular weight of the block copolymer itself is mentioned, none of the control of the molecular weight, the selection of the catalyst in each stage and the type of the monomer in the second stage, which are the important factors for the improvement in the molding ability, are mentioned, either.

In WO 94/19382, a process for producing a propylene-based block copolymer using a diene is disclosed. As the characteristics of the process, an improvement in the balance between rigidity and impact resistance, an increase in the activation energy of melt flow, a decrease in the amount of gel components and the formation of an unsaturated group suitable for the macromolecular reaction are described.

However, the above process is limited to the production of a propylene-based block copolymer. Although the improvement in the melting property and the decrease in the amount of gel components are described, nothing is mentioned on the control of the multi-stage polymerization and, therefore, no remarkable improvement in the melting property can be expected. Nothing is mentioned on the uniform polymer composition in the above process.

Polypropylene has been widely used in various fields taking advantage of the excellent properties such as high rigidity, excellent heat resistance, lightweight, low price and excellent properties for the environment. However, it has been difficult due to the small tension in melted condition that applications are developed in the field of extrusion molding such as the sheet molding, the blow molding and the expansion molding. To improve the tension in melted condition, a process for obtaining a branched polypropylene by irradiation with electron beams is proposed (Japanese Examined Patent Publication No. 2655915). However, this process has drawbacks in that the facility is expensive and the production cost increases and that the resin is degraded (scission of molecular chains) in an extruder and the reuse of polypropylene becomes difficult.

As the process for producing polypropylene having a high melting elasticity, processes such as (i) a multi-stage polymerization (Japanese Patent Application Laid-Open No.

Showa 58(1983)-219207), (ii) copolymerization with a polyene (Japanese Patent Application Laid-Open No. Heisei 8(1996)-92317), (iii) addition of an organic peroxide (Japanese Patent Application Laid-Open No. Heisei 7(1995)-138422), and (iv) irradiation with electron beams (Japanese Patent Application Laid-Open No. Showa 62(1987)-121704) are proposed. However, the process described in the foregoing item (i) has a drawback in that gel is formed due to tension in melted condition. The process described in the foregoing item (ii) has a drawback in that gel is formed and the secondary workability such as heat molding is adversely affected. The process described in the foregoing item (iii) has a drawback in that the handling property is poor and coloring and smelling take place. The process described in the foregoing item (iv) has a drawback in that the facility is expensive and the resin is degraded during recycling.

DISCLOSURE OF THE INVENTION

Under the above circumstances, the present invention has a first object of providing a process for producing a polyolefin-based resin composition which exhibits an improved workability in molding of polyolefins, is advantageously used in the fields where excellent workability is required such as the sheet molding, the extrusion expansion molding, the blow molding, the profile extrusion molding and the inflation molding and can control physical properties in a wide range.

The present invention has a second object of providing a polypropylene composition which exhibits excellent melting elasticity, suppressed degradation of the resin in recycling to enable reusing and an excellent property for extrusion, emits no smell, causing no effects on the taste of foods, has excellent secondary workability, contains no gel and provides inexpensive polypropylene sheets, blow molded articles and foamed molded articles of polypropylene.

The present invention has a third object of providing applications for the above polypropylene composition.

As the result of extensive studies by the present inventors to achieve the above objects, it was found that the first object could be achieved by producing a specific polyolefin-based resin composition in the presence of a polyene in a specific amount in the second polymerization stage in the two-stage polymerization process in the presence of a specific catalyst or in the presence of a polyene in the second polymerization stage in the two-stage polymerization in the presence of a specific catalyst, that the second object could be achieved by using a polypropylene composition satisfying specific parameters, and that the third object could be achieved by conducting the blow molding, the expansion molding or the sheet molding using the above polypropylene composition.

The present invention has been completed based on the above knowledge.

The present invention provides:
(1) A process for producing a polyolefin-based resin composition which comprises:
in a first polymerization stage, polymerizing or copolymerizing at least one monomer selected from ethylene, propylene, α-olefins having 4 to 20 carbon atoms, styrenes and cyclic olefins in a presence of a catalyst comprising a combination of a catalyst component (A) comprising at least one compound selected from compounds of transition metals of Group 4 of the Periodic Table having a cyclopentadienyl skeleton structure and a promoter component (B); and
in a second polymerization stage, copolymerizing the homopolymer or the copolymer obtained in the first polymerization stage with at least one monomer selected from ethylene, propylene, α-olefins having 4 to 20 carbon atoms, styrene and cyclic olefins in a presence of a polyene having at least two polymerizable carbon-carbon double bonds in one molecule in an amount of $1.0 \times 10^{-7}$ to $1.0 \times 10^{-3}$ moles per 1 g of the polymer or the copolymer obtained in the first polymerization stage (hereinafter, this process will be referred to as process I);
(2) A process for producing a polyolefin-based resin composition which comprises:
in a first polymerization stage, polymerizing or copolymerizing at least one monomer selected from ethylene, propylene, α-olefins having 4 to 20 carbon atoms, styrene and cyclic olefins in a presence of a catalyst comprising a catalyst component (A) comprising at least one compound selected from compounds of transition metals of Group 4 of the Periodic Table having a cyclopentadienyl skeleton structure and a promoter component (B); and
in a second polymerization stage, copolymerizing the homopolymer or the copolymer obtained in the first polymerization stage with at least one monomer selected from ethylene, α-olefins having 4 to 20 carbon atoms, styrene and cyclic olefins in a presence of a polyene having at least two polymerizable carbon-carbon double bonds in one molecule (hereinafter, this process will be referred to as process II);
(3) A process for producing a polyolefin-based resin composition comprising:
in a first polymerization stage, polymerizing or copolymerizing at least one monomer selected from ethylene, propylene and α-olefins having 4 to 20 carbon atoms in a presence of a catalyst comprising a combination of a catalyst component (X) comprising a titanium trichloride-based compound or a component comprising titanium, magnesium and a halogen as essential components and an organoaluminum compound (Y), and
in a second polymerization stage, copolymerizing the homopolymer or the copolymer obtained in the first polymerization stage with at least one monomer selected from ethylene, propylene and α-olefins having 4 to 20 carbon atoms in a presence of a polyene having at least two polymerizable carbon-carbon double bonds in one molecule; and
the produced composition satisfying following requirements (a) to (c):
(a) a ratio $[\eta]_2/[\eta]_1 = 1.05$ to 10, wherein $[\eta]_1$ represents an intrinsic viscosity of a polyolefin obtained in the first polymerization stage and $[\eta]_2$ represents an intrinsic viscosity of a polyolefin obtained in the second polymerization stage,
(b) a content of the polyolefin obtained in the second polymerization stage in the polyolefin-based resin composition is 0.001 to 80% by weight, and
(c) no insoluble components are present in a dissolution test of the polyolefin-based resin composition using decaline at 135° C. as a solvent (hereinafter, this process will be referred to as process III);
(4) A polypropylene composition which satisfies following requirements (i) to (iv):
(i) a branching parameter a is in a range of:
$0.35 < a \leq 0.57$
(ii) an branching index g is in a range of:
$0.75 \leq g < 1.0$ (when a molecular weight measured in accordance with a light scattering method is 2,000,000 to 10,000,000)
$090 \leq g < 1.0$ (when a molecular weight measured in accordance with a light scattering method is 500,000 to a value smaller than 2,000,000)
(iii) an upturn from an inflection point is present in a curve showing a change in viscosity under extension with passage of time, and (iv) a degradation parameter D is:
D≧0.7

(hereinafter, this composition will be referred to as polypropylene composition I);

(5) A polypropylene composition which satisfies following requirements (i) to (iii):
  (i) a branching parameter a is in a range of:
    0.35<a≦0.57
  (ii) an branching index g is in a range of:
    0.75≦g<1.0 (when a molecular weight measured in accordance with a light scattering method is 2,000,000 to 10,000,000)
    090≦g<1.0 (when a molecular weight measured in accordance with a light scattering method is 500,000 to a value smaller than 2,000,000)
  (iii) a content of a high molecular weight component having a molecular weight of 1,000,000 or greater as measured in accordance with a light scattering method is 10% by weight or smaller (hereinafter, this composition will be referred to as polypropylene composition II);

(6) A molded article which is obtained by using polypropylene composition I or II: and (7) A thermoplastic resin composition which is obtained by adding a thermoplastic resin to at least one composition selected from polyolefin-based resin compositions obtained in accordance with any one of processes I, II and III and polypropylene compositions I and II.

THE MOST PREFERRED EMBODIMENT TO CARRY OUT THE INVENTION

Figure 1:
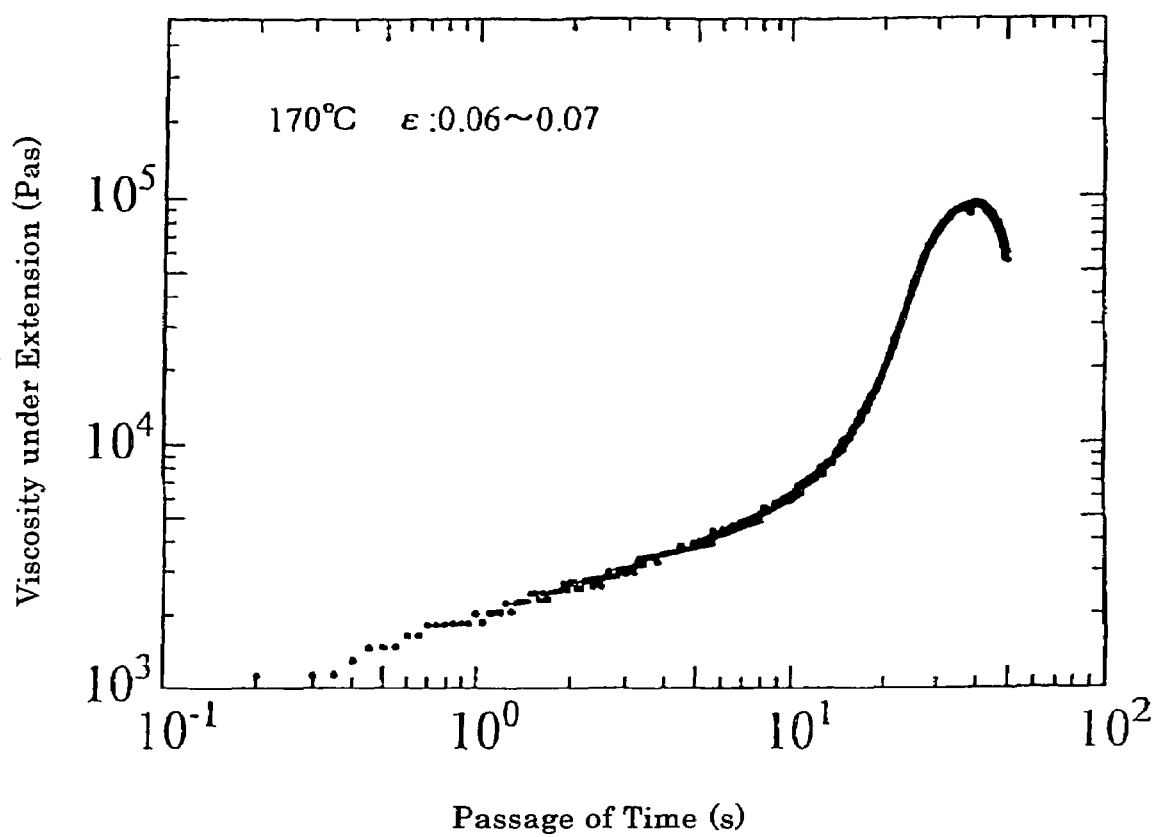
FIG. 1 shows a diagram exhibiting the change in the viscosity under extension of a polypropylene composition with passage of time.

The process for producing a polyolefin-based resin composition of the present invention includes two embodiments that are a process referred to as process I or process II and process III. The process referred to as process I or process II will be described first.

In the process for producing a polyolefin-based resin composition of the present invention, catalyst component (A) in the catalyst used in process I and process II comprises at least one compound selected from compounds of transition metals of Group 4 of the Periodic Table having a cyclopentadienyl skeleton structure. Examples of the compounds of transition metals of Group 4 of the Periodic Table having a cyclopentadienyl skeleton structure include Components (A-1) to (A-5) shown in the following.

Components (A-1), (A-2) and (A-3):
Components (A-1), (A-2) and (A-3) are transition metal compounds represented by the following general formulae (I), (II) and (III), respectively:

$$CpM^1R^1{}_aR^2{}_bR^3{}_c \qquad (I)$$

$$Cp_2M^1R^1{}_aR^2{}_e \qquad (II)$$

$$(Cp\text{-}A\text{-}Cp)M^1R^1{}_dR^2{}_e \qquad (III)$$

In general formulae (I), (II) and (III), $M^1$ represents a transition metal of Group 4 of the Periodic Table, Cp represents a group selected from cyclopentadienyl group, substituted cyclopentadienyl groups, indenyl group, substituted indenyl groups, tetrahydroindenyl group, substituted tetrahydroindenyl groups, fluorenyl group and substituted fluorenyl groups, $R^1$, $R^2$ and $R^3$ each independently represent a ligand, A represents a crosslinking with a covalent bond, a, b and c each represent an integer of 0 to 3, d and e each represent an integer of 0 to 2, two or more ligands represented by $R^1$, $R^2$ and $R^3$ may be bonded with each other and form a ring, and two Cp in general formula (II) and (III) may represent a same group or different groups.

Examples of the transition metal of Group 4 of the Periodic Table represented by $M^1$ in general formulae (I), (II) and (III) include titanium, zirconium and hafnium.

Examples of the substituent on the ring of the group represented by Cp include hydrogen atom, halogen atoms, hydrocarbon groups having 1 to 20 carbon atoms and hydrocarbon atoms having 1 to 20 carbon atoms and halogen atoms. Substituents adjacent to each other may be bonded to each other and form a ring. Examples of the halogen atom include fluorine atom, chlorine atom, bromine atom and iodine atom. Examples of the hydrocarbon group having 1 to 20 carbon atoms include alkyl groups such as methyl group, ethyl group, n-propyl group, isopropyl group, n-butyl group, isobutyl group, tert-butyl group, n-hexyl group and n-decyl group; aryl groups such as phenyl group, 1-naphthyl group and 2-naphthyl group; and aralkyl groups such as benzyl group. Examples of the hydrocarbon group having 1 to 20 carbon atoms and halogen atoms include groups obtained by substituting at least one hydrogen atom in the above hydrocarbon group with a suitable halogen atom.

Examples of the substituted cyclopentadienyl group include methylcyclopentadienyl group, ethylcyclopentadienyl group, isopropyl-cyclopentadienyl group, 1,2-dimethylcyclopentadienyl group, tetramethylcyclopentadienyl group, 1,3-dimethylcyclopentadienyl group, 1,2,3-trimethylcyclopentadienyl group, 1,2,4-trimethylcyclopentadienyl group, pentamethylcyclopentadienyl group and trimethylsilyl-cyclopentadienyl group. Examples of the group having a ring formed by substituents adjacent to each other include 4,5-benzoindenyl group, α-acetoindenyl group and these compounds substituted with alkyl groups having 1 to 10 carbon atoms when the group is based on the indenyl ring.

In the above formulae (I) to (III), $R^1$, $R^2$ and $R^3$ each independently represent a ligand such as a ligand forming a σ-bond, a ligand forming a chelate and a Lewis base. Examples of the ligand forming a σ-bond include hydrogen atom, oxygen atom, halogen atoms, alkyl groups having 1 to 20 carbon atoms, alkoxyl groups having 1 to 20 carbon atoms, aryl groups, alkylaryl groups and arylalkyl groups each having 6 to 20 carbon atoms, acyloxyl groups having 1 to 20 carbon atoms, allyl group, substituted allyl groups and substituents having silicon atom. Examples of the ligand forming a chelate include acetylacetonato group and substituted acetylacetonato groups. A plurality of the ligands represented by $R^1$, $R^2$ and $R^3$ may be bonded to each other and form a ring when the plurality of the ligands are present. When the group represented by Cp has a substituent, it is preferable that the substituent is an alkyl group having 1 to 20 carbon atoms.

Examples of the ligand represented by $R^1$, $R^2$ and $R^3$ include halogen atoms such as fluorine atom, chlorine atom, bromine atom and iodine atom; alkyl groups having 1 to 20 carbon atoms such as methyl group, ethyl group, n-propyl group, isopropyl group, n-butyl group, octyl group and 2-ethylhexyl group; alkoxyl groups having 1 to 20 carbon atoms such as methoxyl group, ethoxyl group, propoxyl group, butoxyl group and phenoxyl group; aryl groups, alkylaryl groups and arylalkyl groups having 1 to 20 carbon atoms such as phenyl group, tolyl group, xylyl group and benzyl group; acyloxyl groups having 1 to 20 carbon atoms such as heptadecylcarbonyloxyl group; substituents having silicon atom such as trimethylsilyl group and (trimethylsilyl)methyl group; and Lewis bases, examples of which include ethers such as dimethyl ether, diethyl ether and tetrahydrofuran; thioethers such as tetrahydrothiophene; esters such as ethyl benzoate; nitriles such as acetonitrile and benzonitrile; amines such as trimethylamine, triethylamine, tributylamine, N,N-dimethyl-aniline, pyridine, 2,2'-bipyridine and phenanthroline; phosphines such as triethylphosphine and triphenylphosphine; chain unsaturated hydrocarbons such as ethylene, butadiene, 1-pentene, isoprene, pentadiene, 1-hexene and derivatives of these compounds; and cyclic unsaturated hydrocarbons such as benzene, toluene, xylene, cycloheptatriene, cyclooctadiene, cyclooctatriene, cyclooctatetraene and derivatives of these compounds.

Examples of the crosslinking with a covalent bond represented by A in general formula (III) include crosslinking with methylene group, crosslinking with dimethylmethylene group, crosslinking with ethylene group, crosslinking with 1,1'-cyclohexylene group, crosslinking with dimethylsilylene group, crosslinking with dimethylgermylene group and crosslinking with dimethylstannylene group.

Component (A-1)

Examples of the compound represented by general formula (I) [component (A-1)] include (1) (pentamethylcyclopentadienyl)-trimethylzirconium, (2) (pentamethylcyclopentadienyl)triphenylzirconium, (3) (pentamethylcyclopentadienyl)tribenzylzirconium, (4) (pentamethylcyclopentadienyl)trichlorozirconium, (5) (pentamethylcyclopentadienyl)trimethoxyzirconium, (6) (cyclopentadienyl)trimethylzirconium, (7) (cyclopentadienyl)triphenylzirconium, (8) (cyclopentadienyl)tribenzylzirconium, (9) (cyclopentadienyl)trichlorozirconium, (10) (cyclopentadienyl)trimethoxyzirconium, (11) (cyclopentadienyl)dimethyl(methoxy)zirconium, (12) (methylcyclopentadienyl)trimethylzirconium, (13) (methylcyclopentadienyl)triphenylzirconium, (14) (methylcyclopentadienyl)tribenzylzirconium, (15) (methylcyclopentadienyl)trichlorozirconium, (16) (methylcyclopentadienyl)dimethyl(methoxy)zirconium, (17) (dimethylcyclopentadienyl)trichlorozirconium, (18) (trimethylcyclopentadienyl)trichlorozirconium, (19) (trimethylsilylcyclopentadienyl)trimethylzirconium, (20) (tetramethylcyclopentadienyl)trichlorozirconium, (21) (octahydrofluorenyl)trimethoxyzirconium, (22) (octahydrofluorenyl)zirconium trichloride and compounds obtained by replacing zirconium in the above compounds with titanium or hafnium.

As the compound represented by general formula (I) [component (A-1)], compounds represented by general formula (I) in which the substituents on the ring represented by Cp are each independently a hydrocarbon group having 1 to 20 carbon atoms and the number of the substituent is 5 such as (1) (pentamethylcyclopentadienyl)trimethylzirconium, (2) (pentamethylcyclopentadienyl)triphenylzirconium, (3) (pentamethylcyclopentadienyl)tribenzylzirconium, (4) (pentamethylcyclopentadienyl)trichlorozirconium, (5) (pentamethylcyclopentadienyl)trimethoxyzirconium and compounds obtained by replacing zirconium in the above compounds with titanium or hafnium, which are described above, are preferable.

Component (A-2)

Examples of the compound represented by general formula (II) [component (A-2)] include (1) bis(cyclopentadienyl)dimethylzirconium, (2) bis(cyclopentadienyl)diphenylzirconium, (3) bis(cyclopentadienyl)diethylzirconium, (4) bis(cyclopentadienyl)dibenzylzirconium, (5) bis(cyclopentadienyl)dimethoxyzirconium, (6) bis(cyclopentadienyl)dichlorozirconium, (7) bis(cyclopentadienyl)dihydridozirconium, (8) bis(cyclopentadienyl)monochloromonohydridozirconium, (9) bis(methylcyclopentadienyl)dimethylzirconium, (10) bis(methylcyclopentadienyl)dichlorozirconium, (11) bis(methylcyclopentadienyl)dibenzylzirconium, (12) bis(pentamethylcyclopentadienyl)dimethylzirconium, (13) bis(pentamethylcyclopentadienyl)dichlorozirconium, (14) bis(pentamethylcyclopentadienyl)dibenzylzirconium, (15) bis(pentamethylcyclopentadienyl)chloromethylzirconium, (16) bis(pentamethylcyclopentadienyl)hydridomethylzirconium, (17) (cyclopentadienyl)(pentamethylcyclopentadienyl)dichlorozirconium, (18) bis(n-butylcyclopentadienyl)dichlorozirconium, $[(CH_3)_5C_5]_2Hf(CH_2Ph)_2$, $[(CH_3)_5C_5]_2Zr(CH_2Ph)_2$, $[(CH_3)_5C_5]_2Hf(C_6H_4\text{-p-}CH_3)_2$, $[(CH_3)_5C_5]_2Zr(C_6H_4\text{-p-}CH_3)_2$, $[(CH_3)_5C_5]_2Hf(CH_3)_2$, $[(C_2H_5)_5C_5]_2Hf(CH_3)_2$, $[(nC_3H_7)_5C_5]_2Hf(CH_3)_2$, $[(nC_3H_7)_5C_5]_2Zr(CH_3)_2$, $[(CH_3)_5C_5]_2HfH(CH_3)$, $[(CH_3)_5C_5]_2ZrH(CH_3)$, $[(C_2H_5)_5C_5]_2HfH(CH_3)$, $[(C_2H_5)_5C_5]_2ZrH(CH_3)$, $[(C_3H_7)_5C_5]_2HfH(CH_3)$, $[(C_3H_7)_5C_5]_2ZrH(CH_3)$, $[(CH_3)_5C_5]_2Hf(H)_2$, $[(CH_3)_5C_5]_2Zr(H)_2$, $[C_2H_5](CH_3)_4C_5]_2Hf(CH_3)_2$, $[(C_2H_5)(CH_3)_4C_5]_2Zr(CH_3)_2$, $[(nC_3H_7)(CH_3)_4\text{—}C_5]_2Hf(CH_3)_2$, $[(nC_3H_7)(CH_3)_4C_5]_2Zr(CH_3)_2$, $[(nC_4H_9)(CH_3)_4C_5]_2Hf(CH_3)_2$, $[(nC_4H_9)(CH_3)_4C_5]_2Zr(CH_3)_2$, $[(CH_3)_5C_5HfCl_2$, $[(CH_3)_5C_5]_2ZrCl_2$, $[(CH_3)_5C_5]_2HfH(Cl)$ and $[(CH_3)_5C_5]_2ZrH(Cl)$.

As the compound represented by general formula (II) [component (A-2)], compounds represented by general formula (II) in which the substituents on the cyclopentadienyl group are each independently a hydrocarbon group having 1 to 20 carbon atoms and the number of the substituent is 1 to 5 such as (12) bis(pentamethylcyclopentadienyl)dimethylzirconium, (13) bis(pentamethylcyclopentadienyl)dichlorozirconium, (14) bis(pentamethylcyclopentadienyl)dibenzylzirconium, (15) bis(pentamethylcyclopentadienyl)chloromethylzirconium, (16) bis(pentamethylcyclopentadienyl)hydridomethylzirconium, $[(CH_3)_5C_5]_2Hf(CH_2Ph)_2$, $[(CH_3)_5C_5]_2Zr(CH_2Ph)_2$, $[(CH_3)_5C_5]_2Hf(CH_3)_2$, $[(CH_3)_5C_5]_2HfH(CH_3)$, $[(CH_3)_5C_5]_2ZrH(CH_3)$, $[(CH_3)_5C_5]_2Hf(H)_2$, $[(CH_3)_5C_5]_2Zr(H)_2$, $[(C_2H_5)(CH_3)_4C_5]_2Hf(CH_3)_2$, $[(C_2H_5)(CH_3)_4C_5]_2Zr(CH_3)_2$, $[(nC_3H_7)\text{—}(CH_3)_4C_5]_2Hf(CH_3)_2$, $[(nC_3H_7)(CH_3)_4C_5]_2Zr(CH_3)_2$, $[n\text{-}C_4H_9](CH_3)_4C_5]_2\text{—}Zr(CH_3)_2$, $[(CH_3)_5C_5HfCl_2$, $[(CH_3)_5C_5]_2ZrCl_2$, $[(CH_3)_5C_5]_2HfH(Cl)$ and $[(CH_3)_5C_5]_2ZrH(Cl)$ are preferable.

Component (A-3)

Examples of the compound represented by general formula (III) [component (A-3)] include methylenebis(indenyl)dichlorozirconium, ethylenebis(indenyl)dichlorozirconium, ethylenebis(indenyl)monochloromonohydridozirconium, ethylenebis(indenyl)chloromethylzirconium, ethylenebis(indenyl)chloromethoxyzirconium, ethylenebis(indenyl)diethoxyzirconium, ethylenebis(indenyl)dimethylzirconium, ethylenebis(4,5,6,7-tetrahydroindenyl)dichlorozirconium, ethylenebis(2-methylindenyl)dichlorozirconium, ethylenebis(2-ethylindenyl)dichlorozirconium, ethylene(2,4-dimethylcyclopentadienyl)(3',5'-dimethylcyclopentadienyl)dichlorozirconium, ethylene(2-methyl-4-tert-butylcyclopentadienyl)(3'-tert-butyl-5'-methylcyclopentadienyl)dichlorozirconium, ethylene(2,3,5-trimethylcyclopentadienyl)(2',4',5'- trimethylcyclopentadienyl)dichlorozirconium, isopropylidenebis(indenyl)dichlorozirconium, isopropylidenebis(2,4-dimethylcyclopentadienyl)(3',5'-dimethylcyclopentadienyl)dichlorozirconium, isopropylidenebis(2-methyl-4-tert-butylcyclopentadienyl)(3'-tert-butyl-5'-methylcyclopentadienyl)dichlorozirconium, isopropylidene(cyclopentadienyl)(fluorenyl)dichlorozirconium, 17-cyclohexylidene(2,5-dimethylcyclopentadienyl)dichlorozirconium, dimethylsilylenebis(indenyl)dichlorozirconium, dimethylsilylenebis(4,5,6,7-tetrahydroindenyl)dichlorozirconium, dimethylsilylenebis(2-methylindenyl)dichlorozirconium, dimethylsilylenebis(2-methyl-4,5,6,7-tetrahydroindenyl)dichlorozirconium, dimethylsilylene(2,4-dimethylcyclopentadienyl)(3',5'-dimethylcyclopentadienyl)dichlorozirconium, phenylmethylsilylenebis(indenyl)dichlorozirconium, phenylmethylsilylenbis(4,5,6,7-tetrahydroindenyl)dichlorozirconium, phenylmethylsilylene(2,4-dimethylcyclopentadienyl)(3',5'-dimethylcyclopentadienyl)dichlorozirconium, phenylmethylsilylene(2,3,5-trimethylcyclopentadienyl)(2',4',5'-trimethylcyclopentadienyl)dichlorozirconium, diphenylenesilylenebis(indenyl)dichlorozirconium, tetramethyldisilylenebis(indenyl)dichlorozirconium, tetramethyldisilylenebis(3-methylcyclopentadienyl)dichlorozirconium, dicyclohexylsilylenebis(indenyl)dichlorozirconium, dicyclohexylsilylenebis(2-methylindenyl)dichlorozirconium, dicyclohexylsilylenebis-(2,4,7-trimethylindenyl)dichlorozirconium, dimethylgermaniumbis(indenyl)dichlorozirconium, dimethylgermanium(cyclopentadienyl)(fluorenyl)dichlorozirconium, methylaluminumbis(indenyl)dichlorozirconium, phenylaluminumbis(indenyl)dichlorozirconium, phenylphosphinobis(indenyl)dichlorozirconium, ethyleneboranobis(indenyl)dichlorozirconium, phenylaminobis(indenyl)dichlorozirconium and phenylamino(cyclopentadienyl)(fluorenyl)dichlorozirconium.

Further examples of the compound represented by general formula (III) include compounds described in Japanese Patent Application Laid-Open Nos. Heisei 6(1994)-184179 and Heisei 6(1994)-345809. Specific examples of such compounds include compounds of the benzoindenyl type and the acenaphthoindenyl type such as rac-demthylsilandiylbis-1-(2-methyl-4,5-benzoindenyl)zirconium dichloride, rac-phenylmethylsilandiylbis-1-(2-methyl-4,5-benzoindenyl)zirconium dichloride, rac-ethandiylbis-1-(2-methyl-4,5-benzoindenyl)zirconium dichloride, rac-butandiylbis-1-(2-methyl-4,5-benzoindenyl)zirconium dichloride, rac-dimethylsilandiylbis-1-(4,5-benzoindenyl)zirconium dichloride, rac-dimethylasilandiylbis-1-(2-methyl-α-methyl-α-acenaphthoindenyl) dichloride, rac-phenylmethylsilandiylbis-1-(2-methyl-α-acenaphthoindenyl)zirconium dichloride and compounds obtained by replacing zirconium in the above compounds with titanium or hafnium.

Further examples of the compound represented by general formula (III) include compounds described in Japanese Patent Application Laid-Open Nos. Heisei 4(1992)-268308, Heisei 5(1993)-306304, Heisei 6(1994)-100579, Heisei 6(1994)-157661, Heisei 7(1995)-149815, Heisei 7(1995)-188318 and Heisei 7(1995)-258321. As the above compound represented by general formula (III), compounds having hafnium as the metal represented by $M^1$, indenyl complexes substituted at the 2-position, the 4-position or the 2,4-positions and indenyl complexes having hafnium as the metal represented by $M^1$ and substituted at the 2-position, the 4-position or the 2,4-positions are preferable.

Further specific examples of the compound represented by general formula (III) include compounds substituted with an aryl group such as dimethylsilandiylbis-1-(2-methyl-4-phenylindenyl)zirconium dichloride, dimethylsilandiylbis-1-[2-methyl-4-(1-naphthyl)indenyl]zirconium dichloride, dimethylsilandiylbis-1-(2-ethyl-4-phenylindenyl)zirconium dichloride, dimethylsilandiylbis-1-[2-ethyl-4-(1-naphthyl)indenyl]zirconium dichloride, phenylmethylsilandiylbis-1-(2-methyl-4-phenylindenyl)zirconium dichloride, phenylmethylsilandiylbis-1-[2-methyl-4-(1-naphthyl)indenyl] zirconium dichloride, phenylmethylsilandiylbis-1-(2-ethyl-4-phenylindenyl)zirconium dichloride and phenylmethylsilandiylbis-1-[2-ethyl-4-(1-naphthyl)indenyl] zirconium dichloride; compounds substituted at the 2,4-positions such as rac-dimethylsilylenebis-1-(2-methyl-4-ethylindenyl)zirconium dichloride, rac-dimethylsilylenebis-1-(2-methyl-4-isopropylindenyl)zirconium dichloride, rac-dimethylsilylenebis-1-(2-methyl-4-tert-butylindenyl) zirconium dichloride, rac-phenylmethylsilylenebis-1-(2-methyl-4-isopropylindenyl)zirconium dichloride, rac-dimethylsilylenebis-1-(2-ethyl-4-methylindenyl)zirconium dichloride, rac-dimethylsilylenebis-1-(2,4,-dimethylindenyl)zirconium dichloride and rac-dimethylsilylenebis-1-(2-methyl-4-ethylindenyl)zirconium dimethyl; compounds substituted at the 4,7-positions, 2,4,7-positions or 3,4,7-positions such as rac-dimethylsilylenebis-1-(4,7-dimethylindenyl)zirconium dichloride, rac-1,2-ethandiylbis-1-(2-methyl-4,7-dimethylindenyl)zirconium dichloride, rac-dimethylsilylenebis-1-(3,4,7-trimethylindenyl)zirconium dichloride, rac-1,2-ethandiyl-bis-1-(4,7-dimethylindenyl)zirconium dichloride and rac-1,2-butandiylbis-1-(4,7-dimethylindenyl) zirconium dichloride; compounds substituted at the 2,4,6-positions such as dimethylsilandiylbis-1-(2-methyl-4,6-diisopropylindenyl)-zirconium dichloride, phenylmethylsilandiylbis-1-(2-methyl-4,6-diisopropylindenyl)zirconium dichloride, rac-diemthylsilandiylbis-1-(2-methyl-4,6-diisopropylindenyl)zirconium dichloride, rac-1,2-ethandiylbis-1-(2-methyl-4,6-diisopropylindenyl)zirconium dichloride, rac-diphenylsilandiylbis-1-(2-methyl-4,6-diisopropylindenyl)zirconium dichloride, rac-phenylmethylsilandiylbis-1-(2-methyl-4,6-diisopropylindenyl)zirconium dichloride and rac-dimethylsilandiylbis-1-(2,4,6-trimethylindenyl)zirconium dichloride; compounds substituted at the 2,5,6-positions such as rac-dimethylsilandiylbis-1-(2,5,6-trimethylindenyl)zirconium dichloride; 4,5,6,7-tetrahydroindenyl compounds such as rac-dimethysilylenbis(2-methyl-4,5,6,7-tetrahydro-1-indenyl)zirconium chloride, rac-ethylenebis(2-methyl-4,5,6,7-tetrahydro-1-indenyl) zirconium dichloride, rac-dimethylsilylenebis(2-methyl-4,5,6,7-tetrahydro-1-indenyl)zirconium dimethyl, rac-ethylenebis(2-methyl-4,5,6,7-tetrahydro-1-indenyl) zirconium dimethyl, rac-ethylenebis(4,7-dimethyl-4,5,6,7-tetrahydro-1-indenyl)zirconium dichloride; and compounds obtained by replacing zirconium in the above compounds with titanium or hafnium.

As the compound represented by general formula (III), compounds represented by the following general formula (III-a) are preferable:

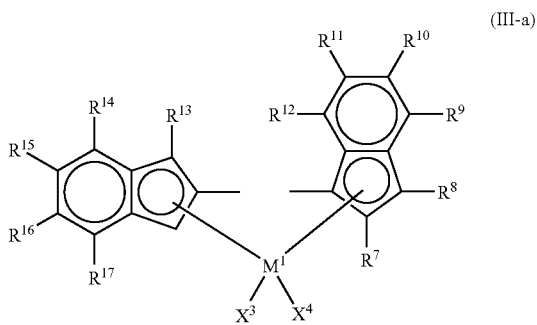

(III-a)

In the above general formula (III-a), $M^1$ represents titanium atom, zirconium atom or hafnium atom. $R^7$ to $R^{17}$, $X^3$ and $X^4$ each independently represent hydrogen atom, a halogen atom, a hydrocarbon group having 1 to 20 carbon atoms, a hydrocarbon group having 1 to 20 carbon atoms and halogen atoms, a group having silicon atom, a group having oxygen atom, a group having sulfur atom or a group having phosphorus atom. The groups represented by $R^9$ and $R^{10}$ and the groups represented by $R^{14}$ and $R^{15}$ each may be bonded to each other and form a ring. $X^3$ and $X^4$ each independently represent a halogen atom, a hydrocarbon group having 1 to 20 carbon atoms, a hydrocarbon group having 1 to 20 carbon atoms and halogen atoms, a group having silicon atom, a group having oxygen atom, a group having sulfur atom or a group having phosphorus atom. A represents a divalent crosslinking group bonding two ligands. The divalent crosslinking group is a hydrocarbon group having 1 to 20 carbon atoms, a hydrocarbon group having 1 to 20 carbon atoms and halogen atoms, a group having silicon atom, a group having a germanium atom, a group having a tin atom, —O—, —CO—, —S—, —$SO_2$—, —$NR^{18}$—, —$PR^{18}$—, —$P(O)R^{18}$—, —$BR^{18}$— or —$AlR^{18}$—, wherein $R^{18}$ represents a hydrogen atom, a halogen atom, a hydrocarbon group having 1 to 20 carbon atoms or a hydrocarbon group having 1 to 20 carbon atoms and halogen atoms.

The above transition metal compounds are complexes of the single crosslinking type.

Examples of the halogen atom represented by $R^7$ to $R^{17}$, $X^3$ or $X^4$ in the above general formula (III-a) include chlorine atom, bromine atom, fluorine atom and iodine atom. Examples of the hydrocarbon group having 1 to 20 carbon atom represented by $R^7$ to $R^{17}$, $X^3$ or $X^4$ include alkyl groups such as methyl group, ethyl group, n-propyl group, isopropyl group, n-butyl group, isobutyl group, tert-butyl group, n-hexyl group and n-decyl group; aryl groups such as phenyl group, 1-naphthyl group and 2-naphthyl group; and aralkyl groups such as benzyl group. Examples of the hydrocarbon group having 1 to 20 carbon atom and halogen atoms include groups obtained by replacing at least one hydrogen atom in the above hydrocarbon groups with a halogen atom such as trifluoromethyl group. Examples of the group having silicon atom include trimethylsilyl group and dimethyl(t-butyl)silyl group. Examples of the group having oxygen atom include methoxyl group and ethoxyl group. Examples of the group having sulfur atom include thiol group and sulfonic acid group. Examples of the group having nitrogen atom include dimethylamino group. Examples of the group having phosphorus include phenylphosphine group. The groups represented by $R^9$ and $R^{10}$ and the groups represented by $R^{14}$ and $R^{15}$ may be bonded to each other and form a ring such as the fluorene ring. It is preferable that $R^{10}$, $R^{11}$, $R^{13}$, $R^{15}$ and $R^{16}$ represent hydrogen atom. It is preferable that $R^7$, $R^8$, $R^9$, $R^{12}$, $R^{14}$ and $R^{17}$ each represent an alkyl group having 6 or less carbon atoms, more preferably methyl group, ethyl group, isopropyl group or cyclohexyl group and most preferably isopropyl group. It is preferable that $X^3$ and $X^4$ each represent a halogen atom, methyl group, ethyl group or propyl group.

Examples of the group represented by A include methylene group, ethylene group, ethylidene group, isopropylidene group, cyclohexylidene group, 1,2-cyclohexylene group, dimethylsilylene group, tetramethyldisilylene group, dimethylgermylene group, methylborylidene group ($CH_3$—B=), methylalumylidene group ($CH_3$—Al=), phenylphosphylidene group (Ph-P=), phenylphosphorydene group (PhPO=), 1,2-phenylene group, vinylene group (—CH=CH—), vinylidene group ($CH_2$=C=), methylimide group, oxygen atom (—O—) and sulfur atom (—S—). Among these groups and atoms, methylene group, ethylene group, ethylidene group and isopropylidene group are preferable for achieving the object.

$M^1$ represents titanium, zirconium or hafnium and preferably hafnium.

Specific examples of the transition metal compound represented by general formula (III-a) include 1,2-ethandiyl(1-(4,7-diisopropylindenyl))-(2-(4,7-diisopropylindenyl)) hafnium dichloride, 1,2-ethandiyl(9-fluorenyl)-(2-(4,7-diisopropylindenyl))hafnium dichloride, isopropylidene (1-(4,7-diisopropylindenyl))(2-(4,7-diisopropylindenyl) hafnium dichloride, 1,2-ethandiyl(1-(4,7-dimethylindenyl))(2-(4,7-diisopropylindenyl))hafnium dichloride, 1,2-ethandiyl(9-fluorenyl)(2-(4,7-dimethylindenyl))hafnium dichloride, isopropylidene (1-(4,7-dimethylindenyl))(2-(4,7-diispropylindenyl))hafnium dichloride and compounds obtained by replacing hafnium in the above compounds with zirconium or titanium. However, the transition metal compound represented by general formula (III-a) is not limited to the above compounds.

Component (A-4)

Component (A-4) is a transition metal compound represented by the following general formula (IV):

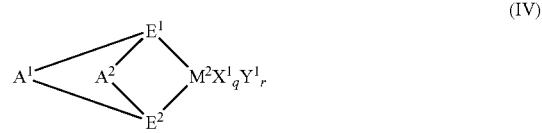

(IV)

In the above general formula (IV), $M^2$ represents titanium atom, zirconium atom or hafnium atom, $E^1$ and $E^2$ each represent a ligand selected from cyclopentadienyl group, substituted cyclopentadienyl groups, indenyl group, substituted indenyl groups, heterocyclopentadienyl groups, substituted heterocyclopentadienyl groups, amide group, phosphide group, hydrocarbon groups and groups having silicon atom, $E^1$ and $E^2$ form crosslinking structures via groups represented by $A^1$ and $A^2$, $E^1$ and $E^2$ may represent the same group or different groups, $X^1$ represents a ligand forming a σ-bond, a plurality of $X^1$ may represent the same ligand or different ligands when the plurality of $X^1$ are present, the ligand represented by $X^1$ may form a crosslinking structure in combination with another ligand represented by $X^1$, a ligand represented by $E^1$ or $E^2$ or a Lewis base represented by $Y^1$, $Y^1$ represents a Lewis base, a plurality of $Y^1$ may represent the same Lewis base or different Lewis bases when the plurality of $Y^1$ are present, the Lewis base represented by $Y^1$ may form a crosslinking structure in combination with another Lewis base represented by $Y^1$ or a ligand represented by $E^1$, $E^2$ or $X^1$, $A^1$ and $A^2$ each represent a divalent crosslinking group which bonds two ligands and is a hydrocarbon group having 1 to 20 carbon atoms, a hydrocarbon group having 1 to 20 carbon atoms and halogen atoms, a group having silicon atom, a group having a germanium atom, a group having a tin atom, —O—, —CO—, —S—, —SO$_2$—, —Se—, —NR$^4$—, —PR$^4$—, —P(O)R$^4$—, —BR$^4$— or —AlR$^4$—, q represents an integer of 1 to 5 which is [(a valence of the atom represented by $M^2$]-2] and r represents an integer of 0 to 3. In the above, $R^4$ represents a hydrogen atom, a halogen atom, a hydrocarbon group having 1 to 20 carbon atoms or a hydrocarbon group having 1 to 20 carbon atoms and halogen atoms and atoms and groups represented by a plurality of $R^4$ are the same with or different from each other, In general formula (IV), $M^2$ represents titanium atom, zirconium atom or hafnium atom and preferably zirconium atom or hafnium atom. $E^1$ and $E^2$ each represent a ligand selected from substituted cyclopentadienyl groups, indenyl group, substituted indenyl groups, heterocyclopentadienyl groups, substituted heterocyclopentadienyl groups, amide group (—N<), phosphide group (—P<), hydrocarbon groups [>CR—, >CR<] and groups having silicone atom [>SiR—, >Si<], wherein R represents hydrogen atom, a hydrocarbon group having 1 to 20 carbon atoms or a group having a heteroatom. Crosslinking structures are formed via groups represented by $A^1$ and $A^2$. The atoms or the groups represented by $E^1$ and $E^2$ may be the same with or different from each other. It is preferable that $E^1$ and $E^2$ each represent a substituted cyclopentadienyl group, indenyl group or a substituted indenyl group.

Examples of the ligand forming a σ-bond which is represented by $X^1$ include halogen atoms, hydrocarbon groups having 1 to 20 carbon atoms, alkoxyl groups having 1 to 20 carbon atoms, aryloxyl groups having 6 to 20 carbon atoms, amide groups having 1 to 20 carbon atoms, groups having 1 to 20 carbon atoms and silicon atom, phosphide groups having 1 to 20 carbon atoms, sulfide groups having 1 to 20 carbon atoms and acyl groups having 1 to 20 carbon atoms. A plurality of $X^1$ may represent the same or different ligands when the plurality of $X^1$ are present. The atoms and groups represented by $X^1$ may form a crosslinking structure in combination with another ligand represented by $X^1$, a ligand represented by $E^1$ or $E^2$ or a Lewis base represented by $Y^1$.

Examples of the Lewis base represented by $Y^1$ include amines, ethers, phosphines and thioethers. A plurality of $Y^1$ may represent the same Lewis base or different Lewis bases when the plurality of $Y^1$ are present, $Y^1$ may form a crosslinking structure in combination with another Lewis base represented by $Y^1$ or a ligand represented by $E^1$, $E^2$ or $X^1$.

It is preferable that at least one of the crosslinking groups represented by $A^1$ and $A^2$ is a crosslinking group comprising a hydrocarbon group having at least one carbon atom. Examples of the crosslinking group include groups represented by the following general formula:

wherein $R^{19}$ and $R^{20}$ each represent hydrogen atom or a hydrocarbon group having 1 to 20 carbon atoms, may represent the same atom or group or different atoms or groups and may be bonded to each other and form a cyclic structure and p represents an integer of 1 to 4. Examples of the crosslinking group include methylene group, ethylene group, ethylidene group, propylidene group, isopropylidene group, cyclohexylidene group, 1,2-cyclohexylene group and vinylidene group (CH$_2$=C=). Among these groups, methylene group, ethylene group and propylidene group are preferable. The groups represented by $A^1$ and $A^2$ may be the same with or different from each other.

When $E^1$ and $E^2$ each represent a substituted cyclopentadienyl group, indenyl group or a substituted indenyl group in general formula (IV) representing the transition metal compound, the bonds formed by the crosslinking groups $A^1$ and $A^2$ may be the double crosslinking of the (1,1')(2,2') type or the double crosslinking of the (1,2')(2,1') type. Among the transition metal compounds represented by general formula (IV), transition metal compounds having as the ligand a biscyclopentadienyl derivative of the double crosslinking type represented by the following general formula (IV-a) are preferable:

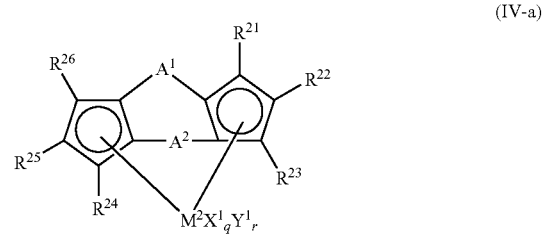

In the above general formula (IV-a), $M^2$, $X^1$, $Y^1$, $A^1$, $A^2$, q and r are the same as defined above. $X^1$ represents a ligand of the σ-bonding type. A plurality of ligands represented by $X^1$ may be the same with or different from each other when the plurality of ligands represented by $X^1$ are present. The ligand represented by $X^1$ may form a crosslinking structure in combination with another ligand represented by $X^1$ or with the Lewis base represented by $Y^1$. Examples of the ligand represented by $X^1$ include the same ligands described as the examples of the ligand represented by $X^1$ in general formula (IV). $Y^1$ represents a Lewis base. A plurality of ligands represented by $Y^1$ may be the same with or different from each other when the plurality of ligands represented by $Y^1$ are present. The ligand represented by $Y^1$ may form a crosslinking structure in combination with another Lewis base represented by $Y^1$ or with the ligand represented by $X^1$. Examples of the Lewis base represented by $Y^1$ include the same Lewis base described as the examples of the Lewis base represented by $Y^1$ in general formula (IV). $R^{21}$ to $R^{26}$ each represent hydrogen atom, a halogen atom, a hydrocarbon group having 1 to 20 carbon atoms, a hydrocarbon group having 1 to 20 carbon atoms and halogen atoms, a group having a silicon atom or a group having a heteroatom and it is necessary that at least one of $R^{21}$ to $R^{26}$ do not represent hydrogen atom. The atoms or the groups represented by $R^{21}$ to $R^{26}$ may be the same with or different from each other. Adjacent groups represented by $R^{21}$ to $R^{26}$ may be bonded to each other and form a ring.

In the transition metal compound having the biscyclopentadienyl derivative of the double crosslinking type as the ligand, the ligand may be any of the ligand of the (1,1')(2,2') double crosslinking type and the ligand of the (1,2')(2,1') double crosslinking type.

Specific examples of the transition metal compound represented by general formula (IV-a) include (1,1'-ethylene)(2,2'-ethylene)bis(indenyl)zirconium dichloride, (1,2'-ethylene)(2,1'-ethylene)bis(indenyl)zirconium dichloride, (1,1'-methylene)(2,2'-methylene)bis(indenyl)zirconium dichloride, (1,2'-methylene)(2,1'-methylene)bis(indenyl)zirconium dichloride, (1,1'-isopropylidene)(2,2'-isopropylidene)bis(indenyl)zirconium dichloride, (1,2'-isopropylidene)(2,1'-isopropylidene)bis(indenyl)zirconium dichloride, (1,1'-ethylene)(2,2'-ethylene)bis(3-methylindenyl)zirconium dichloride, (1,2'-ethylene)(2,1'-ethylene)bis(3-methylindenyl)zirconium dichloride, (1,1'-ethylene)(2,2'-ethylene)bis(4,5-benzoindenyl)zirconium dichloride, (1,2'-ethylene)(2,1'-ethylene)bis(4,5-benzoindenyl) zirconium dichloride, (1,1'-ethylene)(2,2'-ethylene)bis(4-isopropylindenyl)zirconium dichloride, (1,2'-ethylene)(2,1'-ethylene)bis(4-isopropylindenyl)zirconium dichloride, (1,1'-ethylene)(2,2'-ethylene)bis(5,6-dimethylindenyl)zirconium dichloride, (1,2'-ethylene)(2,1'-ethylene)bis(5,6-dimethylindenyl)zirconium dichloride, (1,1'-ethylene)(2,2'-ethylene)bis(4,7-diisopropylindenyl)zirconium dichloride, (1,2'-ethylene)(2,1'-ethylene)bis(4,7-diisopropylindenyl)zirconium dichloride, (1,1'-ethylene)(2,2'-ethylene)bis(4-phenylindenyl)zirconium dichloride, (1,2'-ethylene)(2,1'-ethylene)bis(4-phenylindenyl)zirconium dichloride, (1,1'-ethylene)(2,2'-ethylene)bis(3-methyl-4-isopropylindenyl)zirconium dichloride, (1,2'-ethylene)(2,1'-ethylene)-bis(3-methyl-4-isopropylindenyl)zirconium dichloride, (1,1'-ethylene)(2,2'-ethylene)bis(5,6-benzoindenyl)zirconium dichloride, (1,2'-ethylene)(2,1'-ethylene)bis(5,6-benzoindenyl)zirconium dichloride, (1,1'-ethylene)(2,2'-isopropylidene)bis(indenyl)zirconium dichloride, (1,2'-ethylene)(2,1'-isopropylidene)bis(indenyl)zirconium dichloride, (1,1'-isopropylidene)(2,2'-ethylene)bis(indenyl)zirconium dichloride, (1,2'-methylene)(2,1'-ethylene)bis(indenyl)zirconium dichloride, (1,1'-methylene)(2,2'-ethylene)bis(indenyl) zirconium dichloride, (1,1'-ethylene)(2,2'-methylene)bis(indenyl)zirconium dichloride, (1,1'-methylene)(2,2'-isopropylidene)bis(indenyl)zirconium dichloride, (1,2'-methylene)(2,1'-isopropylidene)bis(indenyl)zirconium dichloride, (1,1'-isopropylidene)(2,2'-methylene)bis(indenyl)zirconium dichloride, (1,1'-methylene)(2,2'-methylene)(3-methylcyclopentadienyl)(cyclopentadienyl)zirconium dichloride, (1,1'-isopropylidene)(2,2'-isopropylidene)(3-methylcyclopentadienyl)(cyclopentadienyl)zirconium dichloride, (1,1'-propylidene)(2,2'-propylidene)(3-methylcyclopentadienyl)(cyclopentadienyl)zirconium dichloride, (1,1'-ethylene)(2,2'-methylene)bis(3-methylcyclopentadienyl)zirconium dichloride, (1,1'-methylene)(2,2'-ethylene)bis(3-methylcyclopentadienyl)zirconium dichloride, (1,1'-isopropylidene)(2,2'-ethylene)bis(3-methylcyclopentadienyl)zirconium dichloride, (1,1'-ethylene)(2,2'-isopropylidene)bis(3-methylcyclopentadienyl)zirconium dichloride, (1,1'-methylene)(2,2'-methylene)bis(3-methylcyclopentadienyl)zirconium dichloride, (1,1'-methylene)(2,2'-isopropylidene)bis(3-methylcyclopentadienyl)zirconium dichloride, (1,1'-isopropylidene)(2,2'-isopropylidene)bis(3-methylcyclopentadienyl)zirconium dichloride, (1,1'-ethylene)(2,2'-methylene)bis(3,4-dimethylcyclopentadienyl)zirconium dichloride, (1,1'-ethylene)(2,2'-isopropylidene)bis(3,4-dimethylcyclopentadienyl)zirconium dichloride, (1,1'-methylene)(2,2'-methylene)bis(3,4-dimethylcyclopentadienyl)zirconium dichloride, (1,1'-methylene)(2,2'-isopropylidene)bis(3,4-dimethylcyclopentadienyl)zirconium dichloride, (1,1'-isopropylidene)(2,2'-isopropylidene)bis(3,4-dimethylcyclopentadienyl)zirconium dichloride, (1,2'-ethylene)(2,1'-methylene)bis(3-methylcyclopentadienyl)zirconium dichloride, (1,2'-ethylene)(2,1'-isopropylidene)bis(3-methylcyclopentadienyl)zirconium dichloride, (1,2'-methylene)(2,1'-methylene)bis(3-methylcyclopentadienyl)zirconium dichloride, (1,2'-methylene)(2,1'-isopropylidene)bis(3-methylcyclopentadienyl)zirconium dichloride, (1,2'-isopropylidene)(2,1'-isopropylidene)bis(3-methylcyclopentadienyl)zirconium dichloride, (1,2'-ethylene)(2,1'-methylene)bis(3,4-dimethylcyclopentadienyl)zirconium dichloride, (1,2'-ethylene)(2,1'-isopropylidene)bis(3,4-dimethylcyclopenadienyl)zirconium dichloride, (1,2'-methylene)(2,1'-methylene)bis(3,4-dimethylcyclopentadienyl)zirconium dichloride, (1,2'-methylene)(2,1'-isopropylidene)bis(3,4-dimethylcyclopentadienyl)zirconium dichloride, (1,2'-isopropylidene)(2,1'-isopropylidene)bis(3,4-dimethylcyclopentadienyl)zirconium dichloride and compounds obtained by replacing zirconium in the above compounds with titanium or hafnium. As the component (A-4), two or more of the above compounds may be used in combination.

Component (A-5)

Component (A-5) is a transition metal compound represented by the following general formula (V):

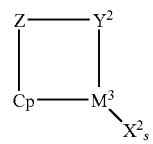

(V)

In the above general formula (V), $M^3$ represents a titanium atom, a zirconium atom or a hafnium atom, Cp represents a cyclic unsaturated hydrocarbon group, a cyclopentadienyl group, a substituted cyclopentadienyl group, an indenyl group, a substituted indenyl group, a tetrahydroindenyl group, a substituted tetrahydroindenyl group, a fluorenyl group or a substituted fluorenyl group, $X^2$ represents hydrogen atom, a halogen atom, an alkyl group comprising 1 to 20 carbon atoms, an aryl group comprising 6 to 20 carbon atoms, an alkylaryl group comprising 6 to 20 carbon atoms, an arylalkyl group comprising 6 to 20 carbon atoms or an alkoxyl group having 1 to 20 carbon atoms, Z represents $SiR^5_2$, $CR^5_2$, $SiR^5_2SiR^5_2$, $CR^5_2CR^5_2$, $CR^5_2CR^5_2CR^5_2$, $CR^5=CR^5$, $CR^5_2SiR^5_2$ or $GeR^5_2$, $Y^2$ represents —N($R^6$)—, —O—, —S— or —P($R^6$)—, and s represents a number of 1 or 2. In the above, $R^5$ represents an alkyl group, an aryl group, a silyl group, a halogenated alkyl group or a halogenated aryl group each having hydrogen atom or 20 or less atoms which are not hydrogen atom or a group comprising a combination of these groups, and $R^6$ represents an alkyl group comprising 1 to 10 carbon atoms, an aryl group comprising 6 to 10 carbon atoms or a cyclic system comprising at least one group represented by $R^5$ group and 30 or less atoms which are not hydrogen atom.

Examples of the compound represented by the above general formula (V) include (tertiary-butylamido)(tetramethyl-$\eta^5$-cyclopentadienyl)-1,2-ethandiylzirconium dichloride, (tertiary-butylamido)(tetramethyl-$\eta^5$-cyclopentadienyl)-1,2-ethandiyltitanium dichloride, (methylamido)(tetramethyl-$\eta^5$-cyclopentadienyl)-1,2-ethandiylzirconium dichloride, (methylamido)(tetramethyl-$\eta^5$-cyclopentadienyl)-1,2-ethandiyltitanium dichloride, (ethylamido)(tetramethyl-$\eta^5$-cyclopentadienyl)methylenetitanium dichloride, (tertiary-butylamido)dimethyl(tetramethyl-$\eta^5$-cyclopentadienyl)silanetitanium dichloride, (tertiary-butylamido)dimethyl (tetramethyl-$\eta^5$-cyclopentadienyl)silanezirconium dibenzyl, (benzylamido)dimethyl(tetramethyl-$\eta^5$-cyclopentadienyl) silanetitanium dichloride and (phenylphosphido)dimethyl (tetramethyl-$\eta^5$-cyclopentadienyl)silanezirconium dibenzyl. As component (A-5), it is preferable that $M^3$ represents titanium. Two or more of the above compounds may be used in combination as component (A-5).

In processes I and II of the present invention, any of components (A-1) to (A-5) is preferable for producing a polyolefin-based resin composition comprising units of ethylene and propylene in an amount exceeding 50% by mole; components (A-1), (A-3), (A-4) and (A-5) are preferable for producing a polyolefin-based resin composition comprising units of α-olefins having 4 to 20 carbon atoms in an amount exceeding 50% by mole; components (A-1), (A-3), (A-4) and (A-5) are preferable for producing a polyolefin-based resin composition comprising units of styrenes in an amount exceeding 50% by mole; and components (A-1), (A-2), (A-3) and (A-5) are preferable for producing a polyolefin-based resin composition comprising units of cyclic olefins in an amount exceeding 50% by mole. Tow or more components (A-1) to (A-5) may be used in combination.

In processes I and II of the present invention, the efficiency of formation of graft copolymers can be increased and the polyolefin-based resin composition can be produced more effectively by using as catalyst component (A) a component which forms a polymer comprising vinyl group at the chain ends in an amount of 20% by mole or more based on the entire amount of the unsaturated groups. When the amount of vinyl group at the chain ends is less than 20% by mole based the entire amount of the unsaturated groups, there is the possibility that the efficiency of formation of the graft copolymer decreases. It is preferable that the amount of vinyl group at the chain ends is 25% by mole or more, more preferably 30% by mole or more, still more preferably 40% by mole or more and most preferably 50% by mole or more, based on the entire amount of the unsaturated groups.

As the process for forming vinyl groups at the chain ends and forming long chain branches, it is advantageous, for example, that (i) hafnium compounds exhibiting the excellent property of forming vinyl group at the chain ends among the preferable examples of catalyst component (A) are used as a mixture with other transition metal compounds of titanium or zirconium.

It is also advantageous that (ii) the polymerization is conducted under the condition which tends to form vinyl group at the chain ends and the formed polymer having vinyl group at the chain ends is copolymerized with a monomer.

As for the condition which tends to form vinyl group at the chain ends, for example, ethylene or propylene is contained as the essential component in the monomers and the polymerization is conducted under a low concentration of the monomer, i.e., under a pressure of the ordinary pressure to about 0.3 MPa.

It is also advantageous that (iii) a macro monomer having vinyl group at the chain ends is prepared in advance and directly copolymerized. In the above processes (i) to (iii), a small amount of a polyene may be contained as long as insoluble and infusible components are not formed as byproducts.

In processes I and II of the present invention, at least one substance selected from aluminoxanes as component (B-1), ionic compounds as component (B-2) which can be converted into a cation by a reaction with the transition metal compound and clay, clay minerals and ion exchangeable lamellar compounds as component (B-3) is used as the promoter component (B).

Examples of the aluminoxane as component (B-1) include chain aluminoxanes represented by the following general formula (VI):

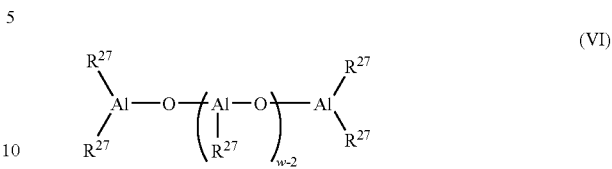

(VI)

wherein $R^{27}$ represents a hydrocarbon group having 1 to 20 carbon atoms and preferably 1 to 12 carbon atoms such as an alkyl group, an alkenyl group, aryl group and arylalkyl group or a halogen atom, w represents the average degree of polymerization which is an integer, in general, in the range of 2 to 50 and preferably in the range of 2 to 40, and the atoms or the groups represented by the plurality of $R^{27}$ may the same with or different from each other; and cyclic aluminoxanes represented by the following general formula (VII):

(VII)

wherein $R^{27}$ and w are as defined for general formula (VI).

As the process for producing the aluminoxane described above, for example, an alkylaluminum is brought into contact with a condensation agent such as water. The process for conducting the reaction is not particularly limited and the reaction can be conducted in accordance with a conventional process. Examples of the process include (i) a process in which an organoaluminum compound is dissolved into an organic solvent and the obtained solution is brought into contact with water, (ii) a process in which an organoaluminum compound is added to the polymerization system in advance and water is added later, (iii) a process in which crystal water contained in metal salts or adsorbed water contained in inorganic compounds and organic compounds is reacted with an organoaluminum compound, and (iv) a process in which a tetraalkyldialuminoxane is brought into reaction with a trialkylaluminum and then with water.

The aluminoxane may be insoluble or soluble in hydrocarbon solvents. It is preferable that the aluminoxane is soluble in hydrocarbon solvents and the amount of the residual organoaluminum compounds (compounds other than the aluminoxane) is 10% by weight or less, more preferably 3 to 5% by weight or less and most preferably 2 to 4% by weight or less as measured in accordance with $^1$H-NMR. It is preferable that the above aluminoxane is used since the fraction of the aluminoxane supported on a carrier (occasionally referred to as the supported fraction) increases. Since the aluminoxane is soluble in hydrocarbon solvents, another advantage is found in that the aluminoxane which is not supported can be recycled and reused. Still another advantage is found in that the aluminoxane does not require any additional treatments before the use since the properties of the aluminoxane are stable. Still another advantage is found in that the average particle diameter and the distribution of the particle diameter (occasionally, referred to as the morphology) of the polyolefin obtained by the polymerization are improved. When the amount of the residual organoaluminum compounds (compounds other than the aluminoxane) exceeds 10% by weight, the supported fraction decreases and the polymerization activity occasionally decreases.

To obtain the aluminoxane, for example, a solution containing the aluminoxane is heated under a reduced pressure and the solvent is removed to obtain a dry product (occasionally, referred to as the dry-up process). In the dry-up process, it is preferable that the solvent is removed under a reduced pressure by heating at a temperature of 80° C. or lower and more preferably 60° C. or lower.

To remove components insoluble in hydrocarbon solvents from the aluminoxane, for example, components insoluble in hydrocarbon solvents may be spontaneously precipitated and separated by decantation. The precipitates may be removed by centrifugation. It is preferable that a G5 glass filter under a nitrogen stream further filters the recovered soluble component since the insoluble components are more thoroughly removed. The aluminoxane obtained as described above occasionally shows an increase in the amount of gel components with the passage of time. It is preferable that the aluminoxane is used within 48 hours and, more preferably, immediately after being prepared. The relative amounts of the aluminoxane and the hydrocarbon solvent are not particularly limited. It is preferable that the aluminoxane is used in a concentration such that the amount of the aluminum atom in the aluminoxane is 0.5 to 10 moles per 1 liter of the hydrocarbon solvent.

Examples of the hydrocarbon solvent used above include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; and petroleum fractions such as naphtha, kerosene and light gas oil.

As component (B-2), any ionic compound can be used as long as the ionic compound can be converted into a cation by the reaction with the transition metal compound described above. From the standpoint of efficiently forming the active point of the polymerization, compounds represented by the following general formulae (VIII) and (IX):

$$([L^1\text{-}R^{28}]^{h+})_p([Z]^-)_b \quad \text{(VIII)}$$

$$([L^2]^{h+})_a([Z]^-)_b \quad \text{(IX)}$$

can be advantageously used. In the above formulae (VIII) and (IX), $L^2$ represents $M^6$, $R^{29}R^{30}M^6R^{31}{}_3C$ or $R^{32}M^6$, $L^1$ represents a Lewis base, and $[Z]^-$ represents a non-coordinating anion represented by $[Z^1]^-$ or $[Z^2]^-$. $[Z^1]^-$ represents an anion in which a plurality of groups are bonded to an element, i.e., $[M^4G^1G^2 \ldots G^f]$, wherein $M^4$ represents an element of Groups 5 to 15 and preferably Groups 13 to 15 of the Periodic Table, $G^1$ to $G^f$ each represent a halogen atom, an alkyl group having 1 to 20 carbon atoms, a dialkylamino group having 2 to 40 carbon atoms, an alkoxyl group having 1 to 20 carbon atoms, an aryl group having 6 to 20 carbon atoms, an aryloxyl group having 6 to 20 carbon atoms, an alkylaryl group having 7 to 40 carbon atoms, an arylalkyl group having 7 to 40 carbon atoms, a hydrocarbon group having 1 to 20 carbon atoms and substituted with halogen atoms, an acyloxyl group having 1 to 20 carbon atoms, an organometalloid group or a hydrocarbon group having 2 to 20 carbon atoms and heteroatoms. Two or more groups represented by $G^1$ to $G^f$ may be bonded to each other and form a ring. f represents an integer expressing [(the valence of the central metal represented by $M^4$)+1]. $[Z^2]^-$ represents a Brønsted acid alone which has a value of (pKa), i.e., the logarithms of the inverse of the acid dissociation constant, of −10 or smaller, a conjugate base as a combination of a Brønsted acid and a Lewis acid or a conjugate base generally defined as a very strong acid. A Lewis base may be coordinated. $R^{28}$ represents hydrogen atom, an alkyl group having 1 to 20 carbon atoms or an aryl group, an alkylaryl group or an arylalkyl group each having 6 to 20 carbon atoms. $R^{29}$ and $R^{30}$ each represent cyclopentadienyl group, a substituted cyclopentadienyl group, indenyl group or fluorenyl group. $R^{31}$ represents an alkyl group having 1 to 20 carbon atoms, an aryl group, an alkylaryl group or an arylalkyl group. $R^{32}$ represents a ligand having a great ring such as tetraphenylporphyrin and phthalocyanine. h represents the ion value of $[L^1\text{-}R^{28}]$ or $[L^2]$ which is an integer of 1 to 3, a represents an integer of 1 or greater, and b=(h×a). The element represented by $M^5$ include elements of Groups 1 to 3, 11 to 13 and 17 of the Periodic Table. $M^6$ represents an element of Groups 7 to 12 of the Periodic-Table.

Examples of the Lewis base represented by $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline; phosphines such as triethylphoshine, triphenylphosphine and diphenylphosphine; thioethers such as tetrahydrothiophene; esters such as ethyl benzoate; and nitriles such as acetonitrile and benzonitrile.

Examples of the atom and the group represented by $R^{28}$ include hydrogen atom, methyl group, ethyl group, benzyl group and trityl group. Examples of the group represented by $R^{29}$ and $R^{30}$ include cyclopentadienyl group, methylcyclopentadienyl group, ethylcyclopentadienyl group and pentamethylcyclopentadienyl group. Examples of the group represented by $R^{31}$ include phenyl group, p-tolyl group and p-methoxyphenyl group. Examples of the ligand represented by $R^{32}$ include tetraphenylporphyrin, phthalocyanine, allyl and methallyl. Examples of the element represented by $M^5$ include Li, Na, K, Ag, Cu, Br, I and $I_8$. Examples of the element represented by $M^6$ include Mn, Fe, Co, Ni and Zn.

Examples of the element represented by $M^4$ in $[Z^1]^-$, i.e., $[M^4G^1G^2 \ldots G^f]$, include B, Al, Si, P, As and Sb and preferably B and Al. Examples of the atom and the group represented by $G^1$ to $G^f$ include dialkylamino groups such as dimethylamino group and diethylamino group; alkoxyl groups and aryloxyl groups such as methoxyl group, ethoxyl group, n-butoxyl group and phenoxyl group; hydrocarbon groups such as methyl group, ethyl group, n-propyl group, isopropyl group, n-butyl group, isobutyl group, n-octyl group, n-eicosyl group, phenyl group, p-tolyl group, benzyl group, 4-t-butylphenyl group and 3,5-dimethylphenyl group; halogen atoms such as fluorine atom, chlorine atom, bromine atom and iodine atom; hydrocarbon groups having heteroatoms such as p-fluorophenyl group, 3,5-difluorophenyl group, pentachlorophenyl group, 3,4,5-trifluorophenyl group, pentafluorophenyl group, 3,5-bis(trifluoromethyl)phenyl group and bis(trimethylsilyl)methyl group; and organometalloid groups such as pentamethylantimony group, trimethylsilyl group, trimethylgermyl group, diphenylarsine group, dicyclohexylantimony group and diphenylboron group.

Examples of the Brønsted acid having a value of (pKa) of −10 or smaller alone and the conjugate base as a combination of a Brønsted acid and a Lewis acid, which are non-coordinating anion and represented by $[Z^2]^-$, include trifluoromethanesulfonic acid anion $(CF_3SO_3)^-$, bis(trifluoromethanesulfonyl)methyl anion, bis(trifluoromethanesulfonyl)benzyl anion, bis (trifluoromethanesulfonyl)amide, perchlorate anion (ClO4)$^-$, trifluoroacetate anion (CF$_3$CO$_2$)$^-$, hexafluoroantimony anion (SbF$_6$)$^-$, fluorosulfonate anion (FSO$_3$)$^-$ chlorosulfonate anion (ClSO$_3$)$^-$, fluorosulfonate anion/antimony pentafluoride (FSO$_3$/SbF$_5$)$^-$, fluorosulfonate anion/arsenic pentafluoride (FSO$_3$/AsF$_5$)$^-$ and trifluoromethanesulfonate anion/antimony pentafluoride (CF$_3$.SO$_3$/SbF$_5$)$^-$.

Examples of the compounds as component (B-2) include triethylammonium tetraphenylborate, tri-n-butylammonium tetraphenylborate, trimethylammonium tetraphenylborate, tetraethylammonium tetraphenylborate, methyl(tri-n-butylammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis(pentafluorophenyl)borate, tri-n-butylammonium tetrakis(pentafluorophenyl)borate, triphenylammonium tetrakis(pentafluorophenyl)borate, tetra-n-butylammonium tetrakis(pentafluorophenyl)borate, tetraethylammonium tetrakis(pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium) tetrakis(pentafluorophenyl)borate, benzyl(2-cyanopyridinium) tetrakis(pentafluorophenyl)borate, methyl(4-cyanopyridinium) tetrakis(pentafluorophenyl)borate, triphenylphosphonium tetrakis(pentafluorophenyl)borate, dimethylanilinium tetrakis [bis(3,5-ditrifluoromethyl)phenyl]borate, ferrocenium tetraphenylborate, silver tetraphenylborate, trityl tetraphenylborate, tetraphenylporphyrinmanganese tetraphenylborate, ferrocenium tetrakis(pentafluorophenyl)borate, (1,1'-dimethylferrocenium) tetrakis(pentafluorophenyl)borate, decamethylferrocenium tetrakis(pentafluorophenyl)borate, silver tetrakis(pentafluorophenyl)borate, trityl tetrakis(pentafluorophenyl)borate, lithium tetrakis(pentafluorophenyl)borate, sodium tetrakis(pentafluorophenyl)borate, tetraphenylporphyrinmanganese tetrakis(pentafluorophenyl)borate, silver tetrafluoroborate, silver hexafluorophosphate, silver hexafluoroarsenate, silver perchlorate, silver trifluoroacetate and silver trifluoromethanesulfonate. As component (B-2), the boron compounds described above are preferable.

The ionic compound as component (B-2) that can be converted into a cation by the reaction with the transition metal compound of catalyst component (A) may be used singly or in combination of two or more.

As the clay, the clay mineral and the ion exchangeable lamellar compound as component (B-3), the following substances are preferable.

(i) Clay and Clay Minerals

The clay is a substance which is an aggregate of fine silicate minerals containing water, shows plasticity when it is mixed with a suitable amount of water and rigidity when it is dried and is sintered when it is incinerated at a high temperature. The clay mineral is the silicate mineral containing water and constitutes the main component of the clay.

(ii) Ion Exchangeable Lamellar Compound

The ion exchangeable lamellar compound is a compound having a crystal structure in which surfaces constituted with the ionic bond are laid in parallel layers by a weak bonding force and the ions contained in the structure can be exchanged. Some of the clay minerals are the ion exchangeable lamellar compound.

Examples of the clay mineral include phyllosilicic acids. Examples of the phyllosilicic acids include phyllosilisic acid and phyllosilicates. Examples of the phyllosilicate include natural substances such as montmorillonite, saponite and hectorite which belong to the group of smectite, illite and sericite which belong to the group of mica and mixed lamellar minerals containing minerals belonging to the groups of smectite and mica or minerals belonging to the groups of mica and vermiculite.

Further examples of the phyllosilicate include synthetic substances such as fluorine tetrasilicon mica, laponite and smecton.

Further examples of the ion exchangeable lamellar compound include ionic crystalline compounds having a lamellar crystalline structure which are not clay minerals, such as α-Zr(HPO$_4$)$_2$, γ-Zr(HPO$_4$)$_2$, α-Ti(HPO$_4$)$_2$ and γ-Ti(HPO$_4$)$_2$.

Examples of the substance of component (B-3) which is clay or a clay mineral and does not belong to the ion exchangeable lamellar compound include clay called bentonite due to the small content of montmorillonite, Kibushi clay containing montmorillonite and many other components, Gairome clay, sepiolite and palygorskite having the fiber-like form, and allophane and imogolite which are amorphous or slightly crystalline.

(iii) In processes I and II of the present invention, it is also preferable that component (B-3) is subjected to a chemical treatment before being brought into contact with catalyst component (A), components (B-1) and (B-2) and component (C) described later from the standpoint of the removal of impurities from the clay, the clay mineral and the ion exchangeable lamellar compound or the change in the structure of these substances.

The chemical treatment means treatments of the surface to remove impurities attached to the surface and treatments affecting the crystal structure of the clay. Examples of the chemical treatment include treatments with acids, alkalis, salts and organic substances.

By the treatment with an acid, impurities on the surface are removed and, moreover, the surface area is increased by elution of cations in the crystal structure such as aluminum, iron and magnesium. By the treatment with an alkali, the crystal structure of the clay is destroyed and the structure of the clay is changed. By the treatment with a salt or an organic substance, an ion complex, a molecular complex or an organic complex is formed and the surface area and the distance between layers can be changed. By utilizing the property of ion exchange, exchangeable ions between the layers are replaced with other bulky ions and a modified lamellar substance having an increased distance between layers can be obtained.

(iv) Component (B-3) described above may be used without any treatments, may be used after adsorption of water by adding water or may be used after dehydration by heating.

(v) Component (B-3) described above may be used after being further treated with an organoaluminum compound and/or an organosilane compound.

(vi) As Component (B-3), clay and clay minerals are preferable, phyllosilicic acids are more preferable, smectites are still more preferable and montmorillonite is most preferable.

When the aluminoxane as component (B-1), the ionic compound which can be converted into a cation by the reaction with the transition metal compound as component (B-2) or the clay, the clay mineral or the ion exchangeable lamellar compound as component (B-3) is used as promoter component (B), component (B-1) may be used singly or as a combination of two or more types of component (B-1), component (B-2) may be used singly or as a combination of two or more types of component (B-2), or component (B-3) may be used singly or as a combination of two or more types of Component (B-3). A suitable combination of component (B-1) with component (B-2) and component (b-3) may be used as promoter component (B).

The catalyst used in processes I and II of the present invention may comprise an organoaluminum compound as component (C).

As the organoaluminum compound as component (C), compounds represented by the following general formula (X) is used.:

$$R^{40}{}_v AlQ_{3-v} \qquad (X)$$

In the above general formula (X), $R^{40}$ represents an alkyl group having 1 to 10 carbon atoms, Q represents hydrogen atom, an alkoxyl group having 1 to 20 carbon atoms, an aryl group having 6 to 20 carbon atoms or a halogen atom, and v represents an integer of 1 to 3.

Examples of the compound represented by general formula (X) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride and ethylaluminum sesquichloride.

The organoaluminum compound may be used singly or in combination of two or more.

When component (B-1) is used as the promoter component (B), it is preferable that the ratio of the amount by mole of catalyst component (A) to the amount by mole of promoter component (B) is in the range of 1:1 to $1:10^6$ and more preferably in the range of 1:10 to $1:10^4$. When the ratio of the amounts is outside the above range, the cost of the catalyst per the unit weight of the polymer increases and the amounts are not practical. When component (B-2) is used as the promoter component (B), it is preferable that the ratio of the amount by mole of catalyst component (A) to the amount by mole of promoter component (B) is in the range of 10:1 to 1:100 and more preferably in the range of 1:0.5 to 1:10. When the ratio of the amounts is outside the above range, the cost of the catalyst per the unit weight of the polymer increases and the amounts are not practical. When component (B-3) is used as promoter component (B), it is preferable that the amount by mole of catalyst component (A) is in the range of $0.01 \times 10^{-6}$ to $1 \times 10^{-4}$ and more preferably in the range of $0.1 \times 10^{-6}$ to $0.5 \times 10^{-4}$ per 1 g of component (B-3). When the amount is outside the above range, the cost of the catalyst per the unit weight of the polymer increases and the amounts are not practical.

It is preferable that the ratio of the amount by mole of catalyst component (A) to the amount by mole of the organoaluminum compound as component (C) which is used where desired is in the range of 1:1 to 1:20,000, more preferably in the range of 1:5 to 1:2,000 and most preferably in the range of 1:10 to 1:1,000. The activity of the catalyst per 1 g of the transition metal compound can be improved by using the organoaluminum compound. However, when the amount of the organoaluminum is excessively great and, in particular, when the amount of the organoaluminum compound exceeds the above range, the excess amount of the organoaluminum compound is not effectively used and remains in the polymer in a great amount. An excessively small amount of the organoaluminum compound is not preferable since the sufficient activity of the catalyst is not obtained, occasionally.

In processes I and II of the present invention, at least one of the catalyst components may be supported on a suitable carrier. The type of the carrier is not particularly limited and any of carriers of inorganic oxides, other inorganic carriers and organic carriers can be used. From the standpoint of the control of the morphology, carriers of inorganic oxides and other inorganic carriers are preferable.

Examples of the carrier of an inorganic oxide include $SiO_2$, $Al_2O_3$, MgO, $ZrO_2$, $TiO_2$, $Fe_2O_3$, $B_2O_3$, CaO, ZnO, BaO, $ThO_2$ and mixtures of these compounds such as silica alumina, zeolite, ferrite and glass fiber. Among these carriers, $SiO_2$ and $Al_2O_3$ are preferable. The above carriers may comprise small amounts of carbonates, nitrates and sulfates.

Examples of the carrier other than those described above include magnesium compounds represented by the general formula $MgR^{41}{}_x X^7{}_y$, such as $MgCl_2$ and $Mg(OC_2H_5)_2$ and complex salts thereof. In the general formula, $R^{41}$ represents an alkyl group having 1 to 20 carbon atoms, an alkoxyl group having 1 to 20 carbon atoms or an aryl group having 6 to 20 carbon atoms; $X^7$ represents a halogen atom or an alkyl group having 1 to 20 carbon atoms; x represents a number of 0 to 2, y represents a number of 0 to 2, and x+y=2. A plurality of the groups or the atoms represented by $R^{41}$ or $X^7$ may be the same with or different from each other when the plurality of the groups or the atoms are present.

Examples of the organic carrier include polymers such as polystyrene, styrene-divinylbenzene copolymers, polyethylene, polypropylene and polyarylates; starch; and carbon black.

As the carrier used in processes I and II of the present invention, $MgCl_2$, $MgCl(OC_2H_5)$, $Mg(OC_2H_5)_2$, $SiO_2$ and $Al_2O_3$ are preferable. The form of the carrier is different depending on the type and the process of production. The average diameter of the particles is, in general, in the range of 1 to 300 μm, preferably in the range of 10 to 200 μm and more preferably in the range of 20 to 100 μm.

When the particle diameter is excessively small, fine particles in the polymer increases. When the particle diameter is excessively great, rough grains in the polymer increases and causes a decrease in the bulk density and clogging in the hopper.

The specific surface area of the carrier is, in general, in the range of 1 to 1,000 $m^2/g$ and preferably in the range of 50 to 500 $m^2/g$. The pore volume is, in general, in the range of 0.1 to 5 $cm^3/g$ and preferably in the range of 0.3 to 3 $cm^3/g$.

When any of the specific surface area and the pore volume is outside the above range, the activity of the catalyst occasionally decreases. The specific surface area and the pore volume can be obtained, for example, from the volume of the nitrogen gas adsorbed in accordance with the BET method (refer to J. Am. Chem. Soc., volume 60, page 309 (1983)).

When the above carrier is an inorganic carrier, it is preferable that the carrier is used after incineration at a temperature, in general, in the range of 100 to 1,000° C. and preferably in the range of 130 to 800° C.

When at least one of the catalyst components is supported on the above carrier, it is preferable from the standpoint of the control of the morphology and the adaptation to the process such as the gas phase polymerization that both of catalyst component (A) and promoter component (B) are supported.

The process for supporting at least one of catalyst component (A) and promoter component (B) on the carrier is not particularly limited. Examples of the process include (i) a process in which at least one of catalyst component (A) and promoter component (B) is mixed with the carrier; (ii) a process in which the carrier is treated with the organoaluminum compound or the silicon compound having halogen atoms and the treated compound is mixed with at least one of catalyst component (A) and promoter component (B); (iii) a process in which the carrier and at least one of catalyst component (A) and promoter component (B) is reacted with the organoaluminum compound or the silicon compound having halogen atoms; (iv) a process in which, after catalyst component (A) or promoter component (B) is supported on, the supported component is mixed with promoter component (B) or catalyst component (A); (v) a process in which a product of the catalytic reaction between catalyst component (A) and promoter component (B) is mixed with the carrier; and (vi) a process in which the catalytic reaction between catalyst component (A) and promoter component (B) is conducted in the presence of the carrier.

The organoaluminum compound of component (C) may be added in the reaction of processes (iv) to (vi).

In processes I and II of the present invention, it is preferable that the ratio of the amount by weight of component (B-1) to the amount by weight of the carrier is in the range of 1:0.5 to 1:1,000 and more preferably in the range of 1:1 to 1:50. It is preferable that the ratio of the amount by weight of component (B-2) to the amount by weight of the carrier is in the range of 1:5 to 1:10,000 and more preferably in the range of 1:10 to 1:500. It is preferable that the ratio of the amount by weight of component (B-3) to the amount by weight of the carrier is in the range of 1:0.1 to 1:2,000 and more preferably in the range of 1:0.5 to 1:1,000. When two or more types of promoter component (B) are mixed together, it is preferable that the ratio of the amount by weight of each promoter component (B) to the amount by weight of the carrier is in the above range. It is preferable that the ratio of the amount by weight of catalyst component (A) to the amount by weight of the carrier is in the range of 1:5 to 1:10,000 and more preferably in the range of 1:10 to 1:500.

When the ratio of the amount of promoter component (B) [component (B-1), component (B-1) or component (B-3)] to the amount of the carrier or the ratio of the amount of catalyst component (A) to the amount of the carrier is outside the above range, the activity of the catalyst occasionally decreases. The average particle diameter of the polymerization catalyst prepared as described above is, in general, in the range of 2 to 200 μm, preferably in the range of 10 to 150 μm and more preferably in the range of 20 to 100 μm. The specific surface area is, in general, in the range of 20 to 1,000 m$^2$/g and preferably in the range of 50 to 500 m$^2$/g. When the average particle diameter is smaller than 2 μm, fine particles in the polymer occasionally increase. When the particle diameter exceeds 200 μm, rough grains in the polymer occasionally increase. When the specific surface area is smaller than 20 m$^2$/g, the activity occasionally decreases. When the specific surface area exceeds 1,000 m$^2$/g, the bulk density of the polymer occasionally decreases. In the above polymerization catalyst, it is preferable that the amount of the transition metal in 100 g of the carrier is, in general, in the range of 0.05 to 20 g and more preferably in the range of 0.1 to 10 g. When the amount of the transition metal is outside the above range, the activity occasionally decreases. By carrying the catalyst components on the carrier, the polyolefin-based resin composition having the industrially advantageous bulk density and the excellent distribution of the particle diameter can be obtained.

Catalyst component (A), promoter component (B) and, where necessary, component (C) and/or the carrier are brought into contact with each other under an atmosphere of an inert gas in the solvent of a hydrocarbon such as pentane, hexane, heptane, toluene and cyclohexane. The temperature of the contact is in the range of −30° C. to the boiling point of the solvent and preferably in the range of −10 to 100° C. The time of the contact is, in general, in the range of 30 seconds to 10 hours. After the above components are brought into contact with each other, the solid components of the catalyst may be washed or not washed. When the above components are brought into contact with each other and two different transition metal compounds are used as catalyst component (A), any one of the two different transition metal compounds may be used before the other or the two compounds may be used after being mixed in advance.

The catalysts obtained as described above may be used for the polymerization after the solvent is removed by distillation and the solid is isolated or without any further treatments.

In processes I and II of the present invention, the catalyst can be formed by conducting the operation of supporting at least one of the components (A) and (B) on the carrier in the polymerization system. For example, at least one of catalyst components (A) and promoter component (B), the carrier and, where necessary, the organoaluminum compound of component (C) may be added to the reaction system and the catalyst may be obtained by preliminarily polymerizing the olefin. Examples of the olefin used for the preliminary polymerization include ethylene and α-olefins having 3 to 20 carbon atoms such as propylene, 1-butene, 1-pentene, 4-methyl-1-pentene, 1-hexene, 1-octene, 1-decene, 1-dodecene and 1-tetradecene. Among these olefins, a combination comprising ethylene, propylene or the α-olefin used for the copolymerization of ethylene and propylene is preferable. As the inert hydrocarbon solvent, the inert hydrocarbons described as the examples of the inert hydrocarbons used for the preparation of the solid catalyst components can be used. In the preliminary polymerization, the catalyst is used in an amount such that the amount of the transition metal is, in general, in the range of $10^{-6}$ to $2 \times 10^{-2}$ moles/liter (of the solvent) and preferably in the range of $5 \times 10^{-6}$ to $2 \times 10^{-2}$ moles/liter (of the solvent). The ratio (Al/transition metal) of the amount by atom of aluminum in the organoaluminum compound such as methylaluminoxane (occasionally, referred to as MAO) to the amount by atom of the transition metal is, in general, in the range of 10 to 5,000 and preferably in the range of 20 to 1,000. The ratio of the amount by atom of the aluminum atom in the organoaluminum compound used where necessary to the amount by atom of the aluminum atom in MAO is, in general, in the range of 0.02 to 3 and preferably in the range of 0.05 to 1.5. The time of the preliminary polymerization is, in general, in the range of 0.5 to 100 hours and preferably in the range of about 1 to 50 hours. In the present invention, the catalyst obtained by preliminarily polymerizing the olefin is preferable.

When the catalyst is prepared using the above components, it is preferable that the operation of bringing the components into contact with each other is conducted under the atmosphere of an inert gas such as the nitrogen gas. The catalyst components prepared in the preparation device among a tank for catalyst preparation in advance may be directly used for the copolymerization. When the catalyst is prepared in the polymerization reactor, it is preferable that the preparation is conducted at a temperature which is the temperature of the polymerization of an aromatic vinyl compound or lower, for example, at a temperature in the range of −30 to 200° C. and preferably in the range of 0 to 80° C.

It is preferable that the ratio of the amount by mole of the organometallic compound having oxygen atom as component (B-1) to the amount by mole of the organic transition metal compound of catalyst component (A) is in the range of 1:0.1 to 1:100,000 and more preferably in the range of 1:0.5 to 1:10,000. It is preferable that the ratio of the amount by mole of the compound as component (B-2) which forms an ionic complex by the reaction with the organic transition metal compound to the amount by mole of catalyst component (A) is in the range of 1:0.1 to 1:1,000 and more preferably in the range of 1:1 to 1:100. The amount of catalyst component (A) per the unit weight (g) of the clay, the clay mineral or the ion exchangeable lamellar compound as component (B-3) is in the range of 0.1 to 1,000 micromoles and preferably in the range of 1 to 200 micromoles. The ratio of the amount by mole of the organometallic compound as component (C) to the amount by mole of the organic transition metal compound of catalyst component (A) is in the range of 1:1 to 1:100,000 and preferably in the range of 1:10 to 1:10,000.

The polymerization catalyst used in the present invention may be a solid catalyst in which at least one of catalyst component (A), component (B-1), component (B-2) and component (C) is supported on fine particles. The polymerization catalyst may also be the preliminarily polymerized catalyst comprising the carrier of fine particles, catalyst component (A), component (B-1) (or component (B-2)), the polymer or the copolymer formed by the preliminary polymerization and, where necessary, component (C).

Process I and II of the present invention comprises the first polymerization stage in which at least one monomer selected from ethylene, propylene, α-olefins having 4 to 20 carbon atoms, styrenes and cyclic olefins is polymerized or copolymerized in the presence of the above catalyst and the second polymerization stage in which the homopolymer or the copolymer obtained in the first polymerization stage is copolymerized with at least one monomer selected from ethylene, propylene, α-olefins having 4 to 20 carbon atoms, styrenes and cyclic olefins in the presence of a polyene having at least two polymerizable carbon-carbon double bonds in one molecule.

Examples of the α-olefin having 4 to 20 carbon atoms include α-olefins such as 1-butene, 3-methyl-1-butene, 4-methyl-1-butene, 4-phenyl-1-butene, 1-pentene, 3-methyl-1-pentene, 4-methyl-1-pentene, 3,3-dimethyl-1-pentene, 3,4-dimethyl-1-pentene, 4,4-dimethyl-1-pentene, 1-hexene, 4-methyl-1-hexene, 5-methyl-1-hexene, 6-phenyl-1-hexene, 1-octene, 1-decene, 1-dodecene, 1-tetradecene, 1-hexadecene, 1-octadecene, 1-eicosene and vinylcyclohexane; α-olefins substituted with halogen atoms such as hexafluoropropene, tetrafluoroethylene, 2-fluoropropene, fluoroethylene, 1,1-difluoroethylene, 3-fluoropropene, trifluoroethylene and 3,4-dichloro-1-butene; and cyclic olefins such as cyclopentene, cyclohexene, cycloheptene, norbornene, 5-methylnorbornene, 5-ethylnorbornene, 5-propylnorbornene, 5,6-dimethylnorbornene and 5-benzylnorbornene. Examples of the styrene include styrene; alkylstyrenes such as p-methylstyrene, p-ethylstyrene, p-propylstyrene, p-isopropylstyrene, p-butylstyrene, p-tert-butylstyrene, p-phenylstyrene, o-methylstyrene, o-ethylstyrene, o-propylstyrene, o-isopropylstyrene, m-methylstyrene, m-ethylstyrene, m-isopropylstyrene, m-butylstyrene, mesitylstyrene, 2,4-dimethylstyrene, 2,5-dimethylstyrene and 3,5-dimethylstyrene; alkoxystyrenes such as p-methoxystyrene, o-methoxystyrene and m-methoxystyrene; halogenated styrenes such as p-chlorostyrene, m-chlorostyrene, o-chlorostyrene, p-bromostyrene, m-bromostyrene, o-bromostyrene, p-fluorostyrene, m-fluorostyrene, o-fluorostyrene and o-methyl-p-fluorostyrene; trimethylsilylstyrene; and esters of vinylbenzoic acid.

As the polyene used in the second polymerization stage, any polyene can be used as long as the polyene has at least two polymerizable carbon-carbon double bonds in one molecule. Examples of the polyene include polyenes of the α,ω-type such as 1,3-butadiene, 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,13-tetradecadiene, 1,15-hexadecadiene, 4,4-dimethyl-1,9-decadiene, 4,4-dimethyl-1,9-decadiene, 1,5,9-decatriene, 5-allyl-1,9-decadiene and 1,19-eicodiene; polyenes of the styrene type such as p-divinylbenzene, m-divinylbenzene, o-divinylbenzene, di(p-vinylphenyl)methane, 1,3-bis(p-vinylphenyl)propane and 1,5-bis(p-vinylphenyl)pentane; cyclic polyenes such as 5-vinyl-2-norbornene, 5-ethylidene-2-norbornene, 5-isopropylidene-2-norbornene, dicyclopentadiene, dimethyldicyclopentadiene, diethyldicyclopentadiene, compounds represented by the following general formula:

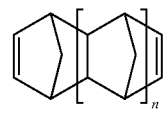

wherein n represents a number of 0, 1 or 2, examples of which include bicyclo[2.2.1]hepto-2,5-diene:

tetracyclo[4.4.01$^{3.3}$-1$^{7,10}$]-3,8-dodecadiene:

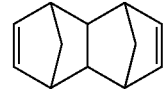

and hexacyclo[6.6.1.1$^{3.8}$-1$^{10,13}$-0$^{2.7}$-0$^{0.14}$]-4,11-heptadecadiene,

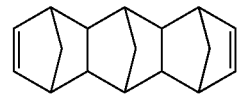

compounds represented by the following general formula:

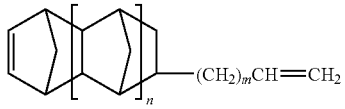

wherein n represents a number of 0, 1 or 2 and m represents a number of 1 to 11, examples of which include 5-allylbicyclo[2.2.1]hepto-2-ene:

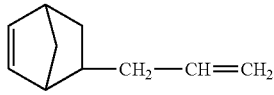

5-(3-butenyl)bicyclo[2.2.1]hepto-2-ene:

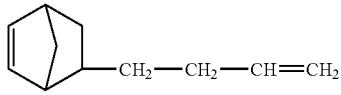

8-vinyltetracyclo[4.4.0.1$^{2.5}$-1$^{7.10}$]-3-dodecene:

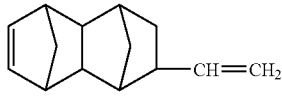

and 11-vinylhexacyclo[6.6.1.1$^{3.5}$-1$^{10.13}$-0$^{2.7}$0.0$^{9.14}$]-4-heptadiene:

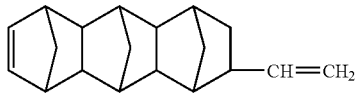

compounds represented by the following general formula:

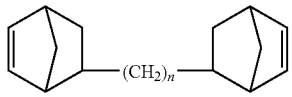

wherein n represents an integer of 0 to 6, examples of which include 1,1-bis(5-bicyclo[2.2.1]hepta-2-enyl)methane:

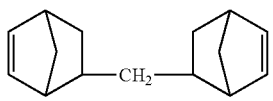

1,2-bis(5-bicyclo[2.2.1]hepta-2-enyl)ethane:

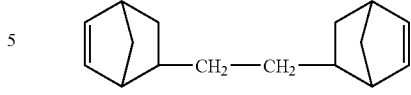

and 1,6-bis(5-bicyclo[2.2.1]hepta-2-enyl)hexane:

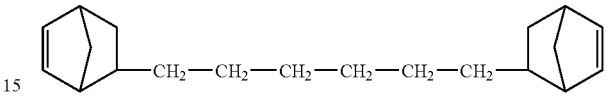

polyenes of the styrene/α-olefin type having the styrene residue group and the α-olefin residue group in the same molecule such as p-(2-propenyl)styrene, m-(2-propenyl)styrene, p-(3-butenyl)styrene, m-(3-butenyl)styrene, o-(3-butenyl)styrene, p-(4-pentenyl)styrene, m-(4-pentenyl)styrene, o-(4-pentenyl)styrene, p-(5-propenyl)styrene, p-(7-octenyl)styrene, p-(1-methyl-3-butenyl)styrene, p-(2-methyl-3-butenyl)styrene, o-(2-methyl-3-butenyl)styrene, p-(3-methyl-3-butenyl)styrene, p-(2-ethyl-3-butenyl)styrene, p-(2-ethyl-4-pentenyl)styrene, p-(3-butenyl)-α-methylstyrene, m-(3-butenyl)-α-methylstyrene, o-(3-butenyl)-α-methylstyrene, 4-vinyl-4'-(3-butenyl)biphenyl, 4-vinyl-3'-(3-butenyl)biphenyl, 4-vinyl-4'-(4-pentenyl)biphenyl, 4-vinyl-2'-(4-pentenyl)biphenyl and 4-vinyl-4'-(2-methyl-3-butenyl)biphenyl; 1,4-cyclohexadiene; 1,5-cyclooctadiene; 1,5-cyclododecadiene; 4-vinylcyclohexane; 1-allyl-4-isopropylidenecyclohexane; 3-allyl-cyclopentene; 4-allylcyclohexene; and 1-isopropenyl-4-(4-butenyl)cyclohexane.

In processes I and II of the present invention, the polyenes of the α,ω-type, the polyenes of the styrene type, the cyclic polyenes shown by the above formulae and the polyenes of the styrene/α-olefins type are preferable among the above polyenes since the reactivity of the carbon-carbon double bond is great and the amount of the residual unsaturated group which tends to decrease the heat stability during production of the composition can be decreased.

In process I of the present invention, the amount of the polyene having at least two polymerizable carbon-carbon double bonds in one molecule is in the range of $1.0 \times 10^{-7}$ to $1.0 \times 10^{-3}$ moles per 1 g of the polymer or the copolymer obtained in the first polymerization stage.

In the case of the polyenes of the α,ω-type, the polyenes of the styrene type and the cyclic polyenes shown by the above formulae, the amount of the polyene is, in general, in the range of $1.0 \times 10^{-7}$ to $2.0 \times 10^{-4}$ moles, preferably in the range of $2.0 \times 10^{-7}$ to $1.0 \times 10^{-4}$ moles, more preferably in the range of $3.0 \times 10^{-7}$ to $0.8 \times 10^{-4}$ moles, still more preferably in the range of $4.0 \times 10^{-7}$ to $0.4 \times 10^{-4}$ moles and most preferably in the range of $5.0 \times 10^{-7}$ to $0.2 \times 10^{-4}$ moles per 1 g of the polymer or the copolymer obtained in the first polymerization stage.

In the case of the cyclic polyenes described above other than the cyclic polyenes shown by the above formulae, the amount of the polyene is, in general, in the range of $5.0 \times 10^{-7}$ to $1.0 \times 10^{-3}$ moles, preferably in the range of $1.0 \times 10^{-6}$ to $5.0 \times 10^{-4}$ moles, more preferably in the range of $1.5 \times 10^{-6}$ to $4.0 \times 10^{-4}$ moles, still more preferably in the range of $2.0 \times 10^{-6}$ to $2.0 \times 10^{-4}$ moles and most preferably in the range of $2.5 \times 10^{-6}$ to $1.0 \times 10^{-4}$ moles per 1 g of the polymer or the copolymer obtained in the first polymerization stage.

In the case of the polyenes of the styrene/α-polyolefin type, the amount of the polyene is, in general, in the range of $1.0 \times 10^{-7}$ to $1.0 \times 10^{-3}$ moles, preferably in the range of $2.0 \times 10^{-7}$ to $5.0 \times 10^{-4}$ moles, more preferably in the range of $3.0 \times 10^{-7}$ to $4.0 \times 10^{-4}$ moles, still more preferably in the range of $4.0 \times 10^{-7}$ to $2.0 \times 10^{-4}$ moles and most preferably in the range of $5.0 \times 10^{-7}$ to $1.0 \times 10^{-4}$ moles per 1 g of the polymer or the copolymer obtained in the first polymerization stage.

When the amount of the polyene is excessively small, there is the possibility that the improvement in the workability cannot be expected in the use of the obtained polyolefin-based resin composition. When the amount of the polyene is excessively great, the control on the formation of gel becomes difficult.

In process II of the present invention, the amount of the polyene having at least two polymerizable carbon-carbon double bond in one molecule is not particularly limited and the polyene can be used in an amount in accordance with the necessity. The preferable amount of the polyene is the same as that in process I.

In process I and II of the present invention, the first polymerization stage is a stage conducted before the second polymerization stage in which the polyene is used and can be conducted in accordance with a process including a multi-stage polymerization such as the two-stage polymerization. In the first polymerization stage, the monomers described above are used. When the homopolymer of ethylene or an ethylene-based copolymer of ethylene and at least one of α-olefins having 3 to 20 carbon atoms, styrenes and cyclic olefins is obtained in the first polymerization stage, it is preferable that the content of the ethylene unit is in the range of 50 to 100% by mole.

When the homopolymer of propylene or a copolymer of propylene and at least one of ethylene, α-olefins having 4 to 20 carbon atoms, styrenes and cyclic olefins is obtained in the first polymerization stage, it is preferable that the content of the propylene unit is in the range of 50 to 100% by mole. It is preferable that the stereoregularity of the propylene sequence is syndiotactic or isotactic. When the sequence is isotactic, it is preferable that mmmm (the fraction of the meso pentad) is in the range of 40 to 99.5%. When the sequence is syndiotactic, it is preferable that rrrr (the fraction of the racemi pentad) is in the range of 40 to 99.5%.

In the first polymerization stage, when the homopolymer of an α-olefin having 4 to 20 carbon atoms, a copolymer of different types of α-olefins having 4 to 20 carbon atoms or an α-olefin-based copolymer of one of α-olefins having 4 to 20 carbon atoms with at least one of ethylene, propylene, styrenes and cyclic olefins is obtained, it is preferable the content of the α-olefin monomer unit is in the range of 50 to 100% by mole.

In the first polymerization stage, when the homopolymer of a styrene, a copolymer of different types of styrenes or a styrene-based copolymer of a styrene with at least one of ethylene, propylene, α-olefins having 4 to 20 carbon atoms and cyclic olefins is obtained, it is preferable that the content of the styrene unit is in the range of 50 to 100% by mole. The stereoregularity of the styrene sequence may be atactic, syndiotactic or isotactic. When the sequence is isotactic, it is preferable that mmmm is in the range of 40 to 99.5%. When the sequence is syndiotactic, it is preferable that rrrr is in the range of 40 to 99.9%.

In the first polymerization stage, when the homopolymer of a cyclic olefin or a cyclic olefin-based copolymer of a cyclic olefin with at least one of ethylene, propylene, α-olefins having 4 to 20 carbon atoms and styrenes is obtained, it is preferable that the content of the cyclic olefin unit is in the range of 50 to 100% by mole.

Examples of the polyethylene-based polymer having a content of the ethylene unit in the range of 50 to 100% by mole include homopolymer of ethylene, ethylene/propylene copolymers, ethylene/1-butene copolymers, ethylene/1-hexene copolymers, ethylene/1-octene copolymers, ethylene/1-decene copolymers, ethylene/eincosene copolymers, ethylene/styrene copolymers, ethylene/p-methylstyrene copolymers, ethylene/p-phenylstyrene copolymers and ethylene/norbornene copolymers.

Examples of the polypropylene-based polymer having a content of the propylene unit in the range of 50 to 100% by mole include isotactic polypropylene, syndiotactic polypropylene, low stereoregularity isotactic polypropylene, propylene/ethylene copolymers, propylene/1-butene copolymers, propylene/1-hexene copolymers, propylene/1-octene copolymers, propylene/1-decene copolymers, propylene/1-eicosene copolymers, propylene/norbornene copolymers, propylene/styrene copolymers, propylene/p-methylstyrene copolymers and propylene/p-phenylstyrene copolymers.

Examples of the poly-α-olefin-based polymer having a content of the α-olefin unit having 4 to 20 carbon atoms in the range of 50 to 100% by mole include poly-1-butene, 1-butene/ethylene copolymers, 1-butene/propylene copolymers, 1-butene/1-decene copolymers, 1-butene/1-eicosene copolymers, 1-butene/styrene copolymers, 1-butene/norbornene copolymers, poly(4-methyl-1-pentene) and copolymers obtained by replacing 1-butene in the above polymers with 4-methylpentene-1.

Examples of the polystyrene-based polymer having a content of the styrene unit in the range of 50 to 100% by mole include isotactic polystyrene, syndiotactic polystyrene, atactic polystyrene, styrene/ethylene copolymers, styrene/propylene copolymers, styrene/1-octene copolymers, styrene/1-decene copolymers, styrene/1-eicosene copolymers, styrene/norbornene copolymers and styrene/p-methylstyrene copolymers.

Examples of the polynorbornene-based polymer having a content of the cyclic olefin unit in the range of 50 to 100% include polynorbornene, norbornene/ethylene copolymers, norbornene/propylene copolymers and norbornene/styrene copolymers.

It is preferable that the polymer produced in the first polymerization stage has long chain branches.

It is preferable that the long chain branches are derived not from a branching agent having two or more polymerizing points such as dienes but from a macro monomer having vinyl group at the chain ends.

When the first polymerization stage is conduct using a branching agent, a great amount of gel is formed along with the formation of the long branches. The amount of the formed gel is very great even when the branching agent is used in a very small amount. This is not preferable since this affects the uniformity of the dispersion adversely and the range of the improvement in the melting elasticity is narrowed. Moreover, the appearance of the molded article becomes poor and the physical properties deteriorate.

On the other hand, since the formation of the long chain based on the macro monomer essentially forms no crosslinking components causing the formation of gel, no problems described above arise and the effect of further improving the uniformity of the dispersion and the melting elasticity in the second polymerization stage is exhibited.

The long chain branching derived from the macromonomer may partially contain long chain branching derived from a diene component.

The presence of the long chain branching can be evaluated as follows.

The polyolefin produced in the first polymerization stage and having long chain branches even in a small amount exhibits dependency of the melt viscosity on the shearing rate different from that of polyolefins having no long chain branches and the content of the long chain branches is detected utilizing this effect.

When long chain branches are present, the dependency of the melt viscosity on the shearing rate is great. Therefore, the presence of the long chain branches can be detected by comparing a linear polymer having no long chain branches with the polyolefin produced in the first polymerization stage.

It is known that this method is affected by the molecular weight distribution. Therefore, the polyolefin produced in the first polymerization stage is compared with a polymer of the same type which has approximately the same molecular weight distribution as measured in accordance with GPC (the gel permeation chromatography) and has no long chain branches. In other words, the polyolefin is compared with a linear polymer having the same type of monomer units and approximately the same composition of the monomer units.

The method of the evaluation is specifically described in the following.

Method of the Measurement

Apparatus: An Apparatus for Measuring the Melt Viscosity RMS800 (Produced by RHEOMETRICS Company)

(i) Conditions of the Measurement

Temperature: the same as or higher than the maximum melting point or the glass transition temperature of the polyolefin in the first polymerization stage; in general, higher than the maximum melting temperature by 10 to 60° C. or higher than the maximum glass transition temperature by 10 to 200° C.

Strain: 15%

Angular speed: 0.01 to 300 rad/s

Shape of the sample: cone plate

The melt viscosity is measured under varying shearing rate (i.e., the angular speed) using the above apparatus under the above conditions.

(ii) Data Processing

The value of $\omega_2/10\omega_1$ is calculated, wherein $\omega_1$ represents the angular speed giving a melt viscosity of 10 Pas and $\omega_2$ represents the angular speed giving a melt viscosity of 103 Pas.

(iii) Comparative Sample

A polymer which has clearly no branches and has approximately the same type of monomer units, the same composition of the monomer units in the polymer, approximately the same ratio of the weight-average molecular weight (Mw) to the number-average molecular weight (Mn), i.e., Mw/Mn, and an approximately same ratio of the Z-average molecular weight to Mw, i.e., Mz/Mn, as those of the polymer in the first polymerization stage, is used as the comparative sample. The molecular weights are measured in accordance with GPC.

"Approximately the same" means that the ratio of the measured value for the polymer in the first polymerization stage to that for the comparative sample, i.e., the ratio of the compositions of the monomers in the polymers, Mw, Mw/Mn or Mz/Mn [for example, (Mw of the comparative sample/Mw of the polymer in the first polymerization stage)], is in the range of 0.8 to 1.2.

From the standpoint of the sequence structure of the polymer, one of the homopolymer, the random copolymer and the block copolymer is used as the comparative sample and it is necessary that the sequence structures in both polymers be approximately the same.

More specifically, it is necessary that the randomness be defined for a random copolymer. A polymer generally recognized as a random polymer can be used. Specifically, when a product of the monomer reactivity ratios $r^1$ and $r^2$, i.e., $r^1 \times r^2$, obtained from the sequence analysis of a polymer is 5 or smaller, the polymer is defined as the random polymer.

A block copolymer includes a blend having almost no bonding points between blocks such as a blend of polypropylene and a propylene/ethylene copolymer having no bonding points of the polypropylene and a true block copolymer having bonding points between blocks.

(iv) Evaluation

When the ratio $N^1/N^0$ is in the following range, it is recognized that long branches are present, wherein $\omega_2/10\omega_1$ of the comparative sample is represented by $N^0$ and $\omega_2/10\omega_1$ of the polymer in the first polymerization stage is represented by $N^1$.

$$1.05 \leq N^1/N^0 \leq 80$$

It is preferable that $N^1/N^0$ is in the following range:

$$1.07 \leq N^1/N^0 \leq 80,$$

more preferably $$1.09 \leq N^1/N^0 \leq 70,$$

still more preferably $$1.10 \leq N^1/N^0 \leq 65,$$

still more preferably $$1.20 \leq N^1/N^0 \leq 60, \text{ and}$$

it is most preferable that $N^1/N^0$ is in the following range $$1.50 \leq N^1/N^0 \leq 55.$$

When $N^1/N^0$ is smaller than 1.05, the effect of improving the melting elasticity of the polyolefin-based resin composition is small. When $N^1/N^0$ exceeds 80, the melt viscosity decreases. Therefore, a value of $N^1/N^0$ outside the above range is not preferable.

When the molecular weight of the polymer obtained in the first polymerization stage is defined by the intrinsic viscosity, it is preferable that the intrinsic viscosity [η] measured in decalin as the solvent at 135° C. is in the range of 0.1 to 10 deciliter/g, more preferably in the range of 0.15 to 8 deciliter/g, still more preferably in the range of 0.2 to 7 deciliter/g, still more preferably in the range of 0.5 to 6 deciliter/g and most preferably in the range of 0.7 to 5 deciliter/g. When the intrinsic viscosity is smaller than 0.1 deciliter/g, there is the possibility that the polyolefin-based resin composition of the present invention exhibits decreased mechanical properties as the composition. When the intrinsic viscosity exceeds 10 deciliter/g, there is the possibility that workability in molding of the composition deteriorates.

The molecular weight distribution of the polymer produced in the first polymerization stage is not particularly limited. It is preferable that the ratio of the weight-average molecular weight (Mw) to the number-average molecular weight (Mn), i.e., Mw/Mn, measured in accordance with GPC (the gel permeation chromatography) is in the range of 1.5 to 4 and more preferably in the range of 1.6 to 3.5.

The stereoregularity of the polymer produced in the first polymerization stage may be any of the isotactic configuration, the syndiotactic configuration and the atactic configuration. It is preferable that the stereoregularity is in the range such that mmmm=40 to 99.5% in the case of the isotactic configuration and rrrr=40 to 99.5% in the case of the syndiotactic configuration.

The polymer may be produced in the first polymerization stage in accordance with any of the random copolymerization, the block copolymerization and the graft copolymerization.

Examples of the form of the reaction in the first polymerization stage include the slurry polymerization, the gas phase polymerization and the bulk polymerization each using a carried catalyst, the polymerization in a homogeneous system and the solution polymerization in a heterogeneous system. In the case of the slurry polymerization, the gas phase polymerization and the bulk polymerization using a supported catalyst, it is preferable that the reaction product is obtained in the form of particles. It is preferable that the average particle diameter in the powder morphology (the morphology of the polymer powder formed in the first polymerization stage) is in the range of 50 μm to 5 mm, more preferably in the range of 100 μm to 4.5 mm and most preferably in the range of 150 μm to 4 mm. When the average particle diameter is smaller than 50 μm, there is the possibility that piping passageways are clogged due to the formation of fine powder. When the average particle diameter exceeds 5 mm, there is the possibility that rough grains increase and piping passageways are clogged.

The bulk density of the polymer powder produced in the first polymerization stage is, in general, in the range of 0.1 to 0.5 g/milliliter, preferably in the range of 0.15 to 0.5 g/milliliter, more preferable in the range of 0.20 to 0.5 g/milliliter and most preferably in the range of 0.25 to 0.48 g/milliliter. When the bulk density is smaller than 0.1 g/milliliter, there is the possibility that the productivity of the polymer per unit volume of the reactor decreases. When the bulk density exceeds 0.5 g/milliliter, there is the possibility that dispersion of the polyene added in the second polymerization stage and catalyst components added where necessary into the powder decrease and the uniform composition cannot be produced.

Examples of the polymer produced in accordance with the slurry polymerization, the gas phase polymerization and the bulk polymerization using a supported catalyst in the first polymerization stage include polystyrene, copolymers of ethylene and monomer components other than ethylene (30% by mole or less), isotactic polypropylene, syndiotactic polypropylene and copolymers of propylene and monomer components other than propylene (30% by mole or less).

In the case of the polymerization in the homogeneous system, it is preferable that the formed polymer is dissolved into the polymerization solvent or the monomer in the condition of the production. As the solvent, a conventional hydrocarbon compound such as toluene, cyclohexane and decane can be used. It is sufficient that the homogeneous system is achieved by the change in the solvent or the temperature before the second polymerization is conducted even when the formed polymer is separated in the first polymerization stage.

Examples of the polymer produced in accordance with the polymerization in the homogeneous system in the first polymerization stage include copolymers of ethylene and monomer components other than ethylene (30 to 99% by mole), copolymers of propylene and monomer components other than propylene (30 to 99% by mole), atactic polypropylene and polypropylene having a low stereoregularity (mmmm=40 to 80% by mole).

In the case of the polymerization in the heterogeneous system, when the formed polymer is separated out as the solid component with the progress of the polymerization reaction and the formed solid polymer is controlled to form particles, the process is similar to the slurry polymerization, the gas phase polymerization and the bulk polymerization using the supported catalyst. Examples of the polymer produced in accordance with the polymerization in the heterogeneous system in the first polymerization stage include syndiotactic polystyrene and copolymers derived from the syndiotactic polystyrene.

In the first polymerization stage, the polymerization can be conducted at a temperature in the range of −100 to 300° C. under a pressure in the range of 0.001 to 10 MPa for the polymerization time in the range of 10 seconds to 8 hours.

In the case of the slurry polymerization, the gas phase polymerization and the bulk polymerization using the supported catalyst, the polymerization condition is not particularly limited as long as the particulate polymer is formed. The preferable polymerization conditions are a temperature in the range of −100 to 120° C., a polymerization pressure in the range of 0.001 to 10 MPa and a polymerization time in the range of 10 seconds to 8 hours. In the case of the polymerization in the homogeneous system, the polymerization condition is not particularly limited as long as the homogeneous condition is maintained. The preferable polymerization conditions are a temperature in the range of 0 to 300° C., a polymerization pressure in the range of 0.001 to 10 MPa and a polymerization time in the range of 10 seconds to 3 hours.

In processes I and II of the present invention, the second polymerization stage is a stage of copolymerizing a monomer containing a polyene with the polymer produced in the first polymerization stage. In the second polymerization stage, the polymer produced in the first polymerization stage is used as a sort of reactor or reaction field. The polymer is formed by the polymerization in the presence of the polyene in the polymer obtained in the first polymerization stage and is uniformly dispersed in the polymer obtained in the first polymerization stage. The second polymerization stage is suitably a stage for forming IPN (the interpenetrating polymer network).

The type of the monomer which can be used in the second polymerization stage is restricted depending on the type of the monomer used in the first polymerization stage. When the homogeneous polymerization is conducted in the first polymerization stage and a liquid monomer is used, the complete removal of the liquid monomer is difficult after the first polymerization stage is completed and, in general, the liquid monomer is left remaining in the second polymerization stage. Therefore, the monomer used in the second polymerization stage is limited to the type of the monomer containing the remaining liquid monomer.

Examples of the liquid monomer include styrenes, cyclic olefins and α-olefins having 5 to 20 carbon atoms.

When the system used in the first polymerization stage is the polymerization system forming polymer particles using a supported catalyst or the polymer is separated as a solid component with the progress of the polymerization reaction, it is possible that the monomer is removed in accordance with the means described in the following and the type of the monomer used in the second polymerization stage is not limited at all. For example, gaseous monomers such as ethylene and propylene can be easily removed from the polymerization system by reducing the pressure. When the monomer is a liquid, the monomer can be separated from the polymer using the technology of filtration.

As for the process for adding the polyene in the second polymerization stage, it is important that the polyene is uniformly distributed in the polymerization field before the polymerization starts in the second polymerization stage. Specifically, the polyene can be added after being dissolved into the solvent used for the polymerization or a solvent inert to the polymerization such as a hydrocarbon solvent and a halogenated hydrocarbon solvent (the concentration: 0.01 to 5 moles/liter) or after converting into a gas.

The addition of the polyene can be conducted while the polymer produced in the first polymerization stage is stirred or in accordance with the dry blending.

As for the rate of addition, it is preferable that the polyene in the range of 0.01 millimole to 4 moles per 100 g of the polymer produced in the first polymerization stage is added within a time in the range of 1 second to 1 hour.

The above operation may be conducted in accordance with the continuous process or the batch process. It is preferable that the product obtained after the addition of the polyene is kept for a time in the range of 1 second to 1 hour to achieve the uniform dispersion.

In process I, the polymer composition obtained in the second polymerization stage is a composition comprising a desired combination of the polymer obtained in the first polymerization stage and one of the polymers shown in the following terms (i) to (v). In process II, the polymer composition obtained in the second polymerization stage is a composition comprising a desired combination of the polymer obtained in the first polymerization stage and one of the polymers shown in the following terms (i) and (iii) to (v). When the monomer used in the first polymerization stage is the same as the monomer used in the second polymerization monomer, a composition comprising a copolymer obtained by copolymerizing the polyene to the polymer obtained in the first polymerization stage can be obtained.

(i) Ethylene-based copolymer: a copolymer of ethylene/polyene and a copolymer of ethylene/polyene and at least one of α-olefins having 3 to 20 carbon atoms, styrenes and cyclic olefins (the content of ethylene unit: 50 to 100% by mole).

(ii) Propylene-based copolymer: a copolymer of propylene/polyene and a copolymer of propylene/polyene and at least one of ethylene, α-olefins having 4 to 20 carbon atoms, styrenes and cyclic olefins (the content of the propylene unit: 50 to 100% by mole).

The stereoregularity of the propylene sequence may be isotactic or syndiotactic. In the case of the isotactic sequence, mmmm=40 to 99.5%. In the case of the syndiotactic sequence, rrrr=40 to 99.5%.

(iii) α-Olefin-based copolymer: a copolymer of α-olefin having 4 to 20 carbon atoms/polyene, a copolymer of an α-olefin having 4 to 20 carbon atoms (a)/a polyene and an α-olefin having 4 to 20 carbon atoms (b) [(a)≠(b)] and a copolymer of at least one of α-olefins having 4 to 20 carbon atoms/a polyene and at least one of ethylene, propylene, styrenes and cyclic olefins (the content of the α-olefin unit: 50 to 100% by mole).

(iv) Styrene-based copolymer: a copolymer of a styrene/polyene, a copolymer of a styrene(c)/polyene and a styrene (d) [(c)≠(d)] and a copolymer of a styrene/a polyene and at least one of ethylene, propylene, α-olefins having 4 to 20 carbon atoms and cyclic olefins (the content of the styrene unit: 50 to 100% by mole).

The stereoregularity of the styrene sequence may be isotactic or syndiotactic. In the case of the isotactic sequence, mmmm=40 to 99.5%. In the case of the syndiotactic sequence, rrrr=40 to 99.5%.

⑤ Cyclic olefin-based copolymer: a copolymer of a cyclic olefin/a polyene and a copolymer of a cyclic olefin/a polyene and at least one monomer selected from ethylene, propylene, α-olefins having 4 to 20 carbon atoms and styrenes.

Specific examples of the polymer produced in the first polymerization stage and the second polymerization stage are shown in Table 1.

TABLE 1

| The first polymerization stage | The second polymerization stage |
| --- | --- |
| polyethylene | ethylene/polyene copolymer |
| polyethylene | ethylene/butene/polyene copolymer copolymers obtained by replacing butene with other α-olefins |
| ethylene/propylene copolymer | ethylene/polyene copolymer |
| ethylene/butene copolymer | ethylene/polyene copolymer |
| ethylene/hexene copolymer | ethylene/polyene copolymer |
| ethylene/octene copolymer | ethylene/polyene copolymer |
| ethylene/octene copolymer | ethylene/octene/polyene copolymer etc. |
| isotactic polypropylene | isotactic polypropylene/polyene copolymer |
| syndiotactic polypropylene | syndiotactic polypropylene/polyene copolymer |
| isotactic polypropylene | ethylene/polyene copolymer |
| isotactic polypropylene | ethylene/butene/polyene copolymer |
| isotactic polypropylene | ethylene/octene/polyene copolymer etc. |
| isotactic polypropylene | copolymers of cyclic polyolefins such as ethylene/norbornene/polyene copolymer |
| isotactic polypropylene | styrene/polyene copolymer |
| isotactic propylene/ethylene copolymer | ethylene/polyene copolymer |
| isotactic propylene/octene copolymer | ethylene/polyene copolymer |
| isotactic propylene/octene copolymer | ethylene/octene/polyene copolymer etc. |
| polybutene | ethylene/norbornene/polyene copolymer |
| syndiotactic polystyrene | styrene/polyene copolymer |
| norbornene/ethylene copolymer | norbornene/ethylene/polyene copolymer |
| polyoctene | octene/polyene copolymer |
| polyoctene | ethylene/octene/polyene copolymer |
| polydecene | decene/polyene copolymer |
| polybutene | ethylene/polyene copolymer |
| polybutene | propylene/polyene copolymer |
| poly(4-methyl-1-pentene) | ethylene/polyene copolymer |
| poly(4-methyl-1-pentene) | propylene/polyene copolymer |
| poly(4-methyl-1-pentene) | ethylene/poly(4-methyl-1-pentene)/polyene copolymer |
| poly(3-methyl-1-butene) | ethylene/polyene copolymer |
| poly(3-methyl-1-butene) | propylene/polyene copolymer |
| poly(3-methyl-1-butene) | ethylene/poly(3-methyl-1-butene)/polyene copolymer |
| poly(4-methyl-1-pentene)/ethylene | ethylene/polyene copolymer |
| poly(4-methyl-1-pentene)/propylene | propylene/polyene copolymer |

In the polyolefin-based resin composition, it is preferable that the content of the polyene is greater than 0% and 10% by weight or smaller. When the workability in molding such as tension in melted condition is to be improved in the polyolefin-based resin composition, it is preferable that the content of the polyene unit is 0.5% by weight or smaller, more preferably 0.4% by weight or smaller, still more preferably 0.3% by weight or smaller, still more preferably 0.2% by weight or smaller and most preferably 0.1% by weight or smaller. When the polyolefin-based resin composition does not comprise the polyene unit, the workability in molding is not improved.

When the content of the polyene unit exceeds 10% by weight, there is the possibility that the melt fluidity of the resin decreases or gel is formed.

When the uniform composition is to be produced in the process for producing the polyolefin-based resin composition, it is preferable that the content of the polyene unit is 5% by weight or smaller, more preferably 4.5% by weight or smaller, still more preferably 4% by weight or smaller, still more preferably 3.5% by weight or smaller and most preferably 3% or smaller. When the polyolefin-based resin composition does not comprise the polyene unit, the uniformity decreases. When the content of the polyene unit exceeds 10% by weight, there is the possibility that the composition becomes infusible and the working by melt molding is adversely affected although dispersion from the viewpoint of entanglement of the molecular chains is improved.

When the molecular weight of the polyolefin-based resin composition is defined by the intrinsic viscosity, it is preferable that the intrinsic viscosity $[\eta]_T$ measured in decalin as the solvent at 135° C. is in the range of 0.5 to 15 deciliter/g, more preferably in the range of 0.6 to 10 deciliter/g, still more preferably in the range of 0.7 to 8 deciliter/g and most preferably in the range of 0.9 to 6 deciliter/g. When the intrinsic viscosity is smaller than 0.5 deciliter/g, there is the possibility that the mechanical properties of the polyolefin-based resin composition deteriorate. When the intrinsic viscosity exceeds 15 deciliter/g, there is the possibility that working by molding becomes difficult.

When the molecular weight of the polyolefin-based resin composition is defined by the melt index (MI) that is an index for the molecular weight in the melted condition, it is preferable that MI is in the range of 0.01 to 500 g/10 minutes. The conditions of the measurement of MI on various resins are in accordance with the conditions specified by Japanese Industrial Standard K7210, which are shown in the following.

(i) A resin composition comprising 50% by mole or more of the ethylene unit: at 190° C. under a load of 21.18 N
(ii) A resin composition comprising 50% by mole or more of the propylene unit: at 230° C. under a load of 21.18 N
(iii) A resin composition comprising the syndiotactic styrene sequence: at 290° C. under a load of 21.18 N
(iv) A resin composition comprising 50% by mole or more of the unit of an α-olefin having 4 to 20 carbon atoms: at 230° C. under a load of 21.18 N
(v) A resin composition comprising 50% by mole or more of the unit of a cyclic olefin: at 230° C. under a load of 21.18.

It is preferable that the molecular weight distribution of the olefin-based resin composition expressed by Mw/Mn measured in accordance with GPC is in the range of 1.6 to 70 and more preferably in the range of 2.0 to 15.

The uniformity of the polyolefin-based resin composition can be evaluated from the condition of dispersion, the uniformity of the shape of the dispersed particles and the change (the decrease) in the particle diameter in comparison with those of the composite system having no polyene units in the visual or magnified observation of the surface or the face of fracture of a melt molded article (such as a film, a sheet and an injection molded article) of the composition.

The uniformity of the composition can also be evaluated from the improvement in the mechanical properties such as the elongation at break, the modulus and the yielding stress.

It is preferable that the fraction of the polymer obtained in the second polymerization stage based on the amount of the polyolefin-based resin composition obtained in the entire production process is in the range of 0.001 to 80% by weight. When the obtained polyolefin-based resin composition is used without further treatments and the workability in molding such as tension in melted condition is to be improved, it is preferable that the fraction of the polymer obtained in the second polymerization stage is in the range of 0.001 to 40% by weight, more preferably in the range of 0.005 to 35% by weight, still more preferably in the range of 0.008 to 30% by weight, still more preferably in the range of 0.001 to 25% by weight, still more preferably in the range of 0.02 to 25% by weight and most preferably in the range of 0.05 to 20% by weight. When the above fraction is smaller than 0.001% by weight, the improvement in the workability in molding is slight. When the above fraction exceeds 40% by weight, there is the possibility that the melt fluidity of the resin decreases.

When the polyolefin-based resin composition is used as the material for blending with other thermoplastic resins and the workability in molding such as tension in melted condition is to be improved, or when the polyolefin-based resin composition is used without further treatments and highly improved workability in molding is provided, it is preferable that the fraction of the polymer obtained in the second polymerization stage is in the following ranges.

Preferably in the range of 0.5 to 80% by weight, more preferably in the range of 1 to 80% by weight, still more preferably in the range of 2 to 80% by weight, still more preferably in the range of 5 to 80% by weight, still more preferably in the range of 8 to 80% by weight, still more preferably in the range of 10 to 70% by weight and most preferably in the range of 16 to 70% by weight.

When the fraction of the polymer obtained in the second polymerization stage is smaller than 0.5% by weight, remarkable improvement in the workability in molding cannot be expected. When the fraction exceeds 80% by weight, the fluidity of the resin decreases.

When the uniform composition is to be produced in the process for producing the polyolefin-based resin composition, it is preferable that the fraction of the polymer obtained in the second polymerization stage is in the range of 1 to 80% by weight, more preferably in the range of 1.5 to 70% by weight, still more preferably in the range of 2.0 to 65% by weight, still more preferably in the range of 2.5 to 60% by weight, still more preferably in the range of 3.0 to 55% by weight and most preferably in the range of 3.5 to 50% by weight. When the fraction of the polymer obtained in the second polymerization stage is smaller than 1% by weight, the effect of improving the physical properties produced in the first polymerization stage is slight. When the fraction exceeds 80% by weight, the melt fluidity of the resin decreases.

When the molecular weight of the polymer produced in the first polymerization stage is defined by the intrinsic viscosity as described above, it is preferable that the intrinsic viscosity $[\eta]_1$ measured in decalin as the solvent at 135° C. is in the range of 0.1 to 10 deciliter/g, more preferably in the range of 0.15 to 8 deciliter/g, still more preferably in the range of 0.2 to 7 deciliter/g, still more preferably in the range of 1.5 to 6 deciliter/g and most preferably in the range of 0.7 to 5 deciliter/g. When the intrinsic viscosity is smaller than 0.1 deciliter/g, there is the possibility that physical properties of the composition deteriorate. When the intrinsic viscosity exceeds 10 deciliter/g, there is the possibility that the working in molding is difficult.

When the molecular weight of the polymer produced in the second polymerization stage is defined by the intrinsic viscosity $[\eta]_1$, the intrinsic viscosity $[\eta]_2$ measured in decalin as the solvent at 135° C. is, in general, in the range of 0.5 to 20 deciliter/g. When the workability in molding of the polyolefin-based resin composition such as the tension in melted condition is to be improved, it is necessary that the intrinsic viscosity $[\eta]_2$ be in the range of 1.5 to 20 deciliter/g which is greater than the intrinsic viscosity $[\eta]_1$ of the polyolefin produced in the first polymerization stage and that the molecular weight of the polymer obtained in the second polymerization stage be decided in accordance with the following method and satisfy the following general formula.

When the molecular weight (the intrinsic viscosity) of the polyolefin obtained in the first polymerization stage is represented by $[\eta]_1$, the molecular weight of the polyolefin obtained in the second polymerization stage is represented by $[\eta]_2$, the molecular weight of the composition produced through the second polymerization stage is represented by $[\eta]_T$, and the fraction of the polymer obtained in the second polymerization stage in the entire composition is represented by F (0<F<1), the relation between $[\eta]_1$, $[\eta]_2$, $[\eta]_T$ and F can be expressed as follows. Assuming that the molecular weight $[\eta]$ is additive, $[\eta]_2$ which cannot be actually measured is calculated from $[\eta]_1$, $[\eta]_T$ and F which can be actually measured. It is necessary that the following requirements be satisfied:

$$[\eta]_2 = \{[\eta]_T - [\eta]_1(1-F)\}/F$$

$$[\eta]_2/[\eta]_1 = 1.05 \sim 10$$

It is preferable that $[\eta]_2/[\eta]_1$ is in the range of 1.06 to 10, more preferably in the range of 1.07 to 10, still more preferably in the range of 1.08 to 10, still more preferably in the range of 1.09 to 10 and most preferably in the range of 1.1 to 10. When $[\eta]_2/[\eta]_1$ is smaller than 1.05, improvement in the workability in molding is slight. When $[\eta]_2/[\eta]_1$ exceeds 10, there is the possibility that melt fluidity of the resin decreases.

When the uniform composition is to be produced in the process for producing the polyolefin-based resin composition, the molecular weight of the polymer produced in the second polymerization stage is in the same range as that of the polymer produced in the first polymerization stage. The preferable range of the molecular weight is also the same as that of the polymer produced in the first polymerization stage. In this case, the molecular weight is less limited than the molecular weight in the case for the improvement in the melt properties.

The form of the reaction in the second polymerization stage is decided in accordance with the form of the reaction in the first polymerization stage as shown in the following cases.

(i) When the first polymerization stage is conducted in accordance with the slurry polymerization, the gas phase polymerization or the bulk polymerization using a supported catalyst, the second polymerization stage is conducted using the particulate reaction product as the reactor.

(ii) When the first polymerization stage is conducted in accordance with the polymerization in the homogeneous system, the second polymerization stage is also conducted in accordance with the polymerization in the homogeneous system using the field of the homogeneous system as the reaction field of the production of the composition.

(iii) When the first polymerization stage is conducted in accordance with the polymerization in the heterogeneous solution system using a homogeneous catalyst and solid particles are formed as the product, the second polymerization stage is conducted using the formed solid particles as the reactor.

(iv) In other cases, when the solid polymer formed in the first polymerization stage is transferred to the second polymerization stage and the polymer is dissolved or made uniform in the melted condition under the condition of the production in the second polymerization stage, the second polymerization stage can be conducted in a uniform polymerization field.

In cases (i) and (iii) described above, the composition can be produced while the dispersion in particles is maintained even when the polymer produced in the second polymerization stage has a low melting point or is a so-called tacky component. The low melting point means, in general, a melting point of 60° C. or lower.

The conditions in general of the production of the polymer in the second polymerization stage is the temperature among the range of −100 to 300° C.; the polymerization pressure among the range of 0.001 to 10 MPa; and the polymerization time among the range of 10 seconds to 8 hours.

In cases (i) and (iii) described above, the condition of the production is not particularly limited as long as the particulate polymer can be formed. The preferable ranges are the temperature among the range of −100 to 120° C.; the polymerization pressure among the range of 0.001 to 10 MPa; and the polymerization time among the range of 10 seconds to 8 hours.

In cases (ii) and (iv) described above, the condition of the production is not particularly limited as long as the uniformity is maintained under the condition of the polymerization. The preferable ranges are the temperature among the range of 0 to 300° C.; the polymerization pressure among the range of 0.001 to 10 MPa; and the polymerization time among the range of 10 seconds to 3 hours.

Process III for producing the polyolefin-based resin composition of the present invention will be described in the following.

Catalyst component (X) in the catalyst used in process III comprises a titanium trichloride-based compound as a catalyst component (X-1) or a catalyst component (X-2) comprising titanium, magnesium and a halogen atom as the essential components. As the titanium trichloride-based compound as catalyst component (X-1), there are many types of titanium trichloride-based compounds such as compounds obtained by reducing $TiCl_4$ with hydrogen atom $[TiCl_3(H)]$, compounds obtained by reducing $TiCl_4$ with titanium metal $[TiCl_3(T)]$, compounds obtained by reducing $TiCl_4$ with aluminum metal $[TiCl_3(A)]$ and compounds obtained by reducing $TiCl_4$ with an organoaluminum compound [for example, $TiCl_3$ obtained by the reduction with diethylaluminum chloride]. In the present invention, although the activity of the catalyst is occasionally different depending on the type of $TiCl_3$ used and the performance of the catalyst is not always the same; any of the compounds which can be used as the $TiCl_3$-based catalyst component in the so-called Ziegler catalyst (including the Ziegler-Natta catalyst) can be used. Therefore, it is not necessary that the $TiCl_3$-based catalyst component is purely $TiCl_3$. For example, $TiCl_3(A)$ in which ⅓ mole of $AlCl_3$ is added, compounds into which an auxiliary component such as an electron-donating compound is added after being prepared and compounds inevitably or intentionally containing a small amount of unreduced $TiCl_4$, over-reduced $TiCl_3$ or an oxidation product of the reducing agent can be used.

As the catalyst comprising titanium, magnesium and a halogen element as the essential components of catalyst component (X-2), the catalysts described in Japanese Patent Application Laid-Open Nos. Showa 53(1978)-45688, Showa 54(1979)-3894, Showa 54(1979)-31092, Showa 54(1979)-39483, Showa 54(1979)-94591, Showa 54(1979)-118484, Showa 54(1979)-131589, Showa 58(1983)-5309, Showa 58(1983)-5310, Showa 58(1983)-5311, Showa 58(1983)-8706, Showa 58(1983)-27732, Showa 58(1983)-32604, Showa 58(1983)-32605, Showa 58(1983)-67703, Showa 58(1983)-117206, Showa 58(1983)-127708, Showa 58(1983)-183708, Showa 58(1983)-183709, Showa 59(1984)-149905, Showa 59(1984)-149906, Showa 64(1989)-69608, Heisei 10(1998)-25318 and Heisei 11(1999)-269218 can be used.

In the catalyst comprising titanium, magnesium and a halogen element as the essential components, the halogen element may be present in at least one of a titanium compound and a magnesium compound or in another component. Examples of the titanium compound include tetraalkoxytitaniums such as tetramethoxytitanium, tetraethoxytitanium, tetra-n-propoxytitanium, tetraisopropoxytitanium, tetra-n-butoxytitanium, tetraisobutoxytitanium, tetracyclohexyloxytitanium and tetraphenoxytitanium; titanium tetrahalides such as titanium tetrachloride, titanium tetrabromide and titanium tetraiodide; alkoxytitanium trihalides such as methoxytitanium trichloride, ethoxytitanium trichloride, propoxytitanium trichloride, n-butoxytitanium trichloride and ethoxytitanium tribromide; dialkoxytitanium dihalides such as dimethoxytitanium dichloride, diethoxytitanium dichloride, diisopropoxytitanium dichloride, di-n-propoxytitanium dichloride and diethoxytitanium dibromide; and trialkoxytitanium monohalides such as trimethoxytitanium chloride, triethoxytitanium chloride, triisopropoxytitanium chloride, tri-n-propoxytitanium chloride and tri-n-butoxytitanium chloride. Among these compounds, titanium compounds having many halogen atoms are preferable and titanium tetrachloride is more preferable from the standpoint of the polymerization activity. The titanium compound may be used singly or in combination of two or more.

Examples of the magnesium compound include alkylmagnesiums and arylmagnesiums such as dimethylmagnesium, diethylmagnesium, diisopropylmagnesium, dibutylmagnesium, dihexylmagnesium, dioctylmagnesium, ethylbutylmagnesium, diphenylmagnesium and dicyclohexylmagnesium; alkoxymagnesiums and aryloxymagnesiums such as diemethoxymagnesium, diethoxymagnesium, dipropoxymagnesium, dibutoxymagnesium, dihexyloxymagnesium, dioctoxymagnesium, diphenoxymagnesium and dicyclohexyloxymagnesium; alkylmagnesium halides and arylmagnesium halides such as ethylmagnesium chloride, butylmagnesium chloride, hexylmagnesium chloride, isopropylmagnesium chloride, isobutylmagnesium chloride, t-butylmagnesium chloride, phenylmagnesium bromide, benzylmagnesium chloride, ethylmagnesium bromide, butylmagnesium bromide, phenylmagnesium chloride and butylmagnesium iodide; alkoxymagnesium halides and aryloxy magnesium halides such as butoxymagnesium chloride, cyclohexyloxy-magnesium chloride, phenoxymagnesium chloride, ethoxymagnesium bromide, butoxymagnesium bromide and ethoxymagnesium iodide; and magnesium halides such as magnesium chloride, magnesium bromide and magnesium iodide.

Among these magnesium compounds, magnesium halides, alkoxymagnesiums, alkylmagnesiums and alkylmagnesium halides are preferable from the standpoint of the polymerization activity and the stereoregularity. The above magnesium compound can be prepared from metallic magnesium or a compound having magnesium.

Catalyst component (X-2) may comprise (iii) an electron-donating compound (a) in addition to (i) the titanium compound and (ii) the magnesium compound. Examples of electron-donating compound (a) include electron-donating compounds having oxygen atom such as alcohols, phenols, ketones, aldehydes, carboxylic acids, malonic acid, esters of organic acids and inorganic acids and ethers including mono-ethers, diethers and polyethers; and electron-donating compounds having nitrogen atom such as ammonia, amines, nitriles and isocyanates. Among these compounds, esters of polybasic carboxylic acids are preferable and esters of aromatic polybasic carboxylic acids are more preferable. From the standpoint of the polymerization activity, monoesters and/or diesters of aromatic dicarboxylic acids are still more preferable. It is preferable that the organic group in the ester portion is a linear, branched or cyclic aliphatic hydrocarbon.

Specific examples include dialkyl esters of dicarboxylic acids such as phthalic acid, naphthalene-1,2-dicarboxylic acid, naphthalene-2,3-dicarboxylic acid, 5,6,7,8-tetrahydronaphthalene-1,2-dicarboxylic acid, 5,6,7,8-tetrahydronaphthalene-2,3-dicarboxylic acid, indane-4,5-dicarboxylic acid and indane-5,6-dicarboxylic acid, in which the ester group has methyl group, ethyl group, n-propyl group, isopropyl group, n-butyl group, isobutyl group, t-butyl group, n-pentyl group, 1-methylbutyl group, 2-methylbutyl group, 3-methylbutyl group, 1,1-dimethylpropyl group, 1-methylpentyl group, 2-methylpentyl group, 3-methylpentyl group, 4-methylpentyl group, 1-ethylbutyl group, 2-ethylbutyl group, n-hexyl group, cyclohexyl group, n-heptyl group, n-octyl group, n-nonyl group, 2-methylhexyl group, 3-methylhexyl group, 4-methylhexyl group, 2-ethylhexyl group, 3-ethylhexyl group, 4-ethylhexyl group, 2-methylpentyl group, 3-methylpentyl group, 2-ethylpentyl group or 3-ethylpentyl group. Among these compounds, diesters of phthalic acid are preferable and compounds in which the organic group is a linear or branched aliphatic hydrocarbon group having 4 or more carbon atoms are preferable.

Preferable specific examples include di-n-butyl phthalate, diisobutyl phthalate, di-n-heptyl phthalate and diethyl phthalate. The above compounds may be used singly or in combination of two or more.

Catalyst component (X-2) may comprise (iv) a silicon compound in addition to (i) the titanium compound, (ii) the magnesium compound and (iii) electron-donating compound (a). Examples of the silicon compound include silicon tetrachloride, methoxytrichlorosilane, dimethoxydichlorosilane, trimethoxychlorosilane, ethoxytrichlorosilane, diethoxydichlorosilane, triethoxychlorosilane, propoxytrichlorosilane, dipropoxydichlorosilane and tripropoxychlorosilane. Among these compounds, silicon tetrachloride is preferable. The silicon compound may be used singly or in combination of two or more.

Catalyst component (X-2) may further comprise (v) an organoaluminum compound. As the organoaluminum compound, compounds having alkyl groups, halogen atoms, hydrogen atom and alkoxyl groups, aluminoxanes and mixtures of these compounds are preferable. Examples of the organoaluminum compound include trialkylaluminums such as trimethylaluminum, triethylaluminum, triisopropylaluminum, triisobutylaluminum and trioctylaluminum; dialkylaluminum monochlorides such as diethylaluminum monochloride, diisopropylaluminum monochloride, diisobutylaluminum monochloride and dioctylaluminum monochloride; alkylaluminum sesquihalides such as ethylaluminum sesquichloride; and chain aluminoxanes such as methylaluminoxane. Among these organoaluminum compounds, trialkylaluminums having a lower alkyl group having 1 to 5 carbon atoms such as trimethylaluminum, triethylaluminum, tripropylaluminum and triisobutylaluminum are preferable. The organoaluminum compound may be used singly or in combination of two or more.

Catalyst component (X-2) may further comprise (vi) electron-donating compound (b). As electron-donating compound (b), organosilicon compounds having the Si—O—C bond, compounds having nitrogen atom, compounds having phosphorus atom and compounds having oxygen atom can be used. Among these compounds, the organosilicon compounds having the Si—O—C bond, ethers and esters are preferable and the organosilicon compounds having the Si—O—C bond are more preferable from the standpoint of the polymerization activity and the stereoregularity.

Examples of the compound having the Si—O—C bond include tetramethoxysilane, tetraethoxysilane, tetrabutoxysilane, tetraisobutoxysilane, trimethylmethoxysilane, trimethylethoxysilane, triethylmethoxysilane, triethylethoxysilane, ethylisopropyldimethoxysilane, propylisopropyldimethoxysilane, diisopropyldimethoxysilane, diisobutyldimethoxysilane, isopropylisobutyldimethoxysilane, di-t-butyldimethoxysilane, t-butylmethyldimethoxysilane, t-butylethyldimethoxysilane, t-butylpropyldimethoxysilane, t-butylisopropyldimethoxysilane, t-butylbutyldimethoxysilane, t-butylisobutyldimethoxysilane, t-butyl(s-butyl)dimethoxysilane, t-butylamyldimethoxysilane, t-butylhexyldimethoxysilane, t-butylheptyldimethoxysilane, t-butyloctyldimethoxysilane, t-butylnonyldimethoxysilane, t-butyldecyldimethoxysilane, t-butyl(3,3,3-trifluoromethylpropyl)dimethoxysilane, cyclohexylmethyldimethoxysilane, cyclohexylethyldimethoxysilane, cyclohexylpropyldimethoxysilane, cyclopentyl-t-butyldimethoxysilane, cyclohexyl-t-butyldimethoxysilane, dicyclopentyldimethoxysilane, dicyclohexyldimethoxysilane, bis(2-methylcyclopentyl)dimethoxysilane, bis(2,3-dimethylcyclopentyl)dimethoxysilane, diphenyldimethoxysilane, phenyltriethoxysilane, methyltrimethoxysilane, ethyltrimethoxysilane, propyltrimethoxysilane, isopropyltrimethoxysilane, butyltrimethoxysilane, isobutyltrimethoxysilane, t-butyltrimethoxysilane, s-butyltrimethoxysilane, amyltrimethoxysilane, isoamyltrimethoxysilane, cyclopentyltrimethoxysilane, cyclohexyltrimethoxysilane, norbornanetrimethoxysilane, indenyltrimethoxysilane, 2-methylcyclopentyltrimethoxysilane, cyclopentyl(t-butoxy)dimethoxysilane, isopropyl(t-butoxy)dimethoxysilane, t-butyl(isobutoxy)dimethoxysilane, t-butyl(t-butoxy)dimethoxysilane, thexyltrimethoxysilane, thexylisopropoxydimethoxysilane, thexyl(t-butoxy)dimethoxysilane, thexylmethyldimethoxysilane, thexylethyldimethoxysilane, thexylisopropyldimethoxysilane, thexylcyclopentyldimethoxysilane, thexylmyristyldimethoxysilane, thexylcyclohexyldimethoxysilane, dicyclohexyldimethoxysilane, cyclohexylmethyldimethoxysilane, dicyclohexyldimethoxysilane, bis(3-methylcyclopentyl)dimethoxysilane, bis(2-ethylcyclopentyl)dimethoxysilane, bis(2,3-diethylcyclopentyl) dimethoxysilane, bis(2,4-dimethylcyclopentyl) dimethoxysilane, bis(2,5-dimethylcyclopentyl) dimethoxysilane, bis(2,3,4-trimethylcyclopentyl) dimethoxysilane, bis(2,3,5-triethylcyclopentyl) dimethoxysilane, bis(2,3,5-trimethylcyclopentyl) dimethoxysilane and bis(tetramethylcyclopentyl) dimethoxysilane. The organosilicon compound may be used singly or in combination of two or more.

Examples of the compound having nitrogen atom include 2,6-substituted piperidines such as 2,6-diisopropylpiperidine, 2,6-diisopropyl-4-methylpiperidine and N-methyl-2,2,6,6-tetramethylpiperidine; 2,5-substituted azolidines such as 2,5-diisopropylazolidine and N-methyl-2,2,5,5-tetramethylazolidine; substituted methylenediamines such as N,N,N',N'-tetramethylmethylenediamine and N,N,N',N'-tetraethylmethylenediamine; and substituted imidazolidines such as 1,3-dibenzylimidazolidine and 1,3-dibenzyl-2-phenylimidazolidine.

Examples of the compound having phosphorus atom include esters of phosphorous acid such as triethyl phosphite, tri-n-propyl phosphite, triisopropyl phosphite, tri-n-butyl phosphite, triisobutyl phosphite, diethyl n-butyl phosphite and diethyl phenyl phosphite. Examples of the compound having oxygen atom include 2,6-substituted tetrahydrofurans such as 2,2,6,6,-tetramethyltetrahydrofuran and 2,2,6,6-tetraethyltetrahydrofuran; and dimethoxymethane derivatives such as 1,1-dimethoxy-2,3,4,5-tetrachlorocyclopentadiene, 9,9-dimethoxyfluorene and diphenyldimethoxymethane.

The titanium compound (i) is used in an amount, in general, in the range of 0.5 to 100 moles and preferably in the range of 1 to 50 moles per 1 mole of magnesium in the magnesium compound (ii). When the amount of the titanium compound (i) is outside the above range, the activity of the catalyst is occasionally insufficient. (iii) Electron-donating compound (a) or (iv) electron-donating compound (b) is used in an amount, in general, in the range of 0.01 to 10 moles and preferably in the range of 0.05 to 1.0 mole per 1 mole of magnesium in the magnesium compound (ii). When the amount is outside the above range, the activity of the catalyst and the stereoregularity are occasionally insufficient. When the silicon compound (iv) is used, the amount of the silicon compound is, in general, in the range of 0.001 to 100 moles and preferably in the range of 0.005 to 5.0 moles per 1 mole of magnesium in the magnesium compound (ii). When the amount is outside the above range, the activity of the catalyst and the stereoregularity are not exhibited sufficiently and the amount of fine powder in the formed polymer occasionally increases.

Examples of the process for preparing catalyst component (X-2) include (1) a process in which the titanium compound (i), the magnesium compound (ii) and (iii) electron-donating compound (a) are brought into contact with each other at 120 to 150° C. and washed at 100 to 150° C.; (2) a process in which the titanium compound (i), the magnesium compound (ii), (iii) the electron-donating compound (a) and the silicon compound (iv) are brought into contact with each other at 120 to 150° C. and washed at 100 to 150° C.; (3) the titanium compound (i), the magnesium compound (ii) and (iii) electron-donating compound (a) are brought into contact with each other to obtain a solid catalyst component and (vi) electron-donating compound (b) and the organoaluminum compound (v) are brought into contact with the solid catalyst component; and (4) a process in which, after the titanium compound (i), the magnesium compound (ii) and (iii) electron-donating compound (a) are brought into contact with each other at 120 to 150° C. and washed at 100 to 150° C. to obtain a solid catalyst component, (vi) electron-donating compound (b) and the organoaluminum compound (v) are brought into contact with the solid catalyst component.

Catalyst component (X-2) can also be prepared in accordance with the process in which ethoxymagnesium among the magnesium compounds (ii) is suspended in an alkylbenzene (vii), thereafter, titanium tetrachloride among the titanium compounds (i) in an amount by volume of ½ or less of the amount by volume of the alkylbenzene and a diester of phthalic acid among (iii) electron-donating compounds (a) are brought into contact with the above suspension at 80 to 135° C., the obtained solid substance is washed with the alkylbenzene, and the obtained solid substance is reacted with titanium tetrachloride in an amount by volume of ½ or less of the amount by volume of the alkylbenzene (the process described in Japanese Patent Application Laid-Open No. Showa 64(1989)-69608) Examples of the alkylbenzene include toluene, xylene, ethylbenzene, propylbenzene or trimethylbenzene.

As the organoaluminum compound (Y) in the catalyst used in process III of the present invention, the same compounds as those described as the examples of the foregoing organoaluminum compound (v) can be used. In the preparation of the catalyst used in the present invention, where necessary, an electron-donating compound (Z) is used as the third component. As the electron-donating compound (Z) as the third component, the same compounds as those described as the examples of the foregoing (vi) electron-donating compound (b) can be used.

Catalyst component (X) is used, in general, in an amount such that the amount of titanium atom is in the range of 0.00005 to 1 millimole per 1 liter of the reaction volume. The organoaluminum compound (Y) is used in an amount such that the ratio of the amounts by atom of aluminum/titanium is, in general, in the range of 1 to 1,000 and preferably in the range of 10 to 500. When the electron-donating compound (Z) is used as the third component, the electron-donating compound (Z) as the third component is used in an amount such that the ratio of the amounts by mole of the electron-donating compound (Z)/the organoaluminum compound (Y) is, in general, in the range of 0.001 to 5.0, preferably in the range of 0.01 to 2.0 and more preferably in the range of 0.05 to 1.0. When the above ratio of the amounts by mole is outside the above range, occasionally, the activity of the catalyst and the stereoregularity are not exhibited sufficiently. However, the ratio can be further decreased when the preliminary polymerization is conducted.

Process III for producing a polyolefin-based resin composition of the present invention comprises:

in a first polymerization stage, polymerizing or copolymerizing at least one monomer selected from ethylene, propylene and α-olefins having 4 to 20 carbon atoms in the presence of the above catalyst, and in a second polymerization stage, copolymerizing the homopolymer or the copolymer obtained in the first polymerization stage with at least one monomer selected from ethylene, propylene and α-olefins having 4 to 20 carbon atoms in the presence of a polyene having at least two polymerizable carbon-carbon double bonds in one molecule.

Examples of the α-olefin having 4 to 20 carbon atoms include the same α-olefins and α-olefins substituted with halogens as those described as the examples of the α-olefins having 4 to 20 carbon atoms in the processes described above.

As the polyene used in the second polymerization stage, any polyene having at least two polymerizable carbon-carbon double bonds in one molecule can be used. Examples of the polyene include the same polyenes described as the examples of the polyenes in processes I and II.

In process III of the present invention, the polyenes of the α,ω-type, the polyenes of the styrene type, the cyclic polyenes shown by the chemical formulae in processes I and II and the polyenes of the styrene-α-olefin type are preferable since the reactivity of the carbon-carbon double bond is great and the amount of the residual unsaturated group which tends to decrease the heat stability during production of the composition can be decreased.

The polyenes of the α, ω-type, the polyenes of the styrene type and the cyclic polyene shown by the chemical formulae are used in an amount, in general, in the range of $1.0 \times 10^{-6}$ to $6.0 \times 10^{-3}$ moles, more preferably in the range of $2.0 \times 10^{-6}$ to $3.0 \times 10^{-3}$ moles, still more preferably in the range of $3.0 \times 10^{-6}$ to $2.4 \times 10^{-3}$ moles, still more preferably in the range of $4.0 \times 10^{-6}$ to $1.2 \times 10^{-3}$ moles and most preferably in the range of $5.0 \times 10^{-6}$ to $0.6 \times 10^{-3}$ moles per 1 g of the polymer obtained in the first polymerization stage.

Cyclic polyenes other than the cyclic polyene shown by the chemical formulae are used in an amount, in general, in the range of $5.0 \times 10^{-5}$ to $3.0 \times 10^{-2}$ moles, more preferably in the range of $1.0 \times 10^{-5}$ to $1.5 \times 10^{-2}$ moles, still more preferably in the range of $1.5 \times 10^{-5}$ to $1.2 \times 10^{-2}$ moles, still more preferably in the range of $2.0 \times 10^{-5}$ to $0.6 \times 10^{-2}$ moles and most preferably in the range of $2.5 \times 10^{-5}$ to $0.3 \times 10^{-2}$ moles per 1 g of the polymer obtained in the first polymerization stage.

The polyenes of the styrene/α-olefin types are used in an amount, in general, in the range of $1.0 \times 10^{-6}$ to $6.0 \times 10^{-3}$ moles, more preferably in the range of $2.0 \times 10^{-6}$ to $3.0 \times 10^{-3}$ moles, still more preferably in the range of $3.0 \times 10^{-6}$ to $2.4 \times 10^{-3}$ moles, still more preferably in the range of $4.0 \times 10^{-6}$ to $1.2 \times 10^{-3}$ moles and most preferably in the range of $5.0 \times 10^{-6}$ to $0.6 \times 10^{-3}$ moles per 1 g of the polymer obtained in the first polymerization stage.

When the amount of the polyene is smaller than the above range, there is the possibility that the improvement in the workability of the obtained polyolefin-based resin composition cannot be expected. When the amount of the polyene is greater than the above range, suppressing the formation of gel becomes difficult.

In process III of the present invention, the first polymerization stage is the polymerization stage conducted before the second polymerization stage using the polyene and may be conducted in accordance with a multi-stage polymerization process such as a two-stage polymerization. The monomers described above are used in the first polymerization stage. When the homopolymer of ethylene or an ethylene-based copolymer of ethylene and at least one of α-olefins having 4 to 20 carbon atoms is obtained in the first polymerization stage, it is preferable that the content of the ethylene unit is in the range of 50 to 100% by mole.

When the homopolymer of propylene or a propylene-based copolymer of propylene and at least one of ethylene and an α-olefin having 4 to 20 carbon atoms are copolymerized is obtained in the first polymerization stage, it is preferable that the content of the propylene unit is in the range of 50 to 100% by mole. It is preferable that the stereoregularity of the propylene sequence is isotactic and mmmm (the fraction of the meso pentad) is in the range of 40 to 99.5%.

In the first polymerization stage, when the homopolymer of an α-olefin having 4 to 20 carbon atoms, a copolymer of different types of α-olefins having 4 to 20 carbon atoms or an α-olefin-based copolymer of one of α-olefins having 4 to 20 carbon atoms with at least one of ethylene and propylene is obtained, it is preferable the content of the α-olefin monomer unit is in the range of 50 to 100% by mole.

Examples of the polyethylene-based polymer having a content of the ethylene unit in the range of 50 to 100% include homopolymer of ethylene, ethylene/propylene copolymers, ethylene/1-butene copolymers, ethylene/1-hexene copolymers, ethylene/1-octene copolymers, ethylene/1-decene copolymers and ethylene/eincosene copolymers.

Examples of the polypropylene-based polymer having a content of the propylene unit in the range of 50 to 100% by mole include isotactic polypropylene, propylene/ethylene copolymers, propylene/1-butene copolymers, propylene/1-hexene copolymers, propylene/1-octene copolymers, propylene/1-decene copolymers and propylene/1-eicosene copolymers.

Examples of the poly-α-olefin-based polymer having a content of the α-olefin unit having 4 to 20 carbon atoms in the range of 50 to 100% by mole include poly-1-butene, 1-butene/ethylene copolymers, 1-butene/propylene copolymers, 1-butene/1-decene copolymers, 1-butene/1-eicosene copolymers, poly(4-methyl-1-pentene), poly(3-methyl-1- butene) and copolymers obtained by replacing 1-butene in the above polymers with 4-methylpentene-1 or 3-methyl-1-butene.

When the molecular weight of the polymer obtained in the first polymerization stage is defined by the intrinsic viscosity, it is preferable that the intrinsic viscosity [η] measured in decalin as the solvent at 135° C. is in the range of 0.1 to 10 deciliter/g, more preferably in the range of 0.15 to 8 deciliter/g, still more preferably in the range of 0.2 to 7 deciliter/g, still more preferably in the range of 0.5 to 6 deciliter/g and most preferably in the range of 0.7 to 5 deciliter/g. When the intrinsic viscosity is smaller than 0.1 deciliter/g, there is the possibility that the polyolefin-based resin composition of the present invention exhibits decreased mechanical properties as the composition. When the intrinsic viscosity exceeds 10 deciliter/g, there is the possibility that workability in molding of the composition deteriorates.

The molecular weight distribution of the polymer produced in the first polymerization stage is not particularly limited. It is preferable that the ratio of the weight-average molecular weight (Mw) to the number-average molecular weight (Mn), i.e., Mw/Mn, measured in accordance with GPC (the gel permeation chromatography) is in the range of 2.5 to 20 and more preferably in the range of 3.5 to 15.

It is preferable as described above that the stereoregularity of the polymer produced in the first polymerization stage is the isotactic configuration. It is preferable that mmmm is in the range of 40 to 99.9% and more preferably in the range of 60 to 99.9% When propylene is used as the monomer, it is preferable that mmmm=70 to 99.9%, more preferably mm=85 to 99.5%, still more preferably mmmm=90 to 99.5%, still more preferably mmmm=93 to 99.9%, still more preferably mmmm=95 to 99.9%, still more preferably mmmm=97 to 99.9% and most preferably mmmm=97.8 to 99.9%. When mmmm is smaller than 70%, the rigidity and the heat resistance as the proper properties of polypropylene are not exhibited. A value of mmmm in the range exceeding 99.9% is desirable but it is technologically difficult to achieve the value in this range.

The polymer may be produced in the first polymerization stage in accordance with any of the random copolymerization, the block copolymerization and the graft copolymerization.

Examples of the form of the reaction in the first polymerization stage include the slurry polymerization, the gas phase polymerization and the bulk polymerization each using a heterogeneous catalyst and the polymerization in a homogeneous system. In the case of the slurry polymerization, the gas phase polymerization and the bulk polymerization using a heterogeneous catalyst, it is preferable that the reaction product is obtained in the form of particles. It is preferable that the average diameter of powder (the polymer powder formed in the first polymerization stage) is in the range of 50 μm to 5 mm, more preferably in the range of 100 μm to 4.5 mm and most preferably in the range of 150 μm to 4 mm. When the average particle diameter is smaller than 50 μm, there is the possibility that piping passageways are clogged due to the formation of fine powder. When the average particle diameter exceeds 5 mm, there is the possibility that rough grains increase and piping passageways are clogged.

The bulk density of the polymer powder produced in the first polymerization stage is, in general, in the range of 0.1 to 0.5 g/milliliter, preferably in the range of 0.15 to 0.5 g/milliliter, more preferably in the range of 0.20 to 0.5 g/milliliter and most preferably in the range of 0.25 to 0.48 g/milliliter. When the bulk density is smaller than 0.1 g/milliliter, there is the possibility that the productivity of the polymer per unit volume of the reactor decreases. When the bulk density exceeds 0.5 g/milliliter, there is the possibility that dispersion of the polyene added in the second polymerization stage and catalyst components added where necessary into the powder decrease and the uniform composition cannot be produced. The bulk density is measured in accordance with the method of Japanese Industrial Standard K 6721.

Examples of the polymer produced in accordance with the slurry polymerization, the gas phase polymerization and the bulk polymerization using a heterogeneous catalyst in the first polymerization stage include polyethylene, copolymers of ethylene and monomer components other than ethylene (30% by mole or less), isotactic polypropylene, copolymers of propylene and monomer components other than propylene (30% by mole or less), poly-4-methylpentene-1, poly-3-methyl-1-butene, copolymers of 4-methylpentene-1 and monomer components other than 4-methylpentene-1 (30% by mole or less), poly-3-methylpentene-1 and copolymers of 3-methyl-1-butene and monomer components other than 3-methyl-1-butene (30% by mole or less).

In the case of the polymerization in the homogeneous system using a heterogeneous catalyst, it is preferable that the formed polymer is dissolved into the polymerization solvent or the monomer in the condition of the production. As the solvent, a conventional hydrocarbon compound such as toluene, cyclohexane and decane can be used. It is sufficient that the homogeneous system is achieved by the change in the solvent or the temperature before the second polymerization is conducted even when the powder is separated in the first polymerization stage.

Examples of the polymer produced in accordance with the polymerization in the homogeneous system in the first polymerization stage include copolymers of ethylene and monomer components other than ethylene (30 to 99% by mole), copolymers of propylene and monomer components other than propylene (30 to 99% by mole) and polypropylene having a low stereoregularity (mmmm=40 to 80% by mole).

In the first polymerization stage, the polymerization can be conducted at a temperature in the range of −100 to 300° C. under a pressure in the range of 0.001 to 10 MPa for the polymerization time in the range of 10 seconds to 8 hours.

In the case of the slurry polymerization, the gas phase polymerization and the bulk polymerization using the heterogeneous catalyst, the polymerization condition is not particularly limited as long as the particulate polymer is formed. The preferable polymerization conditions are a temperature in the range of −100 to 120° C., a polymerization pressure in the range of 0.001 to 10 MPa and a polymerization time in the range of 10 seconds to 8 hours. In the case of the homogeneous polymerization using a heterogeneous catalyst, the polymerization condition is not particularly limited as long as the homogeneous condition is maintained. The preferable polymerization conditions are a temperature in the range of 0 to 300° C., a polymerization pressure in the range of 0.001 to 10 MPa and a polymerization time in the range of 10 seconds to 3 hours.

In process III of the present invention, the second polymerization stage is a stage of copolymerizing a monomer containing a polyene with the polymer produced in the first polymerization stage. In the second polymerization stage, the polymer produced in the first polymerization stage is used as a sort of reactor or reaction field. The polymer is formed by the polymerization in the presence of the polyene in the polymer obtained in the first polymerization stage and is uniformly dispersed in the polymer obtained in the first polymerization stage. The second polymerization stage is suitably a stage for forming IPN (the interpenetrating polymer network).

The type of the monomer which can be used in the second polymerization stage is restricted depending on the type of the monomer used in the first polymerization stage. When the homogeneous polymerization is conducted in the first polymerization stage and a liquid monomer is used (process (a)), the complete removal of the liquid monomer is difficult after the first polymerization stage is completed and, in general, the liquid monomer is left remaining in the second polymerization stage. Therefore, the monomer used in the second polymerization stage is limited to the monomers containing the remaining liquid monomer. Examples of the liquid monomer include α-olefins having 5 to 20 carbon atoms.

When the system used in the first polymerization stage is the polymerization system forming polymer particles using a heterogeneous catalyst (process (b)), it is possible that the monomer is removed in accordance with the means described in the following and the type of the monomer used in the second polymerization stage is not limited at all. For example, gaseous monomers such as ethylene and propylene can be easily removed from the polymerization system by reducing the pressure. When the monomer is a liquid, the monomer can be separated from the polymer using the technology of filtration.

In the present invention, process (b) described above is preferable since, in general, there is restrictions for producing a polymer having a high molecular weight from a higher α-olefin, i.e., a liquid monomer, in comparison with that from a lower α-olefin such as ethylene and propylene and the increase in the molecular weight in the second polymerization stage which is necessary to achieve the object of the present invention is restricted.

As for the process for adding the polyene in the second polymerization stage, it is important that the polyene is uniformly dispersed into the polymerization field before the polymerization starts in the second polymerization stage. Specifically, the polyene can be added after being dissolved into the solvent used for the polymerization or a solvent inert to the polymerization such as a hydrocarbon solvent and a halogenated hydrocarbon solvent (the concentration: 0.01 to 10 moles/liter) or after converting into a gas.

The addition of the polyene can be conducted while the polymer produced in the first polymerization stage is stirred or in accordance with the dry blending.

As for the rate of addition, it is preferable that the polyene in the range of 0.01 millimole to 4 moles per 100 g of the polymer produced in the first polymerization stage is added within a time in the range of 1 second to 1 hour.

The above operation may be conducted in accordance with the continuous process or the batch process. It is preferable that the product obtained after the addition of the polyene is kept for a time in the range of 1 second to 1 hour to achieve the uniform dispersion.

The polymer composition obtained in the second polymerization stage is a composition comprising a desired combination of the polymer obtained in the first polymerization stage and one of the polymers shown in the following terms (i) to (ii). When the monomer used in the first polymerization stage is the same as the monomer used in the second polymerization monomer, a composition comprising a copolymer obtained by copolymerizing the polyene to the polymer obtained in the first polymerization stage can be obtained.

(i) Ethylene-based copolymer: a copolymer of ethylene/polyene and a copolymer of ethylene/polyene and at least one of α-olefins having 3 to 20 carbon atoms (the content of ethylene unit: 50 to 100% by mole).

(ii) Propylene-based copolymer: a copolymer of propylene/polyene and a copolymer of propylene/polyene and at least one of ethylene, α-olefins having 4 to 20 carbon atoms (the content of the propylene unit: 50 to 100% by mole).

The stereoregularity of the propylene sequence is preferably isotactic, more preferably mmmm=70 to 99.5% by mole, still more preferably mmmm=80 to 99.5% by mole, still more preferably mmmm=85 to 99.5% by mole, still more preferably mmmm=88 to 99.5% by mole, still more preferably 90 to 99.5% by mole, still more preferably mmmm=95 to 99.5% by mole and most preferably mmmm=97.8 to 99.5% by mole. When mmmm is smaller than 70%, the rigidity and the heat resistance as the proper properties of polypropylene are not exhibited. A value of mmmm in the range exceeding 99.9% is desirable but it is technologically difficult to achieve the value in this range.

(iii) α-Olefin-based copolymer: a copolymer of α-olefin having 4 to 20 carbon atoms/polyene copolymer, a copolymer of an α-olefin having 4 to 20 carbon atoms (a)/a polyene and α-olefin having 4 to 20 carbon atoms (b) [(a)≠(b)] and a copolymer of at least one of α-olefins having 4 to 20 carbon atoms, a polyene and at least one of ethylene and propylene (the content of the α-olefin unit: 50 to 100% by mole).

Specific examples of the polymer produced in the first polymerization stage and the second polymerization stage are shown in Table 2.

TABLE 2

| The first polymerization stage | The second polymerization stage |
|---|---|
| polyethylene | ethylene/polyene copolymer |
| polyethylene | ethylene/propylene/polyene copolymer |
| polyethylene | ethylene/butene/polyene copolymer |
| ethylene/propylene copolymer | ethylene/polyene copolymer |
| ethylene/butene copolymer | ethylene/polyene copolymer |
| ethylene/hexene copolymer | ethylene/polyene copolymer |
| ethylene/octene copolymer | ethylene/polyene copolymer |
| ethylene/octene copolymer | ethylene/octene/polyene copolymer |
| isotactic polypropylene | isotactic polypropylene/polyene copolymer |
| isotactic polypropylene | ethylene/polyene copolymer |
| isotactic polypropylene | ethylene/butene/polyene copolymer |
| isotactic polypropylene | ethylene/octene/polyene copolymer |
| isotactic polypropylene/ethylene copolymer | ethylene/polyene copolymer |
| isotactic polypropylene/ethylene copolymer | isotactic polypropylene/ethylene/polyene copolymer |
| isotactic polypropylene/octene copolymer | ethylene/polyene copolymer |
| isotactic polypropylene/octene copolymer | ethylene/octene/polyene copolymer |
| polybutene | ethylene/polyene copolymer |
| polybutene | propylene/polyene copolymer |
| poly(4-methyl-1-pentene) | ethylene/polyene copolymer |
| poly(4-methyl-1-pentene) | propylene/polyene copolymer |
| poly(4-methyl-1-pentene) | ethylene/poly(4-methyl-1-pentene)/polyene copolymer |
| poly(3-methyl-1-butene) | ethylene/polyene copolymer |
| poly(3-methyl-1-butene) | propylene/polyene copolymer |
| poly(3-methyl-1-butene) | ethylene/poly(3-methyl-1-butene)/polyene copolymer |
| poly(4-methyl-1-pentene)/ethylene | ethylene/polyene copolymer |
| poly(4-methyl-1-pentene)/propylene | propylene/polyene copolymer |

Among the above examples, copolymers obtained by using ethylene or propylene as the monomer in the second polymerization stage are preferable and ethylene/polyene copolymers and propylene/polyene copolymers are more preferable.

The content of the polyene unit in the polymer prepared in the second polymerization stage exceeds 0 and is 50% by weight or smaller, preferably 20% by weight or smaller, more preferably 20% by weight or smaller, still more preferably 10% by weight or smaller, still more preferably 5% by weight or smaller, still more preferably 2% by weight or smaller, still more preferably 1% or smaller, still more preferably 0.5% or smaller, still more preferably smaller than 0.5% by weight and most preferably 0.05% by weight.

When the content of the polyene unit exceeds 50% by weight, the melt fluidity of the resin decreases. When the content of the polyene is 0, the workability in molding is not improved.

In the above polyolefin-based resin composition, it is preferable that the content of the polyene unit exceeds 0 and is 10% by weight or smaller. When the workability in molding such as tension in melted condition is to be improved in the polyolefin-based resin composition, it is preferable that the content of the polyene unit is 0.5% by weight or smaller, more preferably 0.4% by weight or smaller, still more preferably 0.3% by weight or smaller, still more preferably 0.2% by weight or smaller, still more preferably 0.1% by weight or smaller and most preferably 0.05% by weight or smaller. When the polyolefin-based resin composition does not comprise the polyene unit, the workability in molding is not improved. When the content of the polyene unit exceeds 10% by weight, there is the possibility that the melt fluidity of the resin decreases or gel is formed.

When the uniform composition is to be produced in the process for producing the polyolefin-based resin composition, it is preferable that the content of the polyene unit is 5% by weight or smaller, more preferably 4.5% by weight or smaller, still more preferably 4% by weight or smaller, still more preferably 3.5% by weight or smaller and most preferably 3% or smaller. When the polyolefin-based resin composition does not comprise the polyene unit, the uniformity decreases. When the content of the polyene unit exceeds 10% by weight, there is the possibility that the composition becomes infusible and the working by melt molding is adversely affected although dispersion is improved from the standpoint of entanglement of the molecular chains.

When the molecular weight of the polyolefin-based resin composition is defined by the intrinsic viscosity, it is preferable that the intrinsic viscosity $[\eta]_T$ measured in decaline as the solvent at 135° C. is in the range of 0.5 to 15 deciliter/g, more preferably in the range of 0.6 to 10 deciliter/g, still more preferably in the range of 0.7 to 8 deciliter/g and most preferably in the range of 0.9 to 6 deciliter/g. When the intrinsic viscosity is smaller than 0.5 deciliter/g, there is the possibility that the mechanical properties of the polyolefin-based resin composition deteriorate. When the intrinsic viscosity exceeds 15 deciliter/g, there is the possibility that working by molding becomes difficult. It is necessary that the polyolefin-based resin composition do not contain insoluble components in this test [the requirement (c) for the resin composition obtained in the present invention]. When insoluble components are contained, drawbacks arise in that the appearance of the molded article deteriorates due to the formation of rough grains on the surface and that mechanical properties deteriorate due to the stress concentration.

When the molecular weight of the polyolefin-based resin composition is defined by the melt index (MI) which is an index for the molecular weight in the melted condition, it is preferable that MI is in the range of 0.01 to 500 g/10 minutes.

The conditions of the measurement of MI on various resins are shown in the following.
(i) A resin composition comprising 50% by mole or more of the ethylene unit: at 190° C. under a load of 21.18 N
(ii) A resin composition comprising 50% by mole or more of the propylene unit: at 230° C. under a load of 21.18 N
(iii) A resin composition comprising 50% by mole or more of the unit of an α-olefin having 4 to 20 carbon atoms: at 230° C. under a load of 21.18 N It is preferable that the molecular weight distribution of the olefin-based resin composition expressed by Mw/Mn measured in accordance with GPC is in the range of 2.7 to 70 and more preferably in the range of 3.0 to 15.

The uniformity of the polyolefin-based resin composition can be evaluated from the condition of dispersion, the uniformity of the shape of the dispersed particles and the decrease in the particle diameter in comparison with those of conventional melt mixtures in visual or magnified observation of the surface or the face of fracture of a melt molded article (such as a film, a sheet and an injection molded article) of the composition.

The uniformity of the composition can be evaluate from the improvements in the general physical properties such as the elongation at break, the modulus and the yielding stress.

It is necessary that the fraction of the polymer obtained in the second polymerization stage based on the amount of the polyolefin-based resin composition obtained in the entire production process be in the range of 0.001 to 80% by weight [requirement (b) for the resin composition obtained in accordance with the process of the present invention]. When the workability in molding such as tension in melted condition of the obtained polyolefin-based resin composition is to be improved, it is preferable that the fraction of the polymer obtained in the second polymerization stage is in the range of 0.001 to 40% by weight, more preferably in the range of 0.005 to 35% by weight, still more preferably in the range of 0.008 to 30% by weight, still more preferably in the range of 0.001 to 25% by weight, still more preferably in the range of 0.02 to 25% by weight and most preferably in the range of 0.05 to 20% by weight. When the above fraction is smaller than 0.001% by weight, the improvement in the workability in molding is slight. When the above fraction exceeds 40% by weight, there is the possibility that the melt fluidity of the resin decreases.

When the polyolefin-based resin composition is used as a material for blending with other thermoplastic resins and the workability in molding such as tension in melted condition is to be improved, or when the polyolefin-based resin composition is used without further treatments and improved workability in molding is to be provided, it is preferable that the fraction of the polymer obtained in the second polymerization stage is in the following ranges.

Preferably in the range of 0.5 to 80% by weight, more preferably in the range of 1 to 80% by weight, still more preferably in the range of 2 to 80% by weight, still more preferably in the range of 5 to 80% by weight, still more preferably in the range of 8 to 80% by weight, still more preferably in the range of 10 to 70% by weight and most preferably in the range of 16 to 70% by weight.

When the fraction of the polymer obtained in the second polymerization stage is less than 0.5% by weight, remarkable improvement in the workability in molding cannot be expected. When the fraction exceeds 80% by weight, fluidity of the resin decreases.

When the uniform composition is to be produced in the process for producing the polyolefin-based resin composition, it is preferable that the fraction of the polymer obtained in the second polymerization stage is in the range of 1 to 80% by weight, more preferably in the range of 1.5 to 70% by weight, still more preferably in the range of 2.0 to 65% by weight, still more preferably in the range of 2.5 to 60% by weight, still more preferably in the range of 3.0 to 55% by weight and most preferably in the range of 3.5 to 50% by weight. When the fraction of the polymer obtained in the second polymerization stage is less than 1% by weight, the effect of improving the physical properties produced in the first polymerization stage is slight. When the fraction exceeds 80% by weight, melt fluidity of the resin decreases.

As described, when the molecular weight of the polymer produced in the first polymerization stage is defined by the intrinsic viscosity, it is preferable that the intrinsic viscosity $[\eta]_1$ measured in decaline as the solvent at 135° C. is in the range of 0.1 to 10 deciliter/g, more preferably in the range of 0.15 to 8 deciliter/g, still more preferably in the range of 0.2 to 7 deciliter/g, still more preferably in the range of 1.5 to 6 deciliter/g and most preferably in the range of 0.7 to 5 deciliter/g. When the intrinsic viscosity is smaller than 0.1 deciliter/g, there is the possibility that physical properties of the composition deteriorate. When the intrinsic viscosity exceeds 10 deciliter/g, there is the possibility that the working in molding is difficult.

When the molecular weight of the polymer produced in the second polymerization stage is defined by the intrinsic viscosity, the intrinsic viscosity $[\eta]_2$ measured in decaline as the solvent at 135° C. is, in general, in the range of 0.5 to 20 deciliter/g. When the workability in molding of the polyolefin-based resin composition such as tension in melted condition is to be improved, it is necessary that the intrinsic viscosity $[\eta]_2$ be in the range of 1.5 to 20 deciliter/g which is greater than the intrinsic viscosity $[\eta]_1$ of the polyolefin produced in the first polymerization stage and that the molecular weight of the polymer obtained in the second polymerization stage be decided in accordance with the following method and satisfy the following general formula.

When the molecular weight (the intrinsic viscosity) of the polyolefin obtained in the first polymerization stage is represented by $[\eta]_1$, the molecular weight of the polyolefin obtained in the second polymerization stage is represented by $[\eta]_2$, the molecular weight of the composition produced through the second polymerization stage is represented by $[\eta]_T$, and the fraction of the polymer obtained in the second polymerization stage in the entire composition is represented by F (0<F<1), the relation between $[\eta]_1$, $[\eta]_2$, $[\eta]_T$ and F can be expressed as follows. Assuming that the molecular weight $[\eta]$ is additive, $[\eta]_2$ which cannot be actually measured is calculated from $[\eta]_1$, $[\eta]_T$ and F which can be actually measured. It is necessary that the following requirements [requirement (a) for the resin composition obtained in accordance with the process of the present invention] be satisfied:

$$[\eta]_2 = \{[\eta]_T - [\eta]_1(1-F)\}/F$$

$$[\eta]_2/[\eta]_1 = 1.05 \sim 10$$

It is preferable that $[\eta]_2/[\eta]_1$ is in the range of 1.06 to 10, more preferably in the range of 1.07 to 10, still more preferably in the range of 1.08 to 10, still more preferably in the range of 1.09 to 10, still more preferably in the range of 1.1 to 10 and most preferably in the range of 2.0 to 10. When $[\eta]_2/[\eta]_1$ is smaller than 1.05, improvement in the workability in molding is slight. When $[\eta]_2/[\eta]_1$ exceeds 10, there is the possibility that melt fluidity of the resin decreases.

When the uniform composition is to be produced in the process for producing the polyolefin-based resin composition, the molecular weight of the polymer produced in the second polymerization stage is in the same range as that of the polymer produced in the first polymerization stage. The preferable range of the molecular weight is also the same as that of the polymer produced in the first polymerization stage. In this case, the molecular weight is less limited than the molecular weight for the improvement in the melt properties.

The form of the reaction in the second polymerization stage is decided in accordance with the form of the reaction in the first polymerization stage as shown in the following cases.

(i) When the first polymerization stage is conducted in accordance with the slurry polymerization, the gas phase polymerization or the bulk polymerization using a heterogeneous catalyst, the second polymerization stage is conducted using the particulate reaction product as the reactor.

(ii) When the first polymerization stage is conducted in accordance with the polymerization in the homogeneous system using a heterogeneous catalyst [case (1)], the second polymerization stage is conducted in accordance with the polymerization in the homogeneous system using the field of the homogeneous system as the reaction field of the production of the composition.

(iii) When the first polymerization stage is conducted in accordance with the polymerization in the homogeneous system using a heterogeneous catalyst [case (2)], the second polymerization stage is conducted in accordance with the polymerization in the homogeneous system accompanied with the formation of particulate reaction products.

(iv) In other cases, when the solid polymer formed in the first polymerization stage is transferred to the second polymerization stage and the polymer is dissolved or made uniform in the melted condition under the condition of the production in the second polymerization stage, the second polymerization stage can be conducted similarly to one of cases (ii) and (iii) described above.

Among the above forms of the reaction, cases (i), (ii) and (iv) in which particulate products are formed in the second polymerization stage and case (i) is more preferable.

The conditions of the production of the polymer in the second polymerization stage is, in general, the temperature among the range of −100 to 300° C.; the polymerization pressure among the range of 0.001 to 10 MPa; and the polymerization time among the range of 10 seconds to 8 hours.

When the particulate products are formed in the second polymerization stage in cases (i), (iii) and (iv) described above, the condition of the production is not particularly limited as long as the particulate polymer can be formed. The preferable ranges are: the temperature: −100 to 120° C., the polymerization pressure: 0.001 to 10 MPa; and the polymerization time: 10 seconds to 8 hours.

The polyolefins-based resin composition can be advantageously used in the fields of the sheet molding, the extrusion expansion molding, the blow molding, the profile extrusion molding and the inflation molding.

As the two embodiments of the propylene composition of the present invention, polypropylene composition I and polypropylene composition II will be described in the following.

Polypropylene composition I will be described first.

In polypropylene composition I, the branching parameter a is in the range of:

0.35<a≦0.57 and preferably in the range of:

0.35<a≦0.52.

When the branching parameter a exceeds 0.57, the melt modulus of the polypropylene composition decreases. Therefore, the property for forming cells during foaming and the resistance to draw down during blow molding and aging of the sheet deteriorate. When the branching parameter is smaller than 0.35, the strength and the modulus of the polypropylene composition decrease and the properties of the obtained product becomes inferior. The value of the branching parameter a can be controlled by the amount of the used polyene.

The branching parameter a is obtained as follows: the measurement in accordance with GPC/MALLS (the multi-angle light scattering) is conducted; $<R^2>^{1/2}$ (the square root of the average of squares of the radii) is obtained from the slope of the intensity of the scattered light; the weight-average molecular weight M is obtained from the intercept of the intensity of the scattered light; $<R^2>^{1/2}$ is plotted against the logarithm of M; and the slope a is obtained by the method of least squares.

GPC/MALLS is conducted under the following condition.

| | |
|---|---|
| Solvent: | 1,2,4-trichlorobenzene |
| Concentration: | 0.3% (w/v) |
| Temperature of dissolution: | 135° C. |
| Apparatus for the measurement: | 150C (GPC) produced by WATERS Company |
| | DAWN EOS ™ (multi-angle light scattering) produced by Waters Technology Company |
| Column: | Shodex UT806MLT (7.8 mmϕ × 50 cm) produced by SHOWA DENKO Co., Ltd. |
| Injection amount: | 300 microliters |
| Flow rate: | 1.0 milliliter/min |
| Increment of increase in refractivity with concentration (dn/dc): | −0.095 |

In propylene composition I of the present invention, in general, the branching index g is in the following ranges:

$0.75 \leq g < 1.0$ (when the molecular weight measured in accordance with the light scattering method is 2,000,000 to 10,000,000)

$090 \leq g < 1.0$ (when the molecular weight measured in accordance with the light scattering method is 500,000 to a value smaller than 2,000,000); and preferably in the following ranges:

$0.75 \leq g < 0.90$ (when the molecular weight measured in accordance with the light scattering method is 2,000,000 to 10,000,000)

$092 \leq g < 1.0$ (when the molecular weight measured in accordance with the light scattering method is 500,000 to a value smaller than 2,000,000).

By introducing the branching in the high molecular weight side having the molecular weight of 2,000,000 to 10,000,000, the probability of entanglement increases and the branching effectively works even when the amount of the branching is small. In contrast, when the branching is introduced in the low molecular weight side having the molecular weight of 500,00 to a value smaller than 2,000,000, the branching does not work effectively since the number of the effective entanglement is small even when the branching is introduced to a greater degree. When the branching index g is smaller than 0.75 in the case of a molecular weight of 2,000,000 to 10,000,000 or the branching index g is smaller than 0.90 in the case of a molecular weight of 500,00 to a value smaller than 2,000,000, the branching points work as the entanglements and the number of branch increases. The crosslinking takes place excessively and forms a gel and the physical properties are adversely affected. The value of the branching index of 1.0 means a linear high macromolecule having no branches.

The value of g is obtained from $<R^2>i^{1/2}$ and the weight-average molecular weight Mi at each eluted volume obtained by the measurement in accordance with GPC/MALLS described above by calculation in each range of the molecular weight in accordance with the following equation:

$$G = \Sigma wi \cdot (<R^2>i^{1/2}/<R^2>^{1/2}_L)/\Sigma wi$$

wherein wi represents the concentration (the fraction by weight) at each eluted volume. The calculation was conducted assuming that $$<R^2>^{1/2}_L = 0.024 \times Mi^{0.6}$$

It is necessary that the propylene composition of the present invention has an upturn from the inflection point (the strain-hardening) in the curve showing the change in the viscosity under extension with time. The inflection point means the inflection point convex to the downward direction. When the upturn in the change in the viscosity under extension with time is absent, the ability for forming cells in the foaming process decreases and the resistance to draw down during aging of the sheet deteriorates. An example of the curve exhibiting the change in the viscosity under extension with time is shown in FIG. 1.

As for the "upturn from the inflection point in the curve showing the change in the viscosity under extension", it is defined that "the curve showing the change in the viscosity under extension has an inflection point" when the viscosity under extension measured at the same time is 1.5 times or more as much as the value shown by the viscosity curve $3\eta(t)$ obtained by using the relaxation spectrum, which is obtained from the dynamic viscoelasticity in accordance with the following equation:

$$3\eta(t) = \int_{-\infty}^{\infty} H(\tau)\tau(1-e^{-t/\tau})d\ln\tau$$

In the above equation, $H(\tau)$ represents the relaxation spectrum and $\tau$ represents the relaxation time.

In polypropylene composition I of the present invention, the degradation parameter D is 0.7 or greater, preferably 0.8 or greater and more preferably 0.9 or greater. When D is smaller than 0.7, degradation of the resin (scission of molecules) is marked and the reuse of the polypropylene composition becomes impossible. The sample after mixing which is used for obtaining the degradation parameter is obtained by placing 20 g of a sample into LABO PLASTOMILL, which is a compact type twin-screw mixer produced by TOYO SEIKI Co., Ltd., followed by mixing at a set temperature of 190° C. and a rotation speed of 50 rpm for 5 minutes. The degradation parameter is the value defined based on the storage modulus G' obtained by the measurement of the dynamic viscoelasticity before and after the mixing at the frequency of 0.01 rad/s, in accordance with the following equation:

$$D = G'_a / G'_b$$

wherein G'a is the storage modulus after the mixing and G'b is the storage modulus before the mixing. The degradation parameter is related to the number of branching. Therefore, the value can be adjusted by the amount of the polyene used in the polymerization.

Polypropylene composition I of the present invention can be produced, for example, in accordance with the process comprising:

in the first polymerization stage, polymerizing or copolymerizing propylene alone or propylene and at least one monomer selected from ethylene and α-olefins having 4 to 20 carbon atoms in the presence of a metallocene catalyst; and in the second polymerization stage, copolymerizing the homopolymer or the copolymer obtained in the first polymerization stage with at least one monomer selected from ethylene, propylene, α-olefins having 4 to 20 carbon atoms, styrenes and cyclic olefins in the presence of a polyene having at least two polymerizable carbon-carbon double bonds in one molecule.

Examples of the α-olefin having 4 to 20 carbon atoms include the same compounds as those described as the examples of the α-olefins having 4 to 20 carbon atoms in processes I and II described above.

As the polyene used in the second polymerization stage, any polyene can be used as long as the polyene has at least two polymerizable carbon-carbon double bonds in one molecule. Examples of the polyene include the same compounds as those described as the examples of the polyene in processes I and II described above.

Polypropylene composition II of the present invention will be described in the following.

In polypropylene composition II of the present invention, the branching parameter a is in the range of:

0.35<a≦0.57 and preferably in the range of:

0.45<a≦0.52.

When the branching parameter a exceeds 0.57, the number of the introduced branches decreases and the workability in molding deteriorates since the points of entanglement decrease. When the branching parameter a is smaller than 0.35, the number of the introduced branches increases and gels tend to be formed.

The branching parameter a is measured in accordance with the same method as that described for polypropylene composition I.

In propylene composition II of the present invention, in general, the branching index g is in the following ranges:

0.75≦g<1.0 (when the molecular weight measured in accordance with the light scattering method is 2,000,000 to 10,000,000)

090≦g<1.0 (when the molecular weight measured in accordance with the light scattering method is 500,000 to a value smaller than 2,000,000); and preferably in the following ranges:

0.75≦g<0.90 (when the molecular weight measured in accordance with the light scattering method is 2,000,000 to 10,000,000)

092≦g<1.0 (when the molecular weight measured in accordance with the light scattering method is 500,000 to a value smaller than 2,000,000) due to the same reason as that for polypropylene composition I.

The branching index g is measured in accordance with the same method as that described for polypropylene composition I.

In polypropylene composition II of the present invention, it is necessary that the amount of the fraction having high molecular weights of 1,000,000 or greater as measured in accordance with the light scattering method be 10% by weight or less and preferably 3% by weight or less. By decreasing the amount of the fraction having high molecular weights of 1,000,000 or greater, the fluidity of the polypropylene composition is improved. When the amount of the fraction having high molecular weights exceeds 10% by weight, the fluidity becomes poor and gels are formed in a great amount.

Polypropylene composition II of the present invention can be produced, for example, in accordance with the process comprising:

in the first polymerization stage, polymerizing or copolymerizing propylene alone or propylene and at least one monomer selected from ethylene and α-olefins having 4 to 20 carbon atoms in the presence of a metallocene catalyst; and in the second polymerization stage, copolymerizing the homopolymer or the copolymer obtained in the first polymerization stage with at least one monomer selected from ethylene, propylene, α-olefins having 4 to 20 carbon atoms, styrenes and cyclic olefins in the presence of a polyene having at least two polymerizable carbon-carbon double bonds in one molecule.

Examples of the α-olefin having 4 to 20 carbon atoms include the same compounds as those described as the examples of the α-olefins having 4 to 20 carbon atoms in processes I and II described above.

As the polyene used in the second polymerization stage, any polyene can be used as long as the polyene has at least two polymerizable carbon-carbon double bonds in one molecule. Examples of the polyene include the same compounds as those described as the examples of the polyene in processes I and II described above.

Polypropylene compositions I and II of the present invention are characterized in that no gels are formed when the compositions are formed into molded articles. The formation of gels can be examined, for example, by visual observation when a foamed sheet is formed. When a film is formed, the amount of gel can be quantitatively measured by a gel counter. The number of the gel with a diameter of at least 0.2 mm is 10 or less, preferably 3 or less and more preferably 1 or less per 1,000 $cm^2$ of the film.

To polypropylene compositions I and II of the present invention, various additives such as antioxidants, inorganic fillers, ultraviolet light absorbents and anti-weatherability agents may be contained, where necessary.

Polypropylene compositions I and II can be used for forming molded articles and sheets in accordance with a process such as the injection molding or the blow molding. Foamed molded articles can be produced by an extruder, in accordance with the chemical foaming or the physical foaming. Foamed sheets can be produced by a T-die or a round die. As the foaming agent, at least one chemical foaming agent of the heat decomposition type selected from azodicarbonamide, oxybisbenzenesulfonyl hydrazide, benzenesulfonyl hydrazide, p-toluenesulfonyl hydrazide, diazoaminobenzene and azobisisobutyronitrile can be used. The amount of the foaming agent can be suitably selected in accordance with the expansion ratio of the foamed sheet.

The present invention also provides molded articles such as foamed molded articles, sheets and other molded articles obtained by using polypropylene compositions I and II of the present invention described above.

A thermoplastic resin composition obtained by mixing a thermoplastic resin to at least one composition selected from the polyolefin-based resin compositions obtained in accordance with processes I, II and III and polypropylene compositions I and II which are described above will be described in the following.

The process for producing the thermoplastic resin composition obtained by mixing a thermoplastic resin to at least one composition selected from the polyolefin-based resin compositions obtained in accordance with processes I, II and III and polypropylene compositions I and II is not particularly limited and the thermoplastic resin composition can be produced in accordance with a conventional process.

Examples of the process include the melt mixing processes using mixers and extruders, examples of which include mixing processes using a mixing apparatus such as a single screw extruder, a twin screw extruder, a twin screw mixer, a Banbury mixer and rolls. The composition is, in general, formed into pellets.

Alternatively, the constituting components of the thermoplastic composition may be dissolved into a solvent and the composition may be recovered by removing the solvent or by adding the solution into a poor solvent of the polymer.

Examples of the thermoplastic resin which is used for the thermoplastic resin composition (this composition will be referred to as the above thermoplastic resin composition, hereinafter) comprising the thermoplastic resin and a composition (this composition will be referred to as the above composition, hereinafter) selected from the polyolefin-based resin compositions produced in accordance with processes I, II and III of the present invention described above and polypropylene compositions I and II described above include polyolefin-based thermoplastic resins, copolymers of olefins and vinyl monomers, modified olefin copolymers, condensation-based macromolecular compounds and polymers obtained by addition polymerization. Examples of the polyolefin-based thermoplastic resin include homopolymers and copolymers such as polyethylene, polypropylene, polystyrene, polybutene, ethyl/α-olefin copolymers, block polypropylene and low-density polyethylene produced in accordance with the high-pressure process.

Examples of the thermoplastic resin include copolymers of olefins and vinyl monomers, modified olefin copolymers, condensation-based macromolecular compounds and polymers obtained by polyaddition polymerization. Examples of the copolymer of an olefin and a vinyl monomer which is a polymer obtained by addition polymerization include ethylene/vinyl acetate copolymers, ethylene/acrylic acid copolymers, ethylene/ethyl acrylate copolymers, ethylene/methyl methacrylate copolymers, ionomers which are obtained by substituting metal ions in copolymers of ethylene and vinyl monomers containing carboxylic acid (for example, a substance obtained by neutralizing an ethylene/acrylic acid copolymer with sodium ion) and ethylene/vinyl alcohol copolymers.

Examples of the modified olefin copolymer include polypropylene modified with maleic anhydride and polyethylene modified with maleic anhydride.

Examples of the condensation-based macromolecular compound include polycarbonates, polyacetals, polyamides such as nylon 6 and nylon 6,6, polyesters such as polyethylene terephthalate and polybutylene terephthalate, polyphenylene oxides, polysulfones, polyether sulfones, polyphenylene sulfides, polyimides and phenol resins.

Examples of the polymers obtained by addition polymerization (polymers obtained from polar vinyl monomers and diene-based monomers) include homopolymers such as polymethyl methacrylate, polystyrene, polyacrylonitrile, polyvinyl chloride, polybutadiene, polyisoprene and polyvinyl alcohol; acrylonitrile/butadiene/styrene copolymers; hydrogenated polymers such as SEBS; acrylonitrile/styrene copolymers; high impact polystyrene (modified with rubber); petroleum resins; and thermoplastic rubbers.

The relative amounts of the above composition and the thermoplastic resin can be decided in accordance with the object. In general, the thermoplastic resin is used in an amount in the range of 0.01 to 100 parts by weight per 1 part by weight of the above composition.

As the thermoplastic resin, polyolefin-based thermoplastic resins are preferable.

Examples of the additive include antioxidants, hydrochloric acid adsorbents, light stabilizers, lubricants, nucleating agents, inorganic fillers, stabilizers and ultraviolet light absorbents.

As the antioxidant, phenol-based antioxidants, sulfur-based antioxidants and phosphorus-based antioxidants can be used. It is preferable that the antioxidants, the hydrochloric acid adsorbents, the light stabilizers, the lubricants, the stabilizers and the ultraviolet light absorbents among the above additives are added into the above resin composition or the above thermoplastic resin composition in amount in the range of 0.0001 to 10% by mass.

The amount of the nucleating agent added into the composition is in the range of 0.001 to 10% by mass, preferably in the range of 0.01 to 5% by mass and more preferably in the range of 0.1 to 3% by mass. The amount of the inorganic filler added into the composition is in the range of 0.1 to 60% by mass, preferably in the range of 0.3 to 50% by mass and more preferably in the range of 1 to 40% by mass.

Examples of the phenol-based antioxidant include phenols such as 2,6-di-t-butyl-p-cresol, stearyl (3,3-dimethyl-4-hydroxybenzyl) thioglycolate, stearyl β-(4-hydroxy-3,5-di-t-butylphenol)propionate, distearyl 3,5-di-t-butyl-4-hydroxybenzyl phosphonate, 2,4,6-tris(3',5'-t-butyl-4'-hydroxybenzylthio)-1,3,5-triazine, distearyl (4-hydroxy-3-methyl-5-t-butylbenzyl)malonate, 2,2'-methylenebis(4-methyl-6-t-butyl-phenol), 4,4'-methylenebis(2,6-di-t-butylphenol), 2,2'-methylenebis[6-(1-methylcyclohexyl)-p-cresol], bis[3,5-bis(4-hydroxy-3-t-butylphenyl)-butyric acid] glycol ester, 4,4'-butylidenebis(6-t-butyl-m-cresol), 1,1,3-tris(2-methyl-4-hydroxy-5-t-butylphenyl)butane, bis [2-t-butyl-4-methyl-6-(2-hydroxy-3-t-butyl-5-methylbenzyl)phenyl] terephthalate, 1,3,5-tris(2,6-dimethyl-3-hydroxy-4-t-butyl)benzyl isocyanurate, 1,3,5-tris(3,5-di-t-butyl-4-hydroxybenzyl)-2,4,6-trimethylbenzene, tetrakis-[methylene-3-(3,5-di-t-butyl-4-hydroxyphenyl) propionate] methane, 1,3,5-tris(3,5-di-t-butyl-4-hydroxybenzyl) isocyanurate, 1,3,5-tris[(3,5-di-t-butyl-4-hydroxyphenyl) propionyloxyethyl] isocyanurate, 2-octylthio-4,6-di(4-hydroxy-3,5-di-t-butyl)phenoxy-1,3,5-triazine and 4,4'-thiobis (6-t-butyl-m-cresol); and oligoesters of carbonic acid with polyhydric phenols such as oligoesters (for example, a degree of polymerization of 2 to 10) of carbonic acid with 4,4'-butylidenebis(2-t-butyl-5-methylphenol).

Examples of the sulfur-based antioxidants include dialkyl thiodipropionates such as dilauryl thiodipropionate, dimyristyl thiodipropionate and distearyl thiodipropionate; and esters of alkylthiopropionic acids such as butylthiopropionic acid, octylthio-propionic acid, laurylthiopropionic acid and stearylthiopropionic acid with polyhydric alcohols such as pentaerythritol tetralaurylthiopropionate. Examples of the polyhydric alcohol include glycerol, trimethylolethane, trimethylolpropane, pentaerythritol and trishydroxyethyl isocyanurate.

Examples of the phosphorus-based antioxidant include trioctyl phosphite, trilauryl phosphite, tridecyl phosphite, octyl diphenyl phosphite, tris(2,4-di-t-butylphenyl) phosphite, triphenyl phosphite, tris(butoxyethyl) phosphite, tris (nonylphenyl) phosphite, distearyl pentaerythritol diphosphite, tetra(tridecyl) 1,1,3-tris(2-methyl-5-t-butyl-4-hydroxyphenyl)butane diphosphite, tetra(mixed alkyl having 12 to 15 carbon atoms) 4,4-isopropylidenediphenyl diphosphite, tetra(tridecyl) 4,4-butylidenebis(3-methyl-6-t-butylphenol) diphosphite, tris(3,5-di-t-butyl-4-hydroxyphenyl) phosphite, tris(mixed mono- and di-nonylphenyl) phosphite, hydrogenated 4,4'-isopropylidenediphenol polyphosphite, bis(octylphenyl) bis[4,4'-butylidenebis(3-methyl-6-t-butylphenol)] 1,6-hexanendiol diphosphite, phenyl 4,4'-isopropylidenediphenol pentaerythritol diphosphite, bis(2,4-di-t-butylphenyl)pentaerythritol diphosphite, bis(2,6-di-t-butyl-4-methylphenyl)pentaerythritol diphosphite, tris[4,4'-isopropylidenebis(2-t-butylphenol)] phosphite, phenyl diisodecyl phosphite, di(nonylphenyl) pentaerythritol diphosphite, tris(1,3-distearoyloxyisopropyl) phosphite, 4,4'-isopropylidene-bis(2-t-butylphenol) di(nonylphenyl) phosphite, 9,10-dihydro-9-oxa-9-oxa-10-phosphaphenanthrene-10-oxide and tetrakis(2,4-di-t-butyl-phenyl)-4,4'-biphenylene diphosphonite.

Examples of the hydrochloric acid absorbent include calcium stearate, $Mg_6Al_2(OH)_{16}CO_3 \cdot 4H_2O$, $Mg_6Al_2(OH)_{20}CO_3 \cdot 5H_2O$, $Mg_6Al_2(OH)_{14}CO_3 \cdot 4H_2O$, $Mg_{10}Al_2(OH)_{22}(Ca3)_2 \cdot 4H_2O$, $Mg_6Al_2(OH)_{16}HPO_4 \cdot 4H_2O$, $Ca_6Al_2(OH)_{16}CO_3 \cdot 4H_2O$, $Zn_6Al_2(OH)_{16}CO_3 \cdot 4H_2$), $Zn_6Al_2(OH)_{16}SO_4 \cdot 4H_2O$, $Mg_6Al_2(OH)_{16}SO_3 \cdot 4H_2O$ and $Mg_6Al_2(OH)_{12}CO_3 \cdot 3H_2O$.

Examples of the light stabilizer include hydroxybenzophenones such as 2-hydroxy-4-methoxybenzophenone, 2-hydroxy-4-n-octoxybenzophenone, 2,2'-dihydroxy-4-methoxybenzophenone and 2,4-dihydroxybenzophenone; benzotriazoles such as 2-(2'-hydroxy-3'-t-butyl-5'-methylphenyl)-5-chlorobenzotriazole, 2-(2'-hydroxy-3',5'-di-t-butylphenyl)-5-chlorobenzotriazole, 2-(2'-hydroxy-5'-methylphenyl)benzotriazole and 2-(2'-hydroxy-3',5'-di-t-amylphenyl)benzotriazole; phenyl salicylate; p-t-butylphenyl salicylate; benzoates such as 2,4-di-t-butylphenyl 3',5'-di-t-butyl-4-hydroxybenzoate and hexadecyl 3',5'-di-t-butyl-4-hydroxybenzoate; nickel compounds such as Ni salt of 2,2'-thiobis(4-t-octylphenol), Ni salt of [2,2'-thiobis(4-t-octylphenolato)-n-butylamine and Ni salt of (3,5-di-t-butyl-4-hydroxybenzyl)phosphonic acid monoethyl ester; substituted acrylonitrile such as methyl α-cyano-β-methyl-β-(p-methoxyphenyl)acrylate; oxalic acid diamides such as N'-2-ethylphenyl-N-ethoxy-5-t-butylphenyloxalic acid diamide and N-2-ethylphenyl-N'-2-ethoxyphenyloxalic acid diamide; and hindered amine compounds such as bis(2,2,6,6-tetramethyl-4-piperidine) sebacate, poly[{6-(1,1,3,3-tetramethylbutyl)imino}-1,3,5-triazine-2,4-diyl{4-(2,2,6,6-tetramethylpiperidyl) imino}hexamethylene] and condensation products of 2-(4-hydroxy-2,2,6,6-tetramethyl-1-piperidyl)ethanol and dimethyl succinate.

Examples of the lubricant include aliphatic hydrocarbons such as paraffin wax, polyethylene wax and polypropylene wax; higher fatty acids such as capric acid, lauric acid, myristic acid, palmitic acid, margarine acid, stearic acid, arachidic acid and behenic acid; metal salts of higher fatty acids such as lithium salts, calcium salts, sodium salts, magnesium salts and potassium salts; aliphatic alcohols such as palmityl alcohol, cetyl alcohol and stearyl alcohol; aliphatic amides such as caproic acid amide, caprylic acid amide, lauric acid amide, myristic acid amide, palmitic acid amide and stearic acid amide; esters of aliphatic acids and alcohols; and fluorine compounds such as fluoroalkylcarboxylic acids, metal salts of fluoroalkylcarboxylic acids and metal salts of fluoroalkylsulfonic acids.

As the nucleating agent, aromatic ester salts of phosphoric acid, dibenzylidenesorbitol, metal salts of aromatic carboxylic acids and metal salts of aliphatic carboxylic acids can be used. In the present invention, aromatic ester salts of phosphoric acid and dibenzylidenesorbitol are preferable.

Examples of the aromatic ester salts of phosphoric acid include sodium 2,2'-methylenebis(4,6-di-t-butylphenyl) phosphate, sodium 2,2'-ethylidenebis(4,6-di-t-butylphenyl) phosphate, lithium 2,2'-methylenebis(4,6-di-t-butylphenyl) phosphate, lithium 2,2'-ethylidenebis(4,6-di-t-butylphenyl) phosphate, sodium 2,2'-ethylidenebis(4-i-propyl-6-t-butylphenyl) phosphate, lithium 2,2'-methylenebis(4-methyl-6-t-butylphenyl) phosphate, lithium 2,2'-methylenebis(4-ethyl-6-t-butylphenyl) phosphate, calcium bis[2,2'-thiobis(4-methyl-6-t-butylphenyl) phosphate], calcium bis[2,2'-thiobis(4-ethyl-6-t-butylphenyl) phosphate], calcium bis[2,2'-thiobis(4,6-di-t-butylphenyl) phosphate], magnesium bis[2,2'-thiobis(4,6-di-t-butylphenyl) phosphate], magnesium bis [2,2'-thiobis(4-t-octylphenyl) phosphate], sodium 2,2'-butylidenebis(4,6-dimethylphenyl) phosphate, sodium 2,2'-butylidenebis(4,6-di-t-butylphenyl) phosphate, sodium 2,2'-t-octylmethylenebis(4,6-dimethylphenyl) phosphate, sodium 2,2'-t-octylmethylenebis(4,6-di-t-butylphenyl) phosphate, calcium bis(2,2'-methylenebis(4,6-di-t-butylphenyl) phosphate), magnesium bis[2,2'-methylenebis(4,6-di-t-butylphenyl) phosphate, barium bis[2,2'-methylenebis(4,6-di-t-butylphenyl) phosphate], sodium 2,2'-methylenebis(4-methyl-6-t-butylphenyl) phosphate, sodium 2,2'-methylenebis(4-ethyl-6-t-butylphenyl) phosphate, sodium (4,4-dimethyl-5,6-di-t-butyl-2,2'-biphenyl) phosphate, calcium bis[(4,4-dimethyl-6,6'-di-t-butyl-2,2'-biphenyl) phosphate], sodium 2,2'-ethylidenebis(4-m-butyl-6-t-butylphenyl) phosphate, sodium 2,2'-methylenebis(4,6-dimethylphenyl) phosphate, sodium 2,2'-methylenebis(4,6-diethylphenyl) phosphate, potassium 2,2'-ethylidenebis(4,6-di-t-butylphenyl) phosphate, calcium bis-2,2'-ethylidenebis(4,6-di-t-butylphenyl) phosphate], magnesium bis[2,2'-ethylidenebis(4,6-di-t-butylphenyl) phosphate], barium bis[2,2'-ethylidenebis(4,6-di-t-butylphenyl) phosphate], aluminum tris[2,2'-methylenebis (4,6-di-t-butylphenyl) phosphate], aluminum tris[2,2'-ethylidenebis(4,6-di-t-butylphenyl) phosphate, combinations of these compounds, sodium bis(4-t-butylphenyl) phosphate, sodium bis(4-methylphenyl) phosphate, sodium bis(4-ethylphenyl) phosphate, sodium bis(4-i-propylphenyl) phosphate, sodium bis(4-t-octylphenyl) phosphate, potassium bis(4-t-butylphenyl) phosphate, calcium bis(4-t-butylphenyl) phosphate, magnesium bis(4-t-butylphenyl) phosphate, lithium bis(4-t-butylphenyl)phosphate, aluminum bis(4-t-butylphenyl) phosphate and combinations of these compounds. Among the above compounds, sodium 2,2'-methylenebis(4,6-di-t-butylphenyl) phosphate and sodium bis(4-t-butylphenyl) phosphate are preferable.

Examples of the dibenzylidenesorbitol include 1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di (p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene) sorbitol, 1,3,2,4-di(p-t-butylbenzylidene)sorbitol, 1,3,2,4-di (2',4'-dimethylbenzylidene)sorbitol, 1,3,2,4-di-(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol, 1,3-p-chlorobenzylidene-2,4-p-ethylbenzylidenesorbitol, 1,3-p-methylbenzylidene-2,4-p- chlorobenzylidenesorbitol, 1,3-p-ethylbenzylidene-2,4-p-chlorobenzylidenesorbitol, 1,3,2,4-di(p-chlorobenzylidene)sorbitol and combinations of these compounds. Among the above compounds, 1,3,2,4-dibenzylidenesorbitol, 1,3,2,4-di(p-methylbenzylidene)sorbitol, 1,3,2,4-di(p-ethylbenzylidene)sorbitol, 1,3-p-chlorobenzylidene-2,4-p-methylbenzylidenesorbitol, 1,3,2,4-di(p-chlorobenzylidene)sorbitol and combinations of these compounds are preferable.

Examples of the metal salts of aromatic carboxylic acids and the metal salts of aliphatic carboxylic acids include aluminum salt of benzoic acid, aluminum salt of p-t-butylbenzoic acid, sodium adipate, sodium thiophenecarboxylate, sodium pyrrolcarboxylate and polymers such as polymethylpentene-1. Inorganic compounds such as talc can also be used as the nucleating agent.

Examples of the inorganic filler include powder fillers, flake fillers, fiber fillers and balloon-shaped fillers. Examples of the powder filler include natural silicic acid and silicates such as fine powder of talc, kaolinite, sintered clay, pyrophilite, sericite and wollastonite; carbonates such as precipitated calcium carbonate, heavy calcium carbonate and magnesium carbonate; hydroxides such as aluminum hydroxide and magnesium hydroxide; oxides such as zinc oxide and magnesium oxide; and synthetic silicic acid and silicates such as hydrated calcium silicate, hydrated aluminum silicate, hydrated silicic acid and anhydrous silicic acid. Examples of the flake filler include mica. Examples of the fiber fillers include whiskers of basic magnesium sulfate, whiskers of calcium titanate, whiskers of aluminum borate, sepiolite, PMF (processed mineral fiber), xonotlite, potassium titanate and erestadite. Examples of the balloon-shaped filler include glass balloon and fly ash balloons.

Examples of the stabilizer include phenol-based antioxidants such as 2,6-di-t-butyl-4-methylphenol, tetrakis[methylene(3,5-di-t-butyl-4-hydroxyhydrocinnate)]methane, metaoctadecyl 3-(4'-hydroxy-3,5-di-t-butylphenyl)propionate, 2,2'-methylenebis(4-methyl-6-t-butylphenol), 4,4'-butylidenebis(3-methyl-6-t-butylphenol), 4,4'-thiobis(3-methyl-6-t-butylphenyl), 2,2-thiobis(4-methyl-6-t-butylphenol), 1,3,5-trimethyl-2,4,6-tris(3,5-di-t-butyl-4-hydroxybenzyl)benzene and 1,3,5-tris(2-methyl-4-hydroxy-5-t-butylphenol)butane; sulfur-based antioxidants such as dilauryl thiodipropionate and distearyl thiodipropionate; and phosphorus-based stabilizers such as tridecyl phosphite and trinonyl phosphite. Examples of the ultraviolet light absorbent include 2-hydroxy-4-octoxybenzophenone, 2-ethylhexyl 2-cyano-3,3-diphenylacrylate and p-octylphenyl salicylate.

EXAMPLES

The present invention will be described more specifically with reference to examples in the following. However, the present invention is not limited to the examples. Polyolefin-based resin compositions were evaluated in accordance with the following methods.

(1) MI (the melt index) was measured in accordance with the method of Japanese Industrial Standard K 7210 at a temperature of 230° C. under a load of 21.18 N. The temperature was set at 190° C. for the measurement of some types of the resin.

(2) The bulk density was measured in accordance with the method of Japanese Industrial Standard K 6721.

(3) The tension MS in melted condition was measured by using CAPILLAROGRAPH 1B produced by TOYO SEIKI Co., Ltd. under the following condition:

| Capillary: | with the diameter of 2.095 mm; and with the length of 8.0 mm |
|---|---|
| Diameter of cylinder: | 9.6 mm |
| Rate of extrusion from cylinder: | 10 mm/minute |
| Winding speed: | 3.14 m/minute |
| Temperature: | 190° C. or 230° C. |

(4) For the examination of the presence or the absence of the fraction insoluble in decaline at 135° C., a polyolefin-based resin composition was dissolved into decaline at 135° C. under stirring in an amount such that the concentration of the polymer was 0.1 to 0.3 g/deciliter. The resultant mixture was stirred for 2 hours and then left standing. The presence or the absence of insoluble fractions was examined by the visual observation.

(5) The meso pentad fraction [mmmm] was measured as follows: a polymer was dissolved into a mixed solvent composed of 1,2,4-trichlorobenzene and deuterated benzene in relative amounts by volume of 90:10; the signal of methyl group was measured by using a $^{13}$C-NMR apparatus (LA-500; produced by NIPPON DENSHI Co., Ltd.) at 130° C. in accordance with the method of complete decoupling of proton; and the meso pentad fraction was determined from the obtained signal of methyl group. The meso pentad fraction [mmmm] in the present invention means the isotactic fraction as the pentad unit in the chain of the propylene molecule measured by $^{13}$C-NMR spectrum i91 as proposed by A. Zambelli et al. [Macromolecules, 6, 925 (1973)]. The assignment of the peaks in the measurement of the $^{13}$C-NMR spectrum was made in accordance with the assignment proposed by A. Zambelli et al. [Macromolecules, 8, 687 (1975)].

Example 1

Preparation of a Polypropylene Composition (1) Preparation of an Aluminum Oxy Compound Using 1,000 milliliters of a toluene solution of methylaluminoxane (1.47 moles/liter; produced by Albemarle Co., Ltd.; the content of trimethylaluminum: 14.5% by weight), the solvent was removed under a reduced pressure (about 20 mmHg) at 60° C. After the resultant product was kept in this condition for 4 hours, the temperature was lowered to the room temperature and a dried-up methylaluminoxane was obtained.

To the dried-up methylaluminoxane, dehydrated toluene was added to dissolve methylaluminoxane and the volume of the solution was adjusted at the volume of the solution before the solvent was removed. The amount of trimethylaluminum in the methylaluminoxane was determined in accordance with $^1$H-NMR and found to be 3.6% by weight. The amount of the entire aluminum was measured in accordance with the fluorescence X-ray method (the ICP method) and found to be 1.32 moles/liter. The above mixture was left standing for 48 hours and insoluble fractions were precipitated.

The portion of the solution was filtered through a G5 glass filter and methylaluminoxane soluble in toluene was obtained. The concentration of methylaluminoxane as measured in accordance with the fluorescence X-ray method (the ICP method) was 1.06 moles/liter.

(2) Preparation of a Carrier and a Supported Methylaluminoxane 70 g of $SiO_2$ (P-10; available from Fuji Silysia Co., Ltd.) was dried at 140° C. for 15 hours under a nitrogen stream of a very small flow rate. The dried $SiO_2$ in an amount of 22.0 g was weighed and added into 200 milliliters of dehydrated toluene. Under the atmosphere of nitrogen, after the temperature was kept at the constant value of 0° C. under stirring, 200 milliliters of the toluene solution of methylaluminoxane prepared in the foregoing term (1) was added dropwise over 60 minutes. When the dropwise addition was completed, the temperature was raised to the room temperature and the reaction was allowed to proceed for 30 minutes in this condition. The reaction was further allowed to proceed at 70° C. for 3 hours. After the reaction was completed, the reaction mixture was kept at 60° C. The solid component was washed twice with 200 milliliters of dehydrated toluene and twice with 200 milliliters of dehydrated heptane and dried at 50° C. under a reduced pressure and 32.8 g of methylaluminoxane supported on $SiO_2$ was obtained. The obtained supported methylaluminoxane was added into dehydrated heptane and kept as a slurry.

(3) Preparation of a Supported Metallocene Catalyst

After a Schlenk tube with a volume of 50 milliliters was dried and purged with nitrogen, 10 milliliters of dried heptane and 2 millimoles as aluminum atom conversion of the methylaluminoxane supported on $SiO_2$ prepared in the foregoing term (2) were placed into the tube and the stirring was started. To the stirred mixture, 1 milliliter of a toluene solution containing rac-$SiMe_2[2\text{-}Me\text{-}4\text{-}Ph\text{-}Ind]_2ZrCl_2$ in an amount such that the amount of zirconium atom was 2 micromoles was slowly added and the reaction was allowed to proceed for 10 minutes.

(4) Preparation of a Polypropylene Composition

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the supported catalyst prepared in the foregoing term (3) was added.

After the preliminary polymerization was conducted at 25° C. under a propylene pressure of 0.3 MPa for 30 minutes for activation of the catalyst, the unreacted propylene was removed by releasing the pressure and blowing with nitrogen. Then, 0.02 MPa of hydrogen was introduced. The temperature was set at 70° C. and the polymerization was started by introducing propylene at a partial pressure of 0.7 MPa. Polypropylene was produced for 60 minutes while the temperature was controlled. After the reaction was completed, the reaction mixture was lowered to the room temperature and the pressure was released. The reactor was sufficiently blown with dry nitrogen and a portion of the reaction mixture was taken as a sample.

To the above polymerization system containing polypropylene, 2 milliliters of a heptane solution containing 0.2 millimole of 1,9-decadiene ($1.6 \times 10^{-6}$ moles per 1 g of the polymer obtained in the first polymerization stage) was added. While the temperature was controlled at 40° C., propylene was introduced at a partial pressure of 0.7 MPa and the polymerization was conducted for 30 minutes. After the polymerization was completed, the pressure was released and a polypropylene composition was recovered. The amount of the polypropylene composition was 152 g. The results of the measurements of the obtained polypropylene composition are shown in Table 3.

TABLE 3

| | Fraction in second stage# (%) | Amount in second stage## (g) | MI (g/10 min) | Bulk density (g/ml) | Melt tension (g) | Fraction insoluble in decaline | Mw/Mn | $[\eta]_2/[\eta]_1$ |
|---|---|---|---|---|---|---|---|---|
| Example 1 | 16.8 | 25.6 | 0.87 | 0.45 | 16.8 | none | 3.5 | 1.11 |

The fraction of the polymer obtained in the second polymerization stage.
The amount of the polymer obtained in the second polymerization stage.

Examples 2 to 6

Various Values of Parameters in the Multi-stage Polymerization

Using the catalyst shown in Example 1 (3), polypropylene compositions were prepared under various conditions shown in Table 4. The results of the measurements of the obtained polypropylene compositions are shown in Table 5.

TABLE 4

Condition of the first polymerization stage

| | $SiO_2$/MAO (mmol-Al) | Zr (μmol) | hydrogen (ml) | pressure of propylene (MPa) | temperature (° C.) | time (min) |
|---|---|---|---|---|---|---|
| Example 2 | 2.0 | 2 | 30 | 0.65 | 60 | 90 |
| Example 3 | 2.0 | 2 | 30 | 0.65 | 60 | 90 |
| Example 4 | 2.0 | 2 | 30 | 0.65 | 60 | 90 |
| Example 5 | 2.0 | 5 | *0.02 | 0.65 | 60 | 90 |
| Example 6 | 2.0 | 2 | 30 | 0.65 | 60 | 90 |

*The unit: MPa

Condition of the second polymerization stage

| | 1,9-decadiene (mmol) | * | pressure of propylene (MPa) | temperature (° C.) | time (min) |
|---|---|---|---|---|---|
| Example 2 | 0.1 | $0.7 \times 10^{-6}$ | 0.65 | 40 | 60 |
| Example 3 | 0.2 | $1.2 \times 10^{-6}$ | 0.65 | 40 | 60 |
| Example 4 | 0.3 | $2.0 \times 10^{-6}$ | 0.65 | 40 | 60 |
| Example 5 | 0.5 | $3.2 \times 10^{-6}$ | 0.70 | 60 | 60 |
| Example 6 | 0.2 | $1.6 \times 10^{-6}$ | 0.65 | 30 | 60 |

*Amount by mole per 1 g of the polymer obtained in the first polymerization stage.

TABLE 5

| Example | Amount obtained (g) | Fraction in second stage[#] (%) | Amount in second stage[##] (g) | MI (g/10 min) | Bulk density (g/ml) | Melt tension (g) | Fraction insoluble in decaline | Mw/Mn | $[\eta]_2/[\eta]_1$ |
|---|---|---|---|---|---|---|---|---|---|
| 2 | 152 | 11.1 | 16.9 | 0.51 | 0.45 | 21.0 | none | 3.5 | 1.55 |
| 3 | 191 | 14.5 | 27.7 | 0.39 | 0.45 | 19.5 | none | 3.5 | 1.96 |
| 4 | 174 | 12.4 | 21.6 | 0.47 | 0.44 | 18.0 | none | 3.2 | 1.92 |
| 5 | 190 | 19.0 | 36.1 | 9.04 | 0.45 | 6.5 | none | 8.4 | 1.50 |
| 6 | 138 | 10.7 | 14.8 | 0.32 | 0.45 | 18.5 | none | 3.4 | 2.00 |

[#]The fraction of the polymer obtained in the second polymerization stage.
[##]The amount of the polymer obtained in the second polymerization stage.

Examples 7 to 16

Various Polyenes

Polypropylene compositions were prepared in accordance with the same procedures as those conducted in Example 1 (4) except that polyenes shown in Table 6 were used in place of the polyene used in Example 1 (4). The results of the measurements of the obtained polypropylene compositions are shown in Table 6.

TABLE 6

| Example | polyene compound | amount (mmol) | [*] | Amount obtained (g) | Fraction in second stage[#] (%) | Amount in second stage[##] (g) |
|---|---|---|---|---|---|---|
| 7 | divinylbenzene | 0.2 | $1.6 \times 10^{-6}$ | 140 | 10.5 | 14.7 |
| 8 | 1,5-hexadiene | 0.2 | $2.0 \times 10^{-6}$ | 112 | 8.5 | 9.52 |
| 9 | 1,6-heptadiene | 0.2 | $1.7 \times 10^{-6}$ | 133 | 9.5 | 12.6 |
| 10 | 1,7-octadiene | 0.2 | $1.7 \times 10^{-6}$ | 125 | 5.0 | 6.25 |
| 11 | p-3-butenylstyrene | 0.2 | $1.7 \times 10^{-6}$ | 135 | 12.5 | 16.9 |
| 12 | p-5-propenylstyrene | 0.2 | $1.7 \times 10^{-6}$ | 130 | 11.5 | 15.0 |
| 13 | norbornadiene | 0.2 | $1.6 \times 10^{-6}$ | 141 | 12.5 | 17.6 |
| 14 | 5-(3-butenyl)bicyclo-[2.2.1]hept-2-ene | 0.2 | $1.8 \times 10^{-6}$ | 122 | 7.5 | 9.15 |
| 15 | 5-vinylnobornene | 2.0 | $1.9 \times 10^{-5}$ | 118 | 10.5 | 12.4 |
| 16 | dicyclopentadiene | 2.0 | $1.4 \times 10^{-5}$ | 157 | 8.5 | 13.3 |

[#]The fraction of the polymer obtained in the second polymerization stage.
[##]The amount of the polymer obtained in the second polymerization stage.
[*]Amount by mole per 1 g of the polymer obtained in the first polymerization stage.

| Example | MI (g/10 min) | Bulk density (g/ml) | Melt tension[*] (g) | Fraction insoluble in decaline | Mw/Mn | $[\eta]_2/[\eta]_1$ |
|---|---|---|---|---|---|---|
| 7 | 1.2 | 0.44 | 15.6 | none | 3.2 | 1.5 |
| 8 | 0.8 | 0.44 | 18.5 | none | 3.1 | 1.6 |
| 9 | 0.8 | 0.45 | 17.6 | none | 3.1 | 1.9 |
| 10 | 1.3 | 0.44 | 14.5 | none | 2.8 | 2.2 |
| 11 | 2.0 | 0.42 | 11.0 | none | 3.2 | 2.1 |
| 12 | 1.0 | 0.45 | 15.3 | none | 3.6 | 1.6 |
| 13 | 1.1 | 0.44 | 15.0 | none | 3.7 | 1.6 |
| 14 | 0.7 | 0.45 | 19.5 | none | 4.0 | 1.9 |
| 15 | 3.7 | 0.44 | 5.6 | none | 2.9 | 2.1 |
| 16 | 3.2 | 0.42 | 5.0 | none | 2.9 | 2.0 |

[*]Tension in melted condition was measured at 230° C.

Comparative Example 1

A polypropylene composition was prepared in accordance with the same procedures as those conducted in Example 1 except that 1,9-decadiene was not used. As the result, 143 g of polypropylene was obtained. The results of the measurements of the obtained polypropylene composition are shown in Table 7.

Comparative Example 2

A polypropylene composition was prepared in accordance with a single stage process without conducting the second polymerization stage and 1,9-decadiene used in Example 1 (4) was used in the preparation of polypropylene in the first polymerization stage. As the result, 123 g of polypropylene was obtained. The results of the measurements of the obtained polypropylene composition are shown in Table 7.

TABLE 7

| Comparative Example | Amount obtained (g) | Fraction in second stage[#] (%) | Amount in second stage[##] (g) | MI (g/10 min) | Bulk density (g/ml) | Tension* in melted condition (g) | Fraction insoluble in decaline | Mw/ Mn | $[\eta]_2/[\eta]_1$ |
|---|---|---|---|---|---|---|---|---|---|
| 1 | 143 | 16.2 | 23.1 | 1.3 | 0.43 | 2.5 | none found | 3.5 | 1.15 |
| 2 | 123 | 0 | 0 | 0.02 | 0.38 | ** | none found | 2.5 | — |

[#]The fraction of the polymer obtained in the second polymerization stage.
[##]The amount of the polymer obtained in the second polymerization stage.
*Tension in melted condition was measured at 230° C.
**Infusible components were formed and the measurement was impossible.

Examples 17 to 20

Preparation of Polypropylene Compositions using Various Complexes (1) Supported Catalyst Components were Prepared in Accordance with the same Procedures as those Conducted in Example 1 (3) except that Metallocene Compounds shown in Table 8 were used in Place of rac-SiMe$_2$[2-Me-4-Ph-Ind]$_2$ZrCl$_2$ used in Example 1 (3).

(2) Condition of Preparation of Polypropylene Compositions
The conditions used in Example 1 (4) was changed so as to use 400 milliliters of dehydrated heptane as the solvent and 0.5 millimole of triisobutylaluminum and polypropylene compositions were prepared.

As the catalyst, the supported catalyst was used in an amount such that the entire amount of zirconium atom was 2 micromoles. The preliminary polymerization was conducted at a temperature of 25° C. under a propylene pressure of 0.3 MPa for 30 minutes. In Example 17, the first polymerization stage was conducted at a temperature of 60° C. under a propylene pressure of 0.8 MPa for 40 minutes and the second polymerization stage was conducted in the presence of 0.2 millimole of 1,9-decadiene at a temperature of 30° C. under a propylene pressure of 0.7 MPa for 60 minutes. The conditions in Examples 18 to 20 are as shown in Table 8. As the result, 125 g of polypropylene was obtained in Example 17. The results of the measurements of the obtained polypropylene compositions are shown in Table 9.

TABLE 8

| | | | | Condition of the first polymerization stage | | |
|---|---|---|---|---|---|---|
| Example | SiO$_2$/MAO (mmol-Al) | Metallocene compound | amount (μmol) | hydrogen (ml) | pressure of propylene (MPa) | temperature (° C.) | time (min) |
| 17 | 2.5 | A | 5 | 0 | 0.8 | 60 | 40 |
| 18 | 2.5 | B | 10 | 0 | 0.8 | 55 | 90 |
| 19 | 2.5 | C | 10 | 0 | 0.7 | 50 | 90 |
| 20 | 2.5 | A | 5 | 5 | 0.8 | 60 | 40 |

A: rac-SiMe$_2$[2-Me-4,5-Benzo-Ind]$_2$ZrCl$_2$
B: rac-SiMe$_2$[2-Me-Ind]$_2$ZrCl$_2$
C: rac-iPrCpFluZrCl$_2$

| | Condition of the second polymerization stage | | | |
|---|---|---|---|---|
| | 1,9-decadiene (mmol) | * | pressure of propylene (MPa) | temperature (° C.) | time (min) |
| Example 17 | 0.2 | 0.7 × 10$^{-6}$ | 0.7 | 30 | 60 |
| Example 18 | 0.2 | 1.3 × 10$^{-6}$ | 0.7 | 30 | 60 |
| Example 19 | 0.2 | 2.5 × 10$^{-6}$ | 0.7 | 30 | 60 |
| Example 20 | 0.2 | 1.3 × 10$^{-6}$ | 0.7 | 40 | 30 |

*Amount by mole per 1 g of the polymer obtained in the first polymerization stage.

TABLE 9

| Example | Amount obtained (g) | Fraction in second stage[#] (%) | Amount in second stage[##] (g) | MI (g/10 min) | Bulk density (g/ml) | Tension* in melted condition (g) | Fraction insoluble in decaline | Mw/ Mn | $[\eta]_2/[\eta]_1$ |
|---|---|---|---|---|---|---|---|---|---|
| 17 | 125 | 8.5 | 10.6 | 3.5 | 0.43 | 10.5 | none | 2.9 | 1.5 |
| 18 | 172 | 9.0 | 15.5 | 10.5 | 0.45 | 4.5 | none | 2.9 | 1.8 |
| 19 | 91.5 | 12.5 | 11.5 | 21.5 | 0.42 | 3.5 | none | 3.5 | 1.6 |
| 20 | 165 | 4.7 | 7.8 | 11.0 | 0.41 | 6.5 | none | 2.8 | 1.2 |

[#]The fraction of the polymer obtained in the second polymerization stage.
[##]The amount of the polymer obtained in the second polymerization stage.
*Tension in melted condition was measured at 230° C.

Examples 21 to 24

Preparation of Polypropylene Compositions using Composite Supported Catalysts (1) Preparation of Supported Catalyst Components Catalysts were prepared in accordance with the same procedures as those conducted in Example 1 (3) except that two types of metallocene compounds were used. The two catalyst components were used after dissolving into 2 milliliters of dehydrated toluene in advance. The conditions of the preparation are shown in Table 10.

(2) Preparation of Polypropylene Compositions

Polypropylene compositions were prepared using a composite supported catalyst in accordance with the same procedures as those conducted in Example 1 (4) except that some of the conditions of the preparation were changed. In the second polymerization stage, 0.2 millimole of 1,9-decadiene was used. This amount corresponds to $1.7 \times 10^{-6}$ moles (Example 21), $2.2 \times 10^{-6}$ moles (Example 22), $4.6 \times 10^{-6}$ moles (Example 23) and $1.0 \times 10^{-6}$ moles (Example 24) based on 1 g of the polymer obtained in the first polymerization stage. The results of the measurements of the obtained polypropylene compositions are shown in Table 11.

TABLE 10

| | | Metallocene compound 1 | |
|---|---|---|---|
| Example | SiO$_2$/MAO (mmol-Al) | compound | amount (µmol) |
| 21 | 2.0 | rac-SiMe$_2$[2-Me-4-Ph-Ind]$_2$ZrCl$_2$ | 2.5 |
| 22 | 2.0 | rac-(1,2'-ethylene)(2,1'-ethylene)-bis(indenyl)zirconium dichloride | 2.5 |
| 23 | 2.0 | rac-SiMe$_2$[2-Me-4,5-Benzo-Ind]$_2$ZrCl$_2$ | 2.5 |
| 24 | 2.0 | rac-SiMe$_2$[2-Me-4,5-Benzo-Ind]$_2$ZrCl$_2$ | 2.5 |

| | Metallocene compound 2 | |
|---|---|---|
| Example | compound | amount (µmol) |
| 21 | rac-SiMe$_2$[2-Me-4-Ph-Ind]$_2$HfCl$_2$ | 2.5 |
| 22 | rac-SiMe$_2$[2-Me-4-Ph-Ind]$_2$HfCl$_2$ | 2.5 |
| 23 | rac-ethandiyl(1-(4,7-diisopropylindenyl))-(2-(4,7-diisopropylindenyl)hafnium dichloride | 2.5 |
| 24 | rac-SiMe$_2$[2-Me-4-Ph-Ind]$_2$ZrCl$_2$ | 2.5 |

Example 25

Preparation of a Low Regularity Isotactic Polypropylene Composition

Into a pressure-resistant autoclave made of stainless steel and having a volume of 1.6 liters, 400 milliliters of dehydrated heptane and 0.5 millimole of triisobutylaluminum were placed and the resultant solution was stirred at the room temperature for 10 minutes. To the obtained solution, 1.0 millimole of methylaluminoxane [1.47 moles/liter, Albemarle Co., Ltd.; the content of trimethylaluminum: 14.5% by weight] was added and 1 milliliter of a toluene solution containing 0.2 micromoles of rac-(1,2'-ethylene)-(2,1'-ethylene) bis(3-methylindenyl)zirconium dichloride was added as the metallocene catalyst. Hydrogen in an amount of 30 milliliters was further added. The temperature was set at 60° C. and the polymerization was started by introducing propylene at a partial pressure of 0.65 MPa. Polypropylene was prepared for 30 minutes while the temperature was controlled. After the prescribed reaction time had passed, the gas components such as unreacted propylene was completely removed by releasing the pressure and blowing with nitrogen while the temperature was maintained. The temperature was controlled at 30° C. and a sample was taken out under this condition. It was found that the product was completely dissolved. Then, 0.6 millimole of 1,9-decadiene was added and the resultant mixture was stirred for 10 minutes. Propylene was introduced at a pressure of 0.7 MPa and the polymerization was conducted at 40° C. for 20 minutes. The reaction mixture was cooled to the room temperature and the pressure was released. The reaction system was a homogeneous solution. The reaction mixture was added into a great amount of methanol and a low stereoregularity polypropylene composition was recovered. The amount of the recovered product was 95 g. The amount of the used diene was $1.05 \times 10^{-5}$ moles per 1 g of the polymer obtained in the first polymerization stage.

The obtained polypropylene composition was analyzed in accordance with $^{13}$C-NMR and it was found that the stereoregularity expressed by mmmm was 58.2%. The melt index measured in accordance with the method of Japanese Industrial Standard K 7210 at a temperature of 230° C. under a load

TABLE 11

| Example | Amount obtained (g) | Fraction in second stage# (%) | Amount in second stage## (g) | MI (g/10 min) | Bulk density (g/ml) | Tension* in melted condition (g) | Fraction insoluble in decaline | Mw/Mn | $[\eta]_2/[\eta]_1$ |
|---|---|---|---|---|---|---|---|---|---|
| 21 | 120 | 4.0 | 4.8 | 0.53 | 0.45 | 18.5 | none | 2.8 | 1.52 |
| 22 | 95 | 4.5 | 4.3 | 23.2 | 0.38 | 17.0 | none | 2.9 | 2.33 |
| 23 | 45 | 3.2 | 1.4 | 7.50 | 0.38 | 16.5 | none | 2.9 | 1.85 |
| 24 | 185 | 4.7 | 8.7 | 6.30 | 0.44 | 17.5 | none | 3.0 | 1.80 |

The fraction of the polymer obtained in the second polymerization stage.
The amount of the polymer obtained in the second polymerization stage.
*Tension in melted condition was measured at 230° C.

of 21.18 N was 2.3 g/10 min. The tension in melted condition was 17.5 g. No portions insoluble in decaline at 135° C. were found.

Example 26

Preparation of a Polyethylene Composition

Into a pressure-resistant autoclave made of stainless steel and having a volume of 1.6 liters, 400 milliliter of dehydrated heptane and 0.5 millimole of triisobutylaluminum were placed and the resultant solution was stirred at the room temperature for 10 minutes. To the obtained solution, a catalyst which was similar to the catalyst prepared in Example 1 (3) was added in an amount such that the amount of zirconium atom was 2 micromoles. Hydrogen was introduced at a pressure of 0.01 MPa and the temperature was set at 60° C. The polymerization was started by introducing ethylene at a partial pressure of 0.7 MPa. Polyethylene was prepared for 60 minutes while the temperature was controlled. After the prescribed reaction time had passed, the reaction mixture was cooled to the room temperature. The pressure was released and the reaction system was sufficiently blown with dry hydrogen. A sample was taken out.

To the above polymerization system containing polyethylene, 2 milliliters of a heptane solution containing 0.2 millimole of 1.9-decadiene (in an amount by mole of $4.0 \times 10^{-6}$ moles per 1 g of the polymer obtained in the first polymerization stage) was added. While the temperature was controlled at 30° C., ethylene was introduced at a partial pressure of 0.7 MPa and the polymerization was conducted for 15 minutes. After the polymerization was completed, the pressure was released and polyethylene was recovered. The amount of the recovered polyethylene was 52 g. The results of the measurements of the obtained polyethylene composition are shown in Table 12.

Example 27

Preparation of an Ethylene/1-octene Copolymer

An ethylene/1-octene copolymer was prepared in accordance with the same procedures as those conducted in Example 26 except that 2 milliliters of 1-octene was introduced before hydrogen was introduced. As the result, 63 g of the copolymer was obtained. The amount of the used 1,9-decadiene in an amount of 0.2 millimole corresponds to $3.3 \times 10^{-6}$ moles per 1 g of the polymer obtained in the first polymerization stage. The results of the measurements are shown in Table 12.

Examples 28

Preparation of a Syndiotactic Polystyrene Composition (1) Preparation of a Catalyst Into a vessel sufficiently dried and purged with nitrogen, toluene, 38 millimole of triisobutylaluminum, 16.8 millimole of methylaluminoxane available from by Albemarle Co., Ltd. and 0.15 millimole of octahydrofluorenyltitanium trimethoxide were placed and the concentration of titanium was adjusted at 3 millimole/liter. The components were mixed together and stirred for 1 hour to prepare a catalyst.

(2) Preparation of Syndiotactic Polystyrene (SPS)

Into a reactor sufficiently dried and purged with nitrogen, 5 liters of styrene and triethylaluminum in an amount such that the ratio of the amounts by mole of styrene/triethylaluminum was 3500/1 were placed. After the mixture of styrene and triethylaluminum was heated at a temperature of 85° C., 21 milliliters of the catalyst prepared in the foregoing term (1) was added and the polymerization was started. After 1 hour, 3 liters of toluene was added to remove the unreacted styrene. After the solid-liquid separation of the obtained product, SPS of the first polymerization stage was prepared. A portion of SPS of the first polymerization stage was taken as a sample and evaluated. The amount of the obtained product was 1,100 g and the weight-average molecular weight was 153,000.

Then, a solution obtained by dissolving 2 millimole of divinylbenzene into 100 milliliters of toluene was added over 10 minutes and the resultant mixture was kept being stirred for 10 minutes.

The temperature of the polymerization was set at 40° C. A mixture of styrene and triethylaluminum having the ratio of the amounts by mole of styrene/triethylaluminum adjusted at 3500/1 in advance in an amount of 1 liter was added and the second polymerization stage was started. After 15 minutes, the polymerization was discontinued by adding methanol. The obtained polymer was washed with methanol and dried at 200° C. for 2 hours. The amount of the obtained product was 1,150 g and the product had a weight-average molecular weight of 164,000. $[\eta]_2/[\eta]_1$ was 2.62. The amount of the used diene was $1.8 \times 10^{-6}$ per 1 g of the polymer obtained in the first polymerization stage.

Example 29

A polypropylene/polyethylene composition was prepared in accordance with the same procedures as those conducted in

TABLE 12

| Example | Fraction in second stage# (%) | Amount in second stage## (g) | MI (g/10 min) | Bulk density (g/ml) | Density* (g/cm³) | Tension** in melted condition (g) | Fraction insoluble in decaline | Mw/ Mn | $[\eta]_2/[\eta]_1$ |
|---|---|---|---|---|---|---|---|---|---|
| 26 | 4.5 | 2.34 | 2.1 | 0.43 | — | 11.3 | none | 2.9 | 1.50 |
| 27 | 4.2 | 2.65 | 15 | 0.35 | 0.93 | 4.5 | none | 3.5 | 1.71 |

The fraction of the polymer obtained in the second polymerization stage.
The amount of the polymer obtained in the second polymerization stage.
*Density was measured at 23° C. using a density gradient tube.
**Tension in melted condition was measured at 190° C.

Example 1 (4) except that ethylene was used in place of propylene as the monomer in the second polymerization stage. The amount of the obtained composition was 120 g and the fraction of the polyethylene produced in the second polymerization stage was 12.5%. To evaluate the uniformity of the obtained composition, a pressed sheet (the thickness: about 100 μm) was prepared at 220° C. and examined by the visual observation. As the result, no gels were found and the uniformity was excellent.

Example 30

(1) Preparation of a Supported Catalyst

A catalyst component was prepared in accordance with the same procedures as those conducted in Example 1 (3) except that 5 micromoles of rac-iPrCpFluZrCl$_2$ was used in place of rac-SiMe$_2$[2-Me-4-Ph-Ind]$_2$-ZrCl$_2$.

(2) Preparation of a Composition of Polyethylene with an Ethylene/Norbornene Copolymer Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the supported catalyst prepared in the foregoing term (1) was added. After the preliminary polymerization was conducted at 25° C. under an ethylene pressure of 0.2 MPa for 30 minutes for activation of the catalyst, the unreacted ethylene was removed by releasing the pressure and blowing with nitrogen. Then, 0.02 MPa of hydrogen was introduced. The temperature was set at 60° C. and the polymerization was started by introducing ethylene at a partial pressure of 0.7 MPa. Polyethylene was produced for 210 minutes while the temperature was controlled. After the prescribed reaction time had passed, the reaction mixture was cooled to the room temperature and the pressure was released. The reactor was sufficiently blown with dry nitrogen and a portion of the reaction mixture was taken as a sample.

To the above polymerization system containing polyethylene, 2 milliliters of a heptane solution containing 0.2 millimole of 1,9-decadiene was added and 73 milliliters of norbornene was also added. While the temperature was controlled at 80° C., ethylene was introduced at a partial pressure of 0.7 MPa and the polymerization was conducted for 90 minutes. After the polymerization was completed, the pressure was released and a composition was recovered. The amount of the composition was 31 g. The amount of the used diene was $1.3 \times 10^{-5}$ moles per 1 g of the polymer obtained in the first polymerization stage.

(3) Evaluation of Uniformity

To evaluate the uniformity of the obtained composition, a pressed sheet (the thickness: about 100 μm) was prepared at 220° C. and examined by visual observation. As the result, no gels were found and the uniformity was excellent.

Example 32

Preparation of a Polypropylene Composition

Into a round-bottomed flask having an inner volume of 200 milliliters, equipped with a stirrer and purged with nitrogen, 10 g of diethoxymagnesium and 80 milliliters of toluene were placed and a suspension was prepared. To the prepared suspension, 20 milliliters of TiCl$_4$ was added. After the temperature was raised to 90° C., 27 milliliters of n-butyl phthalate was added. The temperature was further raised to 115° C. and the reaction was allowed to proceed for 2 hours under stirring. After the reaction was completed, the reaction product was washed twice with 100 milliliters of toluene at 90° C. and 20 milliliters of TiCl$_4$ and 80 milliliters of toluene were freshly added. The reaction was allowed to proceed at 115° C. for 2 hours under stirring. After the reaction was completed, the reaction product was washed 10 times with 200 milliliters of n-heptane at 40° C. The content of titanium in the obtained solid catalyst component was measured and found to be 2.61% by weight.

(2) Preparation of a Polypropylene Composition

Into a pressure-resistant autoclave made of stainless steel and having a volume of 1.6 liters, 400 milliliters of dehydrated heptane and 0.5 millimole of triisobutylaluminum were placed and the resultant solution was stirred for 5 minutes at the room temperature. To the stirred solution, 0.033 millimole of dicyclopentyldimethoxysilane was added and the resultant mixture was stirred for 2 minutes. Then, the solid catalyst component containing titanium prepared in the foregoing term (1) in an amount such that the amount of titanium atom was 0.033 millimole was added. Hydrogen was introduced at a pressure of 0.02 MPa·G and the temperature of the content was raised to 80° C. To the resultant mixture, propylene was added for 60 minutes while the pressure of propylene was adjusted at 0.8 MPa·G and polypropylene of the first polymerization stage was prepared.

After the reaction was completed, the unreacted gas was removed by releasing the pressure and completely removed by purging with nitrogen. A small amount of the polymer was taken out and used as the sample for evaluating polypropylene obtained in the first polymerization stage. A solution prepared by dissolving 4 mmol of divinylbenzene into 5 ml of heptane was added into the autoclave over 30 seconds under stirring and the stirring was continued for further 5 minutes.

Then, the temperature was set at 30° C. Propylene was introduced for 75 minutes while the pressure was adjusted at 0.8 MPa·G and polypropylene of the second polymerization stage was prepared. After the reaction was completed, the pressure was released. The content was added into 2 liters of methanol and the formed polymer was recovered. The polymer was separated by filtration and dried under a stream of the air and in vacuo and 70.5 g of a polypropylene composition was obtained. The results of the measurements of the obtained polypropylene composition are shown in Table 13.

Example 33

Preparation of a Polypropylene Composition (1) Preparation of a Catalyst Component Into a three-necked flask having an inner volume of 500 milliliters, equipped with a stirrer and purged with nitrogen, 60 milliliters of dehydrated octane and 16 g of diethoxymagnesium were placed and the resultant mixture was heated at 40° C. After 2.4 milliliters of silicon tetrachloride was added to the heated mixture and the resultant mixture was stirred for 20 minutes, 1.6 milliliters of dibutyl phthalate was added. The temperature of the resultant solution was raised to 80° C. and 77 milliliters of titanium tetrachloride was added. The operation of bringing the components into contact with each other was conducted under stirring at an inner temperature of 125° C. for 2 hours. Then, the stirring was stopped and the solid substances were precipitated. The supernatant liquid was separated and 100 milliliters of dehydrated octane was added to the separated liquid. The temperature was raised to 125° C. and kept at 125° C. for 1 minute under stirring. The stirring was discontinued and the solid substances were precipitated. Then, the supernatant liquid was separated. This operation of washing was repeated 7 times. Then, 122 milliliters of titanium tetrachloride was added and the second operation of bringing the components into contact with each other was conducted at an inner temperature of 125° C. for 2 hours under stirring. Thereafter, the washing with dehydrated octane at 125° C. described above was repeated 6 times and a solid catalyst component was obtained.

(2) Preparation of a Polypropylene Composition

Into a pressure-resistant autoclave made of stainless steel and having a volume of 1.6 liters, 400 milliliters of dehydrated octane and 2.0 millimole of triethylaluminum were placed and the resultant solution was stirred for 5 minutes at the room temperature. To the stirred solution, 0.1 millimole of dicyclopentyldimethoxysilane was added and the resultant mixture was stirred for 2 minutes. Then, the solid catalyst component containing titanium prepared in the foregoing term (1) in an amount such that the amount of titanium atom was 0.005 millimole was added. Hydrogen was introduced at a pressure of 0.05 MPa·G and the temperature of the content was raised to 80° C. To the resultant mixture, propylene was added for 60 minutes while the pressure of propylene was adjusted at 0.8 MPa·G and polypropylene of the first polymerization stage was prepared.

After the reaction was completed, the unreacted gas was removed by releasing the pressure and completely removed by purging with nitrogen. A small amount of the polymer was taken out and used as the sample for evaluating polypropylene obtained in the first polymerization stage. A solution prepared by dissolving 4 millimole of divinylbenzene into 5 milliliters of heptane was added into the autoclave over 30 seconds under stirring and the stirring was continued for further 5 minutes.

Then, the temperature was set at 30° C. Propylene was introduced for 75 minutes while the pressure was adjusted at 0.8 MPa·G and polypropylene of the second polymerization stage was prepared. After the reaction was completed, the pressure was released. The content was added into 2 liters of methanol and the formed polymer was recovered. The polymer was separated by filtration and dried in vacuo under a stream of the air and 175 g of a polypropylene composition was obtained. The results of the measurements of the obtained polypropylene composition are shown in Table 13.

Example 34

Preparation of a Polypropylene Composition (1) Preparation of a Catalyst Component Into a three-necked flask having an inner volume of 500 milliliters, equipped with a stirrer and purged with nitrogen, 16 g of diethoxymagnesium (0.14 moles) was placed and 60 milliliters of dehydrated octane was added. The resultant solution was heated at 40° C. After 2.4 milliliters (22.5 millimole) of silicon tetrachloride was added to the heated solution and the obtained solution was stirred for 20 minutes, 12.7 millimole of di-n-butyl phthalate was added. The temperature of the resultant mixture was raised to 80° C. and 77 milliliters (0.70 moles) of titanium tetrachloride was dripped through a dropping funnel. The operation of supporting was conducted under stirring at an inner temperature of 110° C. for 2 hours. Then, the obtained product was sufficiently washed with dehydrated heptane. For the second operation of supporting, 122 milliliters (1.12 moles) of titanium tetrachloride was added and the resultant mixture was stirred for 2 hours while the inner temperature was adjusted at 110° C. The obtained product was sufficiently washed with dehydrated heptane and a solid product was obtained.

(2) Preparation of a Solid Catalyst Component (the Contact of the Solid Product, an Organoaluminum and an Organosilane Component Into a three-necked flask having an inner volume of 500 milliliters, equipped with a stirrer and purged with nitrogen, 10 g (3.3 millimole-Ti) of the above solid product was placed and 60 milliliters of dehydrated heptane was added. After the resultant mixture was heated at 40° C., 46.2 millimole of triethylaluminum and 82.5 millimole of dicyclopentyldimethoxysilane were added. The obtained mixture was stirred for 12 hours and the product was washed sufficiently with dehydrated heptane. The obtained solid component was used as the solid catalyst component.

(3) Preparation of a Polypropylene Composition

In accordance with the same procedures as those conducted in Example 33 (2) except that 400 milliliters of dehydrated heptane as the solvent, 0.25 millimole of dicyclopentyldimethoxysilane, 0.1 MPa·G of hydrogen and the solid catalyst component containing titanium prepared in the foregoing term (2) in an amount such that the amount of titanium atom was 0.005 millimole were used, 155 g of a polypropylene composition was obtained. The results of the measurements of the obtained polypropylene composition are shown in Table 13.

TABLE 13

|  | Amount obtained (g) | Fraction in second stage# (%) | $[\eta]_2/[\eta]_1$ | MI* (g/10 min) | mmmm (%) | Tension* of melted condition (g) | Fraction insoluble in decaline |
|---|---|---|---|---|---|---|---|
| Example 32 | 70.5 | 7.5 | 2.5 | 8.4 | 99.0 | 1.1 | none |
| Example 33 | 175 | 8.6 | 5.2 | 35 | 99.4 | 0.8 | none |
| Example 34 | 155 | 5.2 | 5.1 | 30 | 97.3 | 0.7 | none |

The fraction of the polymer obtained in the second polymerization stage.
*MI and the tension in melted condition were measured at 230° C.

Examples 35 to 39

Polypropylene compositions were prepared using 400 milliliters of dehydrated heptane as the solvent, 10 millimole of triisobutylaluminum, 0.033 millimole of dicyclopentyldimethoxysilane, 0.0033 millimole of the solid catalyst prepared in Example 32 (1) and the polyenes shown in Table 14 under the conditions also shown in Table 14. The results of the measurements of the obtained polypropylene compositions are shown in Table 15.

Comparative Example 3

A polypropylene composition was prepared in accordance with the same procedures as those conducted in Example 35 except that 1,9-decadiene was not used. The results of the measurements of the obtained polypropylene composition are shown in Table 15.

Examples 40 to 43

Olefin-based polymers were prepared using 400 milliliters of dehydrated heptane as the solvent, 10 millimole of triisobutylaluminum, 0.033 millimole of dicyclopentyldimethoxysilane, 0.0033 millimole of the solid catalyst prepared in Example 32 (1) and the polyenes shown in Table 16 under the conditions also shown in Table 16. Dicyclopentyldimethoxysilane was not used in Example 43. The results of the measurements of the obtained polypropylene composition are shown in Table 17.

TABLE 14

| | Condition of the first polymerization stage | | | |
| --- | --- | --- | --- | --- |
| | pressure of hydrogen (MPa·G) | pressure of propylene (MPa·G) | temperature (°C.) | time (min) |
| Example 35 | 0.5 | 0.8 | 80 | 60 |
| Comparative Example 3 | 0.5 | 0.8 | 80 | 60 |
| Example 36 | 0.2 | 0.8 | 80 | 60 |
| Example 37 | 0.2 | 0.8 | 80 | 60 |
| Example 38 | 0.2 | 0.8 | 80 | 60 |
| Example 39 | 0.2 | 0.8 | 80 | 60 |

| | Condition of the second polymerization stage | | | | |
| --- | --- | --- | --- | --- | --- |
| | polyene | | pressure of propylene (MPa·G) | temperature (°C.) | time (min) |
| | compound | amount (mmol) | | | |
| Example 35 | 1,9-decadiene | 2.0 | 0.8 | 40 | 60 |
| Comparative Example 3 | — | — | 0.8 | 40 | 60 |
| Example 36 | 1,9-decadiene | 4.0 | 0.8 | 40 | 200 |
| Example 37 | 1,7-octadiene | 4.0 | 0.8 | 30 | 60 |
| Example 38 | p-3-butenyl-styrene | 4.0 | 0.8 | 40 | 60 |
| Example 39 | p-5-propenyl-styrene | 4.0 | 0.8 | 40 | 60 |

TABLE 16

| | Condition of the first polymerization stage | | | | |
| --- | --- | --- | --- | --- | --- |
| | pressure of hydrogen (MPa·G) | monomer | | temperature (°C.) | time (min) |
| | | compound | supplied pressure (MPa·G) | | |
| Example 40 | 0.2 | propylene | 0.8 | 80 | 60 |
| | | ethylene | 0.08 | | |
| Example 41 | 0.2 | propylene | 0.8 | 80 | 60 |
| | | ethylene | 0.08 | | |
| Example 42 | 0.2 | propylene | 0.8 | 80 | 60 |
| Example 43 | 2.5 | ethylene | 0.8 | 80 | 60 |

| | Condition of the second polymerization stage | | | | |
| --- | --- | --- | --- | --- | --- |
| | amount of 1,9-decadiene (mmol) | monomer | | temperature (°C.) | time (min) |
| | | compound | supplied pressure (MPa·G) | | |
| Example 40 | 4.0 | propylene | 0.8 | 40 | 60 |
| Example 41 | 4.0 | ethylene | 0.6 | 40 | 60 |
| Example 42 | 4.0 | ethylene | 0.8 | 30 | 20 |
| Example 43 | 4.0 | ethylene | 0.8 | 30 | 20 |

TABLE 15

| | Amount obtained (g) | Fraction in second stage# (%) | $[\eta]_2/[\eta]_1$ | MI* (g/10 min) | mmmm (%) | Tension* in melted condition (g) | Fraction insoluble in decaline |
| --- | --- | --- | --- | --- | --- | --- | --- |
| Example 35 | 74.6 | 5.9 | 3.3 | 16.2 | 98.8 | 0.7 | none |
| Comparative Example 3 | 72.0 | 5.8 | 3.3 | 15.8 | 98.9 | 0.25 | none |
| Example 36 | 73.5 | 5.2 | 3.5 | 8.5 | 98.7 | 1.1 | none |
| Example 37 | 75.5 | 7.1 | 3.5 | 8.2 | 98.5 | 1.2 | none |
| Example 38 | 85.5 | 4.6 | 3.2 | 4.2 | 98.2 | 2.3 | none |
| Example 39 | 82.2 | 3.9 | 3.6 | 3.8 | 99.0 | 2.2 | none |

The fraction of the polymer obtained in the second polymerization stage.
*MI and the tension in melted condition were measured at 230° C.

TABLE 17

|  | Amount obtained (g) | Fraction in second stage# (%) | $[\eta]_2/[\eta]_1$ | MI* (g/10 min) | mmmm (%) | Tension* of melted condition (g) | Fraction insoluble in decaline |
|---|---|---|---|---|---|---|---|
| Example 40 | 79.5 | 6.6 | 3.3 | 5.5 | — | 1.5 | none |
| Example 41 | 85.2 | 5.8 | 3.7 | 5.9 | — | 2.5 | none |
| Example 42 | 65.5 | 7.2 | 2.7 | 6.9 | — | 1.4 | none |
| Example 43 | 112 | 2.1 | 4.1 | 2.6 | — | 3.1 | none |

The fraction of the polymer obtained in the second polymerization stage.
*MI and the tension in melted condition were measured at 230° C. in Examples 40 to 42 and 190° C. in Example 43.

Example 44

Preparation of a Polypropylene Composition (1) Preparation of an Aluminum Oxy Compound Using 1,000 milliliters of a toluene solution of methylaluminoxane (1.47 moles/liter; available from Albemarle Co., Ltd.; the content of trimethylaluminum: 14.5% by weight), the solvent was removed under a reduced pressure (about 20 mmHg) at 60° C. After the resultant product was kept in this condition for 4 hours, the temperature was lowered to the room temperature and a dried-up methylaluminoxane was obtained.

To the dried-up methylaluminoxane, dehydrated toluene was added to dissolve methylaluminoxane and the volume of the solution was adjusted at the volume of the solution before the solvent was removed. The amount of trimethylaluminum in the methylaluminoxane was determined in accordance with $^1$H-NMR and found to be 3.6% by weight. The amount of the entire aluminum was measured in accordance with the fluorescence X-ray method (the ICP method) and found to be 1.32 moles/liter. The above mixture was left standing for 48 hours and insoluble fractions were precipitated.

The portion of the solution was filtered through a G5 glass filter and methylaluminoxane soluble in toluene was obtained. The concentration of methylaluminoxane as measured in accordance with the fluorescence X-ray method (the ICP method) was 1.06 moles/liter.

(2) Preparation of a Carrier and a Supported Methylaluminoxane 70 g of $SiO_2$ (P-10; available from FUJI SILYSIA Co., Ltd.) was dried at 140° C. for 15 hours under a nitrogen stream of a very small flow rate. The dried $SiO_2$ in an amount of 22.0 g was weighed and added into 200 milliliters of dehydrated toluene. Under an atmosphere of nitrogen, after the temperature was kept at the constant value of 0° C. under stirring, 200 milliliters of the toluene solution of methylaluminoxane prepared in the foregoing term (1) was added dropwise over 60 minutes. When the dropwise addition was completed, the temperature was raised to the room temperature and the reaction was allowed to proceed for 30 minutes in this condition. The reaction was further allowed to proceed at 70° C. for 3 hours. After the reaction was completed, the reaction mixture was kept at 60° C. The solid component was washed twice with 200 milliliters of dehydrated toluene and twice with 200 milliliters of dehydrated heptane and dried at 50° C. under a reduced pressure and 32.8 g of methylaluminoxane supported on $SiO_2$ was obtained. The obtained methylaluminoxane was added into dehydrated heptane and kept as slurry.

(3) Preparation of a Supported Metallocene Catalyst

After a Schlenk tube with a volume of 50 milliliters was dried and purged with nitrogen, 10 milliliters of dried heptane and the methylaluminoxane supported on $SiO_2$ prepared in the foregoing term (2) in an amount such that the amount of aluminum atom was 2 millimole were placed into the tube and the stirring was started. To the stirred mixture, 1 milliliter of a toluene solution containing rac-SiMe$_2$[2-Me-4-Ph-Ind]$_2$ ZrCl$_2$ in an amount such that the amount of zirconium atom was 2 micromoles and 1,2-ethanediyl(1-(4,7-diisopropylindenyl))(2-(4,7-diisopropylindenyl))hafnium dichloride in an amount such that the amount of zirconium atom was 3.0 micromoles was slowly added and the reaction was allowed to proceed for 10 minutes.

(4) Preparation of a Polypropylene Composition

Into a pressure-resistant autoclave made of stainless steel and having a volume of 1.6 liters, 400 milliliters of dehydrated heptane and 0.5 millimole of triisobutylaluminum were placed and the resultant mixture was stirred for 10 minutes at the room temperature. To the stirred solution, the entire amount of the supported catalyst prepared in the foregoing term (3) was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 0.02 MPa of hydrogen was introduced. The temperature was set at 70° C. and the polymerization was started by introducing propylene at a partial pressure of 0.7 MPa (a gauge pressure). Polypropylene was produced for 60 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.2 millimole of 1,9-decadiene was added. While the temperature was controlled at 40° C., propylene was introduced at a partial pressure of 0.7 MPa (a gauge pressure) and the polymerization was conducted for 30 minutes. After the polymerization was completed, the pressure was released and a polypropylene composition was recovered. The amount of the polypropylene composition was 141 g. The amount of the used diene was $1.7 \times 10^{-6}$ moles per 1 g of the polymer obtained in the first polymerization stage.

(5) Preparation of Pellets

To the polypropylene composition obtained in the foregoing term (4), 750 ppm of a phosphorus-based antioxidant P-EPQ (available from SANDOZ Company) and 1,500 ppm of a phenol-based antioxidant IRGANOX 1010 (available from CIBA SPECIALTY CHEMICALS Company) were added and sufficiently mixed together. The resultant mixture was melted and mixed by a 20 mm single screw mixer extruder and pelletized. Using the prepared pellets, evaluations described in the following were conducted. The results are shown in Table 18.
(i) The branching parameter a and the branching index g were measured in accordance with the methods described above.
(ii) The viscosity under elongation was measured by using MELTEN RHEOMETER produced by TOYO SEIKI Co., Ltd. using a sample having the shape of a rod with a diameter of 3 mm and a length of 20 cm at a set temperature of 180° C. The measurement was conducted at three strain rates of 0.1, 0.2 and 1.0 $s^{-1}$ and the presence or the absence of the upturn in the viscosity under elongation was examined. The upturn (the strain-hardening) was present at all strain rates.
(iii) The degradation parameter was measured in accordance with the following method. A sample in an amount of 20 g was placed into a small twin screw mixer LABOPLASTOMILL produced by TOYO SEIKI Co., Ltd. and mixed at a set temperature of 190° C. at a rotation speed of 50 rpm for 5 minutes. The measurement was also made using an apparatus for measuring viscoelasticity produced by RHEOMETRCS Company (RMS-800) at a set temperature of 190° C. The degradation parameter D was calculated from the storage modulus G' at a frequency of 0.01 rad/s in accordance with the following equation:

$$D=G'a/G'b$$

wherein G'a represents the storage modulus after the mixing and G'b represents the storage modulus before the mixing. The obtained value of the degradation parameter D was 0.94.

Example 45

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the same supported catalyst as that prepared in Example 44 (3) was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 0.05 MPa of hydrogen was introduced. The temperature was set at 60° C. and the polymerization was started by introducing propylene at a partial pressure of 0.6 MPa (a gauge pressure). Polypropylene was produced for 40 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.5 millimole of 1,9-decadiene was added. While the temperature was controlled at 60° C., propylene was introduced at a partial pressure of 0.6 MPa (a gauge pressure) and the polymerization was conducted for 30 minutes. After the polymerization was completed, the pressure was released and a polypropylene composition was recovered. The amount of the polypropylene composition was 135 g. The amount of the used diene was $4.6 \times 10^{-6}$ moles per 1 g of the polymer obtained in the first polymerization stage. The physical properties were evaluated in accordance with the same procedures as those conducted in Example 44. The results are shown in Table 18.

Example 46

A polypropylene composition was prepared in accordance with the same procedures as those conducted in Example 45 except that the pressure of the introduced hydrogen was change from 0.05 MPa (a gauge pressure) to 0.025 MPa (a gauge pressure) and the temperature of the reaction was changed from 60° C. to 30° C. The amount of the polypropylene composition was 155 g. The amount of the used diene was $1.1 \times 10^{-5}$ moles per 1 g of the polymer obtained in the first polymerization stage. The physical properties were evaluated in accordance with the same procedures as those conducted in Example 44. The results are shown in Table 18.

Example 47

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the same supported catalyst as that prepared in Example 44 (3) was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 3 MPa of hydrogen was introduced. The temperature was set at 60° C. and the polymerization was started by introducing propylene at a partial pressure of 0.65 MPa (a gauge pressure). Polypropylene was produced for 90 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.2 millimole of 1,9-decadiene was added. While the temperature was controlled at 60° C., propylene was introduced at a partial pressure of 0.65 MPa and the polymerization was conducted for 90 minutes. After the polymerization was completed, the pressure was released and a polypropylene composition was recovered. The amount of the polypropylene composition was 162 g. The amount of the used diene was $1.5 \times 10^{-6}$ moles per 1 g of the polymer obtained in the first polymerization stage. The physical properties were evaluated in accordance with the same procedures as those conducted in Example 44. The results are shown in Table 18.

Example 48

A polypropylene composition was prepared in accordance with the same procedures as those conducted in Example 47 except that the amount of the used 1,9-decadiene was changed from 0.2 millimole to 0.1 millimole and the polymerization time after adding 1,9-decadiene was changed from 90 minutes to 60 minutes. The amount of the polypropylene composition was 137 g. The amount of the used diene was $0.8 \times 10^{-6}$ moles per 1 g of the polymer obtained in the first polymerization stage. The physical properties were evaluated in accordance with the same procedures as those conducted in Example 44. The results are shown in Table 18.

Example 49

A polypropylene composition was prepared in accordance with the same procedures as those conducted in Example 47 except that amount of the used 1,9-decadiene was changed from 0.2 millimole to 0.3 millimole and the polymerization time after adding 1,9-decadiene was changed from 90 minutes to 60 minutes. The amount of the polypropylene composition was 149 g. The amount of the used diene was $2.5 \times 10^{-6}$ moles per 1 g of the polymer obtained in the first polymerization stage. The physical properties were evaluated in accordance with the same procedures as those conducted in Example 44. The results are shown in Table 18.

Example 50

A polypropylene composition was prepared in accordance with the same procedures as those conducted in Example 47 except that the polymerization time after adding 1,9-decadiene was changed from 90 minutes to 180 minutes. The amount of the polypropylene composition was 175 g. The amount of the used diene was $1.6 \times 10^{-6}$ moles per 1 g of the polymer obtained in the first polymerization stage. The physical properties were evaluated in accordance with the same procedures as those conducted in Example 44. The results are shown in Table 18.

Comparative Example 4

A polypropylene E-105GM available from IDEMITSU PETROCHEMICAL Co., Ltd. in an amount of 200 g was placed into a bag made of polyethylene and degassed. The degassed polypropylene was irradiated with electron beams in an amount of 30 kGy using an electron accelerator. The pellets of polypropylene taken out of the bag was immediately placed into an oven set at 140° C. and treated by heating for 10 minutes and pellets irradiated with electron beams were obtained. The measurements and the molding were conducted in accordance with the same methods as those in Example 44. The results are shown in Table 18.

TABLE 18

| | Example | | | |
|---|---|---|---|---|
| | 44 | 45 | 46 | 47 |
| Branching parameter a Dependency of branching on molecular weight (branching index g) | 0.51 | 0.39 | 0.36 | 0.50 |
| molecular weight: 2,000,000 to 10,000,000 | 0.87 | 0.76 | 0.77 | 0.86 |
| molecular weight: 500,000 to smaller than 2,000,000 | 0.98 | 0.97 | 0.94 | 0.97 |
| Degradation parameter D | 0.94 | 0.96 | 0.95 | 0.98 |
| Viscosity under elongation* | sh | sh | sh | sh |

| | Example | | | Comparative Example |
|---|---|---|---|---|
| | 48 | 49 | 50 | 4 |
| Branching parameter a Dependency of branching on molecular weight (branching index g) | 0.56 | 0.45 | 0.53 | 0.29 |
| molecular weight: 2,000,000 to 10,000,000 | 0.92 | 0.83 | 0.76 | 0.72 |
| molecular weight: 500,000 to smaller than 2,000,000 | 0.99 | 0.98 | 0.90 | 0.89 |
| Degradation parameter D | 0.98 | 0.96 | 0.95 | 0.68 |
| Viscosity under elongation* | sh | sh | sh | sh |

*sh: Strain-hardening was found at each strain rate

Example 51

Preparation of a Polypropylene Composition (1) Preparation of an Aluminum Oxy Compound Using 1,000 milliliters of a toluene solution of methylaluminoxane (1.47 moles/liter; available from Albemarle Co., Ltd.; the content of trimethylaluminum: 14.5% by weight), the solvent was removed under a reduced pressure (about 20 mmHg) at 60° C. After the resultant product was kept in this condition for 4 hours, the volume of the solution was adjusted at the volume of the solution before the solvent was removed. The amount of trimethylaluminum in the methylaluminoxane was determined in accordance with $^1$H-NMR and found to be 3.6% by weight. The amount of the entire aluminum was measured in accordance with the fluorescence X-ray method (the ICP method) and found to be 1.32 moles/liter. The above mixture was left standing for 48 hours and insoluble fractions were precipitated.

The portion of the solution was filtered through a G5 glass filter and methylaluminoxane soluble in toluene was obtained. The concentration of methylaluminoxane as measured in accordance with the fluorescence X-ray method (the ICP method) was 1.06 moles/liter.

(2) Preparation of a Carrier and a Supported Methylaluminoxane 70 g of $SiO_2$ (P-10; available from Fuji Silysia Co., Ltd.) was dried at 140° C. for 15 hours under a nitrogen stream of a very small flow rate. The dried $SiO_2$ in an amount of 22.0 g was weighed and added into 200 milliliters of dehydrated toluene. Under an atmosphere of nitrogen, after the temperature was kept at the constant value of 0° C. under stirring, 200 milliliters of the toluene solution of methylaluminoxane prepared in the foregoing term (1) was added dropwise over 60 minutes. When the dropwise addition was completed, the temperature was raised to the room temperature and the reaction was allowed to proceed for 30 minutes in this condition. The reaction was further allowed to proceed at 70° C. for 3 hours. After the reaction was completed, the reaction mixture was kept at 60° C. The solid component was washed twice with 200 milliliters of dehydrated toluene and twice with 200 milliliters of dehydrated heptane and dried at 50° C. under a reduced pressure and 32.8 g of methylaluminoxane supported on $SiO_2$ was obtained. The obtained methylaluminoxane was added into dehydrated heptane and kept as slurry. The ratio of the amounts by weight of $SiO_2$/methylaluminoxane was 1/0.43.

(3) Preparation of a Supported Metallocene Catalyst

After a Schlenk tube with a volume of 50 milliliters was dried and purged with nitrogen, 10 milliliters of dried heptane and the methylaluminoxane supported on $SiO_2$ prepared in the foregoing term (2) in an amount such that the amount of aluminum atom was 2 millimole were placed into the tube and the stirring was started. To the stirred mixture, 1 milliliter of a toluene solution containing rac-SiMe$_2$[2-Me-4-Ph-Ind]$_2$ZrCl$_2$ in an amount such that the amount of zirconium atom was 2 micromoles was slowly added and the reaction was allowed to proceed for 10 minutes.

(4) Preparation of a Polypropylene Composition

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the supported catalyst prepared in the foregoing term (3) was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 0.02 MPa of hydrogen was introduced. The temperature was set at 70° C. and the polymerization was started by introducing propylene at a partial pressure of 0.7 MPa (a gauge pressure). Polypropylene was produced for 60 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.2 millimole of 1,9-decadiene was added. While the temperature was controlled at 40° C., propylene was introduced at a partial pressure of 0.7 MPa and the polymerization was conducted for 30 minutes. After the polymerization was completed, the pressure was released and a polypropylene composition was recovered. The amount of the polypropylene composition was 152 g. The amount of the used diene was $1.5 \times 10^{-6}$ moles per 1 g of the polymer obtained in the first polymerization stage.

(5) Preparation of Pellets

To the polypropylene composition obtained in the foregoing term (4), 750 ppm of a phosphorus-based antioxidant P-EPQ (available from SANDOZ Company) and 1,500 ppm of a phenol-based antioxidant IRGANOX 1010 (available from CIBA SPECIALTY CHEMICALS Company) were added and sufficiently mixed together. The resultant mixture was melted and mixed by a 20 mm single screw mixer extruder and pelletized. Using the prepared pellets, evaluations described in the following were conducted. The results are shown in Table 19. MI (the melt index) was 0.87 g/10 minutes and no fractions insoluble in decaline at 135° C. were contained.

(i) MI (the melt index) was measured in accordance with the method of Japanese Industrial Standard K 7210 at a temperature of 230° C. under a load of 21.18 N.

(ii) The presence or the absence of the fraction insoluble in decaline was examined by dissolving a polyolefin-based resin composition at 135° C. under stirring in an amount such that the concentration of the polymer was adjusted at 0.1 to 0.3 g/deciliter and evaluated by visual observation after the mixture was stirred for 2 hours and was then left standing.

(iii) The branching parameter a and the branching index g were measured in accordance with the methods described above.

(iv) The amount of high molecular weight components was obtained by calculating the fraction by weight of the components having molecular weights of 1,000,000 or greater in the curve of the molecular weight distribution obtained by the measurements in accordance with GPC/MALLS.

The recovery of strain was measured by an apparatus for measuring creep PSR200 produced by RHEOMETRICS Company. Using two sample pieces having the shape of a disk having a diameter of 25 mm, the measurement was conducted under the conditions of a distance between gaps of 1.2 mm, a temperature of 190° C. and a shearing stress of 500 Pa. The stress was released when 100 seconds passed after the application of the load of stress. When the recovery of strain at the time when 200 seconds have passed after the release of the stress is represented by $\gamma_r$, and the shearing strain at the time when 100 seconds have passed after the application of the load of stress is represented by $\gamma$, the value of $(\gamma_r/\gamma) \times 100$ is used as the recovery of strain.

(6) Expansion Molding

To 100 parts by weight of the polypropylene composition obtained in the foregoing term (4), 5 parts by weight of a foaming agent (EE205; available from EIWA KASEI KOGYO Co., Ltd.,) was added. The resultant mixture was extruded by a single screw extruder of the V30 type produced by TANABE PLASTIC KIKAI Co., Ltd. (the diameter of the screw: 30 mm; L/D=40) and a foamed molded article having the shape of a rod was obtained. The conditions of the extrusion were as follows: the temperature of C1 was 210° C.; the temperature of C2 was 220° C.; the temperatures of C3 to C5 were 180° C.; the temperature of the die was 180° C.; the rotation speed was 50 rpm; and the amount of extrusion was 2.5 kg/hr.

The density of the foamed molded article obtained above was obtained by dividing the weight of the article by the volume obtained by dipping the article into water and the expansion ratio was obtained from the obtained density. The presence or the absence of gel was examined by visual observation. The results are shown in Table 19.

Example 52

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of a supported catalyst of rac-SiMe$_2$[2-Me-4-Ph-Ind]$_2$ZrCl$_2$ which was the same as that prepared in Example 51 (3) described above and contained 5 micromoles of zirconium atom was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 5 MPa of hydrogen was introduced. The temperature was set at 60° C. and the polymerization was started by introducing propylene at a partial pressure of 0.6 MPa (a gauge pressure). Polypropylene was produced for 40 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.5 millimole of 1,9-decadiene was added. While the temperature was controlled at 60° C., propylene was introduced at a partial pressure of 0.6 MPa (a gauge pressure) and the polymerization was conducted for 30 minutes. After the polymerization was completed, the pressure was released and a polypropylene composition was recovered. The amount of the polypropylene composition was 180 g. The amount of the used diene was $3.3 \times 10^{-6}$ moles per 1 g of the polymer obtained in the first polymerization stage. The physical properties were evaluated in accordance with the same methods as those conducted in Example 51. The results are shown in Table 19.

Example 53

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of a supported catalyst of rac-SiMe$_2$[2-Me-4-Ph-Ind]$_2$ZrCl$_2$ which was the same as that prepared in Example 51 (3) described above and contained 5 micromoles of zirconium atom was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 2.5 MPa of hydrogen was introduced. The temperature was set at 60° C. and the polymerization was started by introducing propylene at a partial pressure of 0.6 MPa (a gauge pressure). Polypropylene was produced for 40 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.5 millimole of 1,9-decadiene was added. While the temperature was controlled at 60° C., propylene was introduced at a partial pressure of 0.6 MPa (a gauge pressure) and the polymerization was conducted for 30 minutes. After the polymerization was completed, the pressure was released and a polypropylene composition was recovered. The amount of the polypropylene composition was 162 g. The amount of the used diene was $3.0 \times 10^{-6}$ moles per 1 g of the polymer obtained in the first polymerization stage. The physical properties were evaluated in accordance with the same methods as those conducted in Example 51. The results are shown in Table 19.

Example 54

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the same supported catalyst as that prepared in Example 51 (3) described above was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 3 MPa of hydrogen was introduced. The temperature was set at 60° C. and the polymerization was started by introducing propylene at a partial pressure of 0.65 MPa (a gauge pressure). Polypropylene was produced for 90 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.2 millimole of 1,9-decadiene was added. While the temperature was controlled at 40° C., propylene was introduced at a partial pressure of 0.65 MPa (a gauge pressure) and the polymerization was conducted for 90 minutes. After the polymerization was completed, the pressure was released and a polypropylene composition was recovered. The amount of the polypropylene composition was 148 g. The amount of the used diene was $1.8 \times 10^{-6}$ moles per 1 g of the polymer obtained in the first polymerization stage. The physical properties were evaluated in accordance with the same methods as those conducted in Example 51. The results are shown in Table 19.

Example 55

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the same supported catalyst as that prepared in Example 51 (3) described above was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 3 MPa of hydrogen was introduced. The temperature was set at 60° C. and the polymerization was started by introducing propylene at a partial pressure of 0.65 MPa (a gauge pressure). Polypropylene was produced for 90 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.1 millimole of 1,9-decadiene was added. While the temperature was controlled at 60° C., propylene was introduced at a partial pressure of 0.65 MPa (a gauge pressure) and the polymerization was conducted for 60 minutes. After the polymerization was completed, the pressure was released and a polypropylene composition was recovered. The amount of the polypropylene composition was 164 g. The amount of the used diene was $0.8 \times 10^{-6}$ moles per 1 g of the polymer obtained in the first polymerization stage. The physical properties were evaluated in accordance with the same methods as those conducted in Example 51. The results are shown in Table 19.

Example 56

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the same supported catalyst as that prepared in Example 51 (3) described above was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 3 MPa of hydrogen was introduced. The temperature was set at 60° C. and the polymerization was started by introducing propylene at a partial pressure of 0.65 MPa (a gauge pressure). Polypropylene was produced for 90 minutes while the temperature was controlled. After the reaction was completed, the reaction mixture was cooled to the room temperature and the pressure was released. The reactor was sufficiently blown with dry nitrogen. A portion of the reaction product was taken as the sample.

To the above polymerization system containing polypropylene, 2 milliliters of a heptane solution containing 0.3 millimole of 1,9-decadiene was added. While the temperature was controlled at 40° C., propylene was introduced at a partial pressure of 0.65 MPa (a gauge pressure) and the polymerization was conducted for 60 minutes. After the polymerization was completed, the pressure was released and a polypropylene composition was recovered. The amount of the polypropylene composition was 155 g. The amount of the used diene was $2.5 \times 10^{-6}$ moles per 1 g of the polymer obtained in the first polymerization stage. The physical properties were evaluated in accordance with the same methods as those conducted in Example 51. The results are shown in Table 19.

Example 57

Into a pressure-resistant autoclave made of stainless steel and having a volume of 1.6 liters, 400 milliliters of dehydrated heptane and 0.5 millimole of triisobutylaluminum were placed and the resultant solution was stirred for 10 minutes at the room temperature. To the stirred solution, the entire amount of the same supported catalyst as that prepared in Example 51 (3) described above was added.

After the preliminary polymerization was conducted at 25° C. under a propylene pressure of 0.3 MPa (a gauge pressure) for 30 minutes for activation of the catalyst, the unreacted propylene was removed by releasing the pressure and blowing with nitrogen. Then, 3 MPa of hydrogen was introduced. The temperature was set at 60° C. and the polymerization was started by introducing propylene at a partial pressure of 0.65 MPa (a gauge pressure). Polypropylene was produced for 90 minutes while the temperature was controlled. After the reaction was completed, the reaction mixture was cooled to the room temperature and the pressure was released. The reactor was sufficiently blown with dry nitrogen.

To the above polymerization system containing polypropylene, 2 milliliters of a heptane solution containing 0.2 millimole of 1,9-decadiene was added. While the temperature was controlled at 40° C., propylene was introduced at a partial pressure of 0.65 MPa (a gauge pressure) and the polymerization was conducted for 180 minutes. After the polymerization was completed, the pressure was released and a polypropylene composition was recovered. The amount of the polypropylene composition was 151 g. The amount of the used diene was $1.8 \times 10^{-6}$ moles per 1 g of the polymer obtained in the first polymerization stage. The physical properties were evaluated in accordance with the same methods as those conducted in Example 51. The results are shown in Table 19.

Comparative Example 5

A polypropylene composition was prepared in accordance with a single stage polymerization which was similar to the process in Example 51 except that, in stage (4), 1,9-decadiene was used in the preparation of polypropylene in the first polymerization stage and the second polymerization stage was not conducted. As the result, 123 g of a polypropylene composition was obtained. The physical properties were evaluated in accordance with the same methods as those conducted in Example 51. The results are shown in Table 19. MI (the melt index) was 0.02 g/10 minutes and a fraction insoluble in decaline at 135° C. was found. The tension in melted condition could not be measured due to the presence of infusible components. The molecular weight distribution calculated from the weight-average molecular weight and the number-average molecular weight obtained in accordance with GPC was 2.5 (the insoluble fractions were removed by a filter before the measurement of GPC).

TABLE 19

| | Example | | | |
|---|---|---|---|---|
| | 51 | 52 | 53 | 54 |
| MI (g/10 min) | 0.87 | 0.60 | 1.0 | 0.58 |
| Branching parameter a | 0.51 | 0.39 | 0.36 | 0.50 |
| Dependency of branching on molecular weight (branching index g) | | | | |
| molecular weight: 2,000,000 to 10,000,000 | 0.87 | 0.76 | 0.77 | 0.86 |
| molecular weight: 500,000 to smaller than 2,000,000 | 0.98 | 0.97 | 0.94 | 0.97 |
| Amount of high molecular weight fraction (%) | 1.3 | 1.9 | 0.7 | 2.4 |
| Shear strain γ (%) | 125 | 120 | 35 | 105 |
| Recovery of strain γr (%) | 27 | 77 | 73 | 43 |
| Expansion ratio (times the original volume) | 2.6 | 2.5 | 2.5 | 2.2 |
| Gel* | vnf | vnf | vnf | vnf |

| | Example | | | Comparative Example |
|---|---|---|---|---|
| | 55 | 56 | 57 | 5 |
| MI (g/10 min) | 0.51 | 0.47 | 0.75 | 0.02 |
| Branching parameter a | 0.56 | 0.45 | 0.53 | 0.29 |
| Dependency of branching on molecular weight (branching index g) | | | | |
| molecular weight: 2,000,000 to 10,000,000 | 0.92 | 0.83 | 0.95 | 0.62 |
| molecular weight: 500,000 to smaller than 2,000,000 | 0.99 | 0.98 | 0.99 | 0.75 |
| Amount of high molecular weight fraction (%) | 2.7 | 2.9 | 1.6 | 12.6 |
| Shear strain γ (%) | 103 | 48 | 135 | 98 |
| Recovery of strain γr (%) | 40 | 45 | 28 | 15 |
| Expansion ratio (times the original volume) | 2.0 | 2.0 | 2.6 | — |
| Gel* | vnf | vnf | vnf | great amount |

*vnf: No gel was visually found.

Example 58

(1) Preparation of a Supported Metallocene Catalyst

After a Schlenk tube with a volume of 200 milliliters was dried and purged with nitrogen, methylaluminoxane supported on $SiO_2$ which was prepared in Example 51 (2) in an amount such that the amount of aluminum atom was 8 millimole was placed into the tube and the stirring was started.

Into the above tube, 4 milliliters of a toluene solution containing 8 micromoles of rac-SiMe$_2$[2-Me-4,5-BebzoInd]$_2$ ZrCl$_2$ [racemi-dimethylsilandiylbis-1-(2-methyl-4,5-benzoindenyl)zirconium dichloride] was slowly added and the reaction was allowed to proceed at 25° C. for 15 minutes.

(2) Preparation of a Polypropylene Composition

After a pressure-resistant autoclave made of stainless steel and having a volume of 13 liters was sufficiently dried, 7 liters of heptane dehydrated with nitrogen and a heptane solution of triisobutylaluminum in an amount such that the amount of aluminum atom was 7 millimole were placed under the atmosphere of nitrogen and the resultant solution was stirred at the room temperature for 20 minutes.

To the above solution, the entire amount of the catalyst component prepared in the foregoing term (1) was added. For the preliminary activation of the catalyst, the pressure of propylene was raised to 0.3 MPa (the gauge pressure) at 25° C. over 10 minutes and the preliminary polymerization was conducted under the constant pressure for 30 minutes.

Thereafter, the unreacted propylene was removed by releasing the pressure and blowing with nitrogen. Hydrogen in an amount of 16 milliliters was added and the temperature was raised to 60° C. over 10 minutes. Then, propylene was introduced over 20 minutes and the pressure was raised to 0.65 MPa. The introduction of propylene was continued while the pressure and the temperature were kept constant and the polymerization was conducted for 95 minutes.

The introduction of propylene was stopped and 50 milliliters of a heptane solution containing 4 milliliters of 1,7-octadiene was added. The polymerization temperature was lowered to 50° C. During this operation, the diene component was dispersed uniformly in the reaction system.

The introduction of propylene was resumed and the polymerization was conducted for 65 minutes while the temperature was kept at 50° C. and the pressure was kept at 0.6 MPa. After the polymerization was completed, 50 milliliters of ethanol was added and the reaction was stopped.

The pressure was released and a polypropylene composition was recovered. The amount of the recovered composition was 2,830 g.

The amount of the used diene was $1.4 \times 10^{-5}$ moles per 1 g of the polymer obtained in the first polymerization stage.

The above procedures of the polymerization were conducted for 7 batches and a polypropylene composition in the total amount of 21.2 kg was prepared. The prepared resin composition was pelletized in accordance with the same procedures as those conducted in Example 44.

(3) Expansion Molding

The obtained pellets in an amount of 20 kg and 20 kg of a polypropylene EX-500F available from IDEMITSU PETROCHEMICAL Co., Ltd. were blended as pellets and used for the expansion molding. For the molding, a molding machine TEM-41SS produced by Toshiba Machine Co., Ltd. was used. The molding was conducted under the following conditions: the rotation speed of the screw was 100 rpm; the set temperatures for C1 to C3 were 210° C.; the set temperatures for C4 to the die was 170° C.; the amount of carbon dioxide was about 1,000 g/hr; and the drawing speed was 3.5 m/min.

The expansion ratio of the obtained foamed sheet was 3.5 and no protrusions of gel were found in the sheet.

Comparative Example 6

(1) Procedures Similar to those Conducted in Example 58 (2) were Conducted Except that the First Polymerization Stage was not Conducted and the Preliminary Activation of the Catalyst and the Second Polymerization Stage were Conducted.

Specifically, in the procedures similar to those conducted in Example 58 (2), after the preliminary activation was conducted in the same manner, the unreacted propylene was removed by releasing the pressure and blowing with nitrogen. Then, 16 milliliters of hydrogen was added and 50 milliliters of a heptane solution containing 4 milliliters of 1,7-octadiene was added. The temperature was raised to 50° C. spending 10 minutes.

Then, propylene was introduced spending 20 minutes and the pressure was raised to 0.6 MPa. The introduction of propylene was continued while the pressure and the temperature were kept constant. The polymerization was continued until the amount of the propylene/1,7-octadiene copolymer obtained by the polymerization reached about the same as the amount in Example 58 (2) while the flow rate of propylene was monitored.

After the polymerization was conducted for 2 hours, 50 milliliters of ethanol was added and the polymerization was stopped.

The pressure was released and the polypropylene composition was recovered. The amount of the composition was 2,900 g.

The amount of the used diene per the amount of the obtained polypropylene was about the same as that in Example 58 (2).

The above procedures were conducted for 7 batches and a propylene/1,7-octadiene copolymer in the total amount of 22.0 kg was prepared. The prepared resin composition was pelletized in accordance with the same procedures as those conducted in Example 44.

(2) Expansion Molding

The obtained pellets in an amount of 20 kg and 20 kg of a polypropylene EX-500F available from IDEMITSU PETROCHEMICAL Co., Ltd. were blended as pellets and used for the expansion molding. The molding was conducted in accordance with the same procedures as those conducted in Example 58. The expansion ratio of the obtained foamed sheet was 3.1. Many protrusions of gel were found in the sheet and it was difficult that the sheet was used as a product.

INDUSTRIAL APPLICABILITY

In accordance with the process for producing the polyolefin-based resin composition of the present invention, the workability in molding of the polyolefin is improved and the polyolefin-based resin composition which has physical properties controlled in wide ranges and can be advantageously used in the fields where workability is required such as the sheet molding, the extrusion expansion molding, the blow molding, the profile extrusion molding the inflation film molding can be efficiently produced.

The polypropylene composition of the present invention provides sheets, blow molded articles and foamed articles of polypropylene which exhibit excellent melting elasticity, little degradation in recycling to enable reusing and excellent extrusion property, emit no smell causing no adverse effects on the taste of foods, have excellent secondary workability, contain no gel and are inexpensive.

The invention claimed is:

1. A process for producing a polyolefin-based resin composition which comprises:

in a first polymerization stage, polymerizing or copolymerizing at least one monomer selected from the group consisting of ethylene, propylene, an α-olefin comprising 4 to 20 carbon atoms, a styrene and a cyclic olefin, in the presence of a catalyst comprising a combination of a catalyst component (A) comprising at least one compound selected from compounds of transition metals of Group 4 of the Periodic Table comprising a cyclopentadienyl skeleton structure and a promoter component (B), thereby obtaining a homopolymer or copolymer; and in a second polymerization stage, copolymerizing the homopolymer or the copolymer obtained in the first polymerization stage with at least one monomer selected from the group consisting of propylene, an α-olefin comprising 4 to 20 carbon atoms, a styrene and a cyclic olefin, in a presence of a polyene having at least two polymerizable double bonds in one molecule, wherein the polyene is at least one compound selected from the group consisting of a polyene of a styrene-compound, a styrene/α-olefin polyene which comprises a residue group of styrene and a residue group of an α-olefin in the same molecule, a compound of formula (VI)

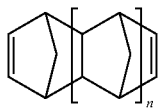

(VI)

wherein n is 0, 1, or 2,
a compound of formula (VII)

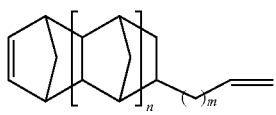

(VII)

wherein n is 0, 1, or 2, and m is an integer of from 1 to 11, and a compound of formula (VIII)

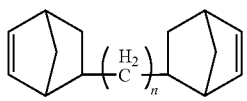

(VIII)

wherein n is an integer of from 0 to 6;
the polyene being used in an amount of $1.0 \times 10^{-7}$ to $1.0 \times 10^{-3}$ moles per 1 g of the homopolymer or the copolymer obtained in the first polymerization stage, with the proviso that, in the second polymerization stage, the homopolymer or the copolymer obtained in the first polymerization stage is not polymerized with ethylene, wherein the composition produced by the process satisfies the following requirements (a) to (c);
(a) the intrinsic viscosity $[\eta]_2$ of a polyolefin obtained in the second polymerization stage is greater than the intrinsic viscosity $[\eta]_1$ of a polyolefin obtained in the first polymerization stage,
(b) a ratio $[\eta]_2/[\eta]_1 = 1.05$ to 10, and
(c) a content of the polyolefin obtained in the second polymerization stage in the polyolefin-based resin composition is 0.001 to 80% by weight.

2. A process for producing a polyolefin-based resin composition which comprises:
in a first polymerization stage, polymerizing or copolymerizing at least one monomer selected from the group consisting of ethylene, propylene, an α-olefin comprising 4 to 20 carbon atoms, a styrene and a cyclic olefin in a presence of a catalyst comprising a catalyst component (A) comprising at least one compound selected from compounds of transition metals of Group 4 of the Periodic Table having a cyclopentadienyl skeleton structure and a promoter component (B); and
in a second polymerization stage, copolymerizing the homopolymer or the copolymer obtained in the first polymerization stage with at least one monomer selected from the group consisting of, an α-olefin comprising 4 to 20 carbon atoms, a styrene and a cyclic olefin in a presence of a polyene having at least two polymerizable carbon-carbon double bonds in one molecule,
wherein the polyene is at least one compound selected from a polyene of a styrene-compound, a styrene/α-olefin polyene which comprises a residue group of styrene and a residue group of an α-olefin in the same molecule, a compound of formula (VI)

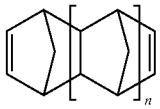

(VI)

wherein n is, 0, 1, or 2,
a compound of formula (VII)

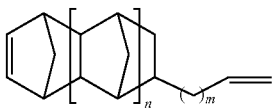

(VII)

wherein n is 0, 1, or 2, and m is an integer of from 1 to 11, and a compound of formula (VIII)

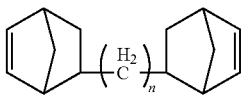

(VIII)

wherein n is an integer of from 0 to 6 and with the proviso that, in the second polymerization stage, the homopolymer or the copolymer obtained in the first polymerization stage is not polymerized with ethylene,
wherein the composition produced by the process satisfies the following requirements (a) to (c);
(a) the intrinsic viscosity $[\eta]2$ of a polyolefin obtained in the second polymerization stage is greater than the intrinsic viscosity $[\eta]1$ of a polyolefin obtained in the first polymerization stage,
(b) a ratio $[\eta]2/[\eta]1 = 1.05$ to 10, and
(c) a content of the polyolefin obtained in the second polymerization stage in the polyolefin-based resin composition is 0.001 to 80% by weight.

3. A process for producing a polyolefin-based resin composition which comprises:
in a first polymerization stage, polymerizing or copolymerizing at least one monomer selected from the group consisting of ethylene, propylene, an α-olefin comprising 4 to 20 carbon atoms, a styrene and a cyclic olefin, in the presence of a catalyst comprising a combination of a catalytic component (A) comprising at least one compound selected from compounds of transitions metals of Group 4 of the Periodic Table comprising a cyclopentadienyl skeleton structure and a promoter component (B), thereby obtaining a homopolymer or a copolymer; and
in a second polymerization stage, copolymerizing the homopolymer or the copolymer obtained in the first polymerization stage with at least one monomer selected from the group consisting of ethylene, an α-olefin comprising 4 to 20 carbon atoms, a styrene and a cyclic olefin, in the presence of a polyene having at least two polymerizable carbon-carbon double bonds in one molecule, wherein the polyene is at least one compound selected from the group consisting of a polyene of a styrene-compound, a styrene/α-olefin polyene which comprises a residue group of styrene and a residue group of an α-olefin in the same molecule, a compound of formula (VI)

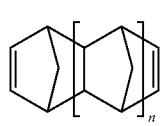
(VI)

wherein n is 0, 1, or 2,
a compound of formula (VII)

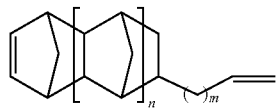
(VII)

wherein n is 0, 1, or 2, and m is an integer of from 1 to 11, and a compound of formula (VIII)

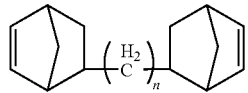
(VIII)

wherein n is an integer of from 0 to 6;

the polyene being used in an amount of $1.0 \times 10^{-7}$ to $1.0 \times 10^{-3}$ moles per 1 g of the homopolymer or the copolymer obtained in the first polymerization stage, with the proviso that, in the second polymerization stage, the homopolymer or the copolymer obtained in the first polymerization stage is not polymerized with propylene, and wherein the composition produced by the process satisfies the following requirements (a) to (c);
(a) the intrinsic viscosity [η]2 of a polyolefin obtained in the second polymerization stage is greater than the intrinsic viscosity [η]1 of a polyolefin obtained in the first polymerization stage,
(b) a ratio [η]2/[η]1=1.05 to 10, and
(c) a content of the polyolefin obtained in the second polymerization stage in the polyolefin-based resin composition is 0.00 1 to 80% by weight.

4. The process according to any one of claims 1, 2 or 3, wherein said catalyst component (A) is at least one compound selected from the group consisting of a transition metal compound as component (A-1) represented by general formula (I):

(I);

a transition metal compound as component (A-2) represented by general formula (II):

(II);

a transition metal compound as component (A-3) represented by general formula (III):

(III);

wherein $M^1$ represents a transition metal of Group 4 of the Periodic Table, Cp represents a group selected from the group consisting of a cyclopentadienyl group, a substituted cyclopentadienyl group, an indenyl group, a substituted indenyl group, a tetrahydroindenyl group, a substituted tetrahydroindenyl group, a fluorenyl group and a substituted fluorenyl group, wherein $R^1$, $R^2$ and $R^3$ each independently represent a ligand, wherein A represents a crosslinking with a covalent bond, wherein a, b and c each represent an integer of 0 to 3, wherein d and e each represent an integer of 0 to 2, wherein two or more ligands represented by $R^1$, $R^2$ and $R^3$ may be bonded with each other and form a ring, and wherein two Cp in general formula (II) and (III) may represent a same group or different groups;

a transition metal compound as component (A-4) represented by general formula (IV):

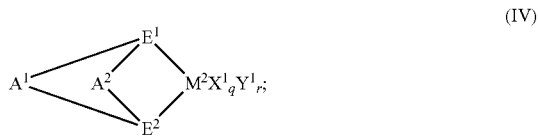
(IV)

wherein $M^2$ represents a titanium atom, a zirconium atom or a hafnium atom, wherein $E^1$ and $E^2$ each represent a ligand selected from the group consisting of a cyclopentadienyl group, a substituted cyclopentadienyl group, an indenyl group, a substituted indenyl group, a heterocyclopentadienyl group, a substituted heterocyclopentadienyl group, an amide group, a phosphide group, a hydrocarbon group and a group having a silicon atom, wherein $E^1$ and $E^2$ form crosslinking structures via groups represented by $A^1$ and $A^2$, wherein $E^1$ and $E^2$ may represent a same group or different groups, wherein $X^1$ represents a ligand forming a σ-bond, wherein a plurality of $X^1$ may represent a same ligand or different ligands when the plurality of $X^1$ are present, the ligand represented by $X^1$ may form a crosslinking structure in combination with another ligand represented by $X^1$, a ligand represented by $E^1$ or $E^2$ or a Lewis base represented by $Y^1$, wherein $Y^1$ represents a Lewis base, wherein a plurality of $Y^1$ may represent a same Lewis base or different Lewis bases when the plurality of $Y^1$ are present, the Lewis base represented by $Y^1$ may form a crosslinking structure in combination with another Lewis base represented by $Y^1$ or a ligand represented by $E^1$, $E^2$ or $X^1$, wherein $A^1$ and $A^2$ each represent a divalent crosslinking group which bonds two ligands and is a hydrocarbon group comprising 1 to 20 carbon atoms, a hydrocarbon group comprising 1 to 20 carbon atoms and at least one halogen atom, a group comprising a silicon atom, a group comprising a germanium atom, a group comprising a tin atom, —O—, —CO—, —S—, —SO₂—, —Se—, —NR⁴—, —PR⁴—, —P(O)R⁴—, —BR⁴— or —AlR⁴—, wherein $R^4$ is a hydrogen atom, a halogen atom, a hydrocarbon group comprising 1 to 20 carbon atoms or a hydrocarbon group comprising 1 to 20 carbon atoms and at least one halogen atom, and atoms and groups represented by a plurality of $R^4$ being a same with or different from each other, q represents an integer of 1 to 5 which is [(a valence of the atom represented by $M^2$)-2] and r represents an integer of 0 to 3; and a transition metal compound as component (A-5) represented by general formula (V):

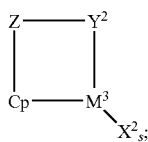

(V)

wherein $M^3$ represents a titanium atom, a zirconium atom or a hafnium atom, Cp represents a cyclic unsaturated hydrocarbon group, wherein $X^2$ represents hydrogen atom, a halogen atom, an alkyl group comprising 1 to 20 carbon atoms, an aryl group comprising 6 to 20 carbon atoms, an alkylaryl group comprising 6 to 20 carbon atoms, an arylalkyl group comprising 6 to 20 carbon atoms or an alkoxyl group comprising 1 to 20 carbon atoms, wherein Z represents $SiR^5_2$, $CR^5_2$, $SiR^5_2SiR^5_2$, $CR^5_2CR^5_2$, $CR^5_2CR^5_2CR^5_2$, $CR^5{=}CR^5$, $CR^5_2SiR^5_2$ or $GeR^5_2$, $Y^2$ represents —N(R6)—, —O—, —S— or —P($R^6$)—, wherein $R^5$ represents an alkyl group, an aryl group, a silyl group, a halogenated alkyl group or a halogenated aryl group each comprising hydrogen atom or 20 or less atoms which are not hydrogen atom or a group comprising a combination of these groups, and wherein $R^6$ represents an alkyl group comprising 1 to 10 carbon atoms, an aryl group comprising 6 to 10 carbon atoms or a cyclic system comprising at least one $R^5$ group and 30 or less atoms which are not hydrogen atom, and s represents a number of 1 or 2; and wherein said promoter component (B) is at least one substance selected from the group consisting of aluminoxanes as component (B-1), ionic compounds as component (B-2) which can be converted into a cation by a reaction with the transition metal compound and clay, and as component (B-3) clay minerals and ion exchageable lamellar compounds.

5. The process according to any one of claims 1, 2, or 3, wherein said polyene is a polyene of a styrene/α-olefin polyene which comprises a residue group of styrene and a residue group of an α-olefin in a same molecule.

6. A process for producing a polyolefin-based resin composition, the process comprising:

in a first polymerization stage, polymerizing or copolymerizing at least one monomer selected from the group consisting of ethylene, propylene and an α-olefin comprising 4 to 20 carbon atoms, in a presence of a catalyst comprising a combination of a catalyst component (X-2) comprising (i) a titanium compound, (ii) a magnesium compound, (iii) an electron-donating compound (a), an organoaluminum compound (Y), and an electron-donating compound (b), wherein a halogen element presents in at least one of (i) the titanium compound, (ii) the magnesium compound, and the organoaluminum compound (Y), and in a second polymerization stage, copolymerizing the homopolymer or the copolymer obtained in the first polymerization stage with at least one monomer selected from the group consisting of propylene and an α-olefin consisting of 4 to 20 carbon atoms, in a presence of a polyene comprising at least two polymerizable carbon-carbon double bonds in one molecule; with the proviso that, in the second polymerization stage, the homopolymer or the copolymer obtained in the first polymerization stage is not polymerized with ethylene, and wherein the produced composition satisfying following requirements (a) to (c):

(a) a ratio $[\eta]_2/[\eta]_1 = 1.05$ to 10, wherein $[\eta]_1$ represents an intrinsic viscosity of a polyolefin obtained in the first polymerization stage and $[\eta]_2$ represents an intrinsic viscosity of a polyolefin obtained in the second polymerization stage, (b) a content of the polyolefin obtained in the second polymerization stage in the polyolefin-based resin composition is 0.01 to 80% by weight, and (c) no insoluble components are present in a dissolution test of the polyolefin-based resin composition using decalin at 135° C. as a solvent.

7. The process according to claim 6, wherein the at least one monomer polymerized in said second polymerization stage comprises propylene.

* * * * *